US012183336B2

(12) United States Patent
Jung et al.

(10) Patent No.: US 12,183,336 B2
(45) Date of Patent: Dec. 31, 2024

(54) ELECTRONIC DEVICE FOR IDENTIFYING ELECTRONIC DEVICE TO PERFORM SPEECH RECOGNITION AND METHOD OF OPERATING SAME

(71) Applicant: Samsung Electronics Co., Ltd., Suwon-si (KR)

(72) Inventors: Rami Jung, Suwon-si (KR); Kyusung Sim, Suwon-si (KR); Junsik Jeong, Suwon-si (KR); Woojei Choi, Suwon-si (KR); Hyukjoong Kim, Suwon-si (KR); Daedong Park, Suwon-si (KR); Jaehong Jo, Suwon-si (KR); Jaehyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 17/298,355

(22) PCT Filed: May 14, 2021

(86) PCT No.: PCT/KR2021/006103
§ 371 (c)(1),
(2) Date: May 28, 2021

(87) PCT Pub. No.: WO2022/059883
PCT Pub. Date: Mar. 24, 2022

(65) Prior Publication Data
US 2022/0319507 A1    Oct. 6, 2022

(30) Foreign Application Priority Data
Sep. 18, 2020   (KR) .................. 10-2020-0120782

(51) Int. Cl.
*G10L 15/22*   (2006.01)
*G10L 15/02*   (2006.01)
(Continued)

(52) U.S. Cl.
CPC ............. *G10L 15/22* (2013.01); *G10L 15/063* (2013.01); *G10L 15/08* (2013.01); *G10L 15/30* (2013.01);
(Continued)

(58) Field of Classification Search
CPC ....................................... G10L 15/22
See application file for complete search history.

(56) References Cited

U.S. PATENT DOCUMENTS 8,340,975 B1 * 12/2012 Rosenberger ........... G10L 15/22
704/274
10,482,904 B1   11/2019 Hardie et al.
(Continued)

FOREIGN PATENT DOCUMENTS

JP      2016-180914 A   10/2016
KR   10-2019-0005104 A    1/2019
(Continued)

OTHER PUBLICATIONS

International Search Report dated Aug. 12, 2021, issued in International Patent Application No. PCT/KR2021/006103.

*Primary Examiner* — Seong-Ah A Shin
(74) *Attorney, Agent, or Firm* — Jefferson IP Law, LLP

(57) ABSTRACT

An electronic device is provided. The electronic device includes a communication circuit, a memory, and at least one processor, wherein, when instructions stored in the memory are executed, the instructions cause the at least one processor to establish communication connections with a plurality of external electronic devices for providing an intelligent speech service, receive at least one piece of information related to a user utterance including a specific word for wake-up from at least some of the plurality of external electronic devices, identify a device to be woken up among the at least some of the plurality of external electronic devices, based on at least one piece of information received (Continued)

during a time interval for identifying the device to be woken up, and change the time interval to a first time interval longer than the time interval, based on a reception time point of at least one piece of second information when the at least one piece of second information is received after the time interval.

20 Claims, 29 Drawing Sheets

(51) Int. Cl.
    *G10L 15/06*         (2013.01)
    *G10L 15/08*         (2006.01)
    *G10L 15/30*         (2013.01)
    *G10L 25/84*         (2013.01)
    *H04W 76/10*       (2018.01)
    *H04W 84/18*       (2009.01)

(52) U.S. Cl.
    CPC .............. *G10L 25/84* (2013.01); *H04W 76/10* (2018.02); *G10L 2015/088* (2013.01); *G10L 2015/223* (2013.01); *H04W 84/18* (2013.01)

(56) References Cited

U.S. PATENT DOCUMENTS

| | | | | |
|---|---|---|---|---|
| 10,997,973 | B2* | 5/2021 | Choi | G10L 15/08 |
| 11,183,181 | B2* | 11/2021 | Hartung | G10L 15/22 |
| 2015/0194152 | A1* | 7/2015 | Katuri | G10L 21/0208 |
| | | | | 704/231 |
| 2017/0053650 | A1* | 2/2017 | Ogawa | G10L 25/51 |
| 2017/0330565 | A1* | 11/2017 | Daley | G10L 17/00 |
| 2018/0137857 | A1* | 5/2018 | Zhou | G10L 15/16 |
| 2018/0301147 | A1* | 10/2018 | Kim | G06F 3/167 |
| 2019/0013021 | A1 | 1/2019 | Chang et al. | |
| 2019/0025878 | A1* | 1/2019 | Shin | G06F 3/0488 |
| 2019/0115025 | A1* | 4/2019 | Choi | G10L 15/00 |
| 2019/0147904 | A1* | 5/2019 | Tao | G10L 25/21 |
| | | | | 704/231 |
| 2020/0007987 | A1* | 1/2020 | Woo | G10L 15/22 |
| 2020/0066279 | A1 | 2/2020 | Kang et al. | |
| 2020/0074988 | A1 | 3/2020 | Park et al. | |
| 2020/0258512 | A1* | 8/2020 | Smith | G06F 3/167 |
| 2020/0395005 | A1* | 12/2020 | Zheng | G01S 3/8006 |
| 2021/0117479 | A1* | 4/2021 | Liu | G06F 16/9536 |
| 2022/0013111 | A1* | 1/2022 | Chen | G10L 15/02 |
| 2022/0392481 | A1* | 12/2022 | Chen | G10L 25/51 |
| 2022/0399015 | A1* | 12/2022 | Klein | G06N 3/045 |

FOREIGN PATENT DOCUMENTS

| | | |
|---|---|---|
| KR | 10-2019-0009488 A | 1/2019 |
| KR | 10-2019-0034964 A | 4/2019 |
| KR | 10-2019-0042919 A | 4/2019 |
| KR | 10-2051016 B1 | 12/2019 |

\* cited by examiner

2201

| | TV | Mobile phone | Air conditioner | ... | Initial selection information | Final selection information |
|---|---|---|---|---|---|---|
| Wake-up #1 | · State information<br>· SNR information | · State information<br>· SNR information | · State information<br>· SNR information | ... | TV | TV |
| Wake-up #2 | · State information<br>· SNR information | · State information<br>· SNR information | · State information<br>· SNR information | ... | TV | Air conditioner |
| ... | ... | ... | ... | ... | ... | ... |

2202

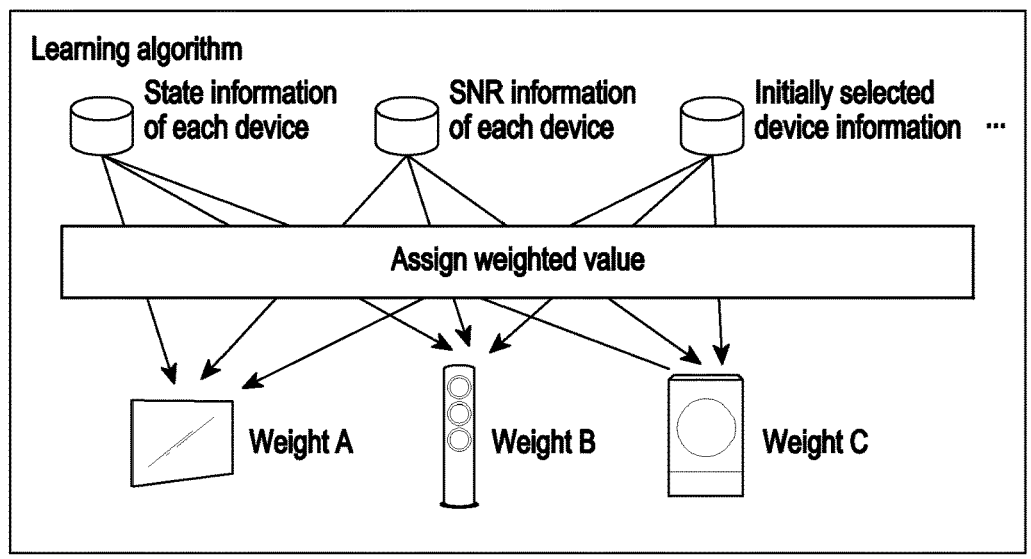

2203

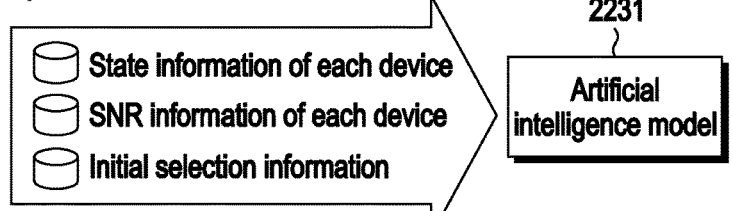

FIG.22

ELECTRONIC DEVICE FOR IDENTIFYING ELECTRONIC DEVICE TO PERFORM SPEECH RECOGNITION AND METHOD OF OPERATING SAME

CROSS-REFERENCE TO RELATED APPLICATION(S)

This application is a National Phase Entry of PCT International Application number PCT/KR2021/006103, filed on May 14, 2021, and claims priority to Korean patent application number 10-2020-0120782, filed on Sep. 18, 2020, the contents of which are incorporated herein by reference.

TECHNICAL FIELD

The disclosure relates to an electronic device for identifying an electronic device to perform speech recognition and a method of operating the same.

BACKGROUND ART

Various types of electronic devices are being supplied to consumers currently.

Various types of the electronic devices may execute speech recognition and perform various operations on the basis of the executed speech recognition, so as to provide an intelligent speech service. Furthermore, an environment in which the electronic devices provide the intelligent speech service on the basis of information sharing between the electronic devices through the Internet of Things that connects the electronic devices included in various environments with a wired/wireless network has been established.

Recently, according to an increasing number of electronic devices capable of providing the intelligent speech service, it has become difficult to select a device for providing the intelligent speech service matching a user's intent. Accordingly, implementation of a technology for selecting a device to provide the intelligent speech service matching the user's intent among various electronic devices is needed.

The above information is presented as background information only to assist with an understanding of the disclosure. No determination has been made, and no assertion is made, as to whether any of the above might be applicable as prior art with regard to the disclosure.

DETAILED DESCRIPTION OF THE DISCLOSURE

Technical Problem

Various types of electronic devices capable of providing an intelligent service (for example, an intelligent speech service) may exist within various environments. Upon receiving a user utterance (for example, a wake-up utterance) including a specific word for initiating a provision of the intelligent speech service from a user, the electronic devices may recognize an utterance (for example, a control utterance) for control by the user and may enter (that is, may be woken up) a state (for example, a listening state) in which at least one operation corresponding to the recognized utterance is performed. However, by the wake-up utterance, many other electronic devices having an intent different from the user's intent among the electronic devices existing within the environment may enter the listening state (that is, may be woken up). Accordingly, operation load may be generated due to unnecessary entry of many other electronic devices into the listening state. Further, cumbersomeness may occur in that the user should release the listening state of other electronic devices, speak a wake-up utterance again, and switch the electronic device that matches the user's intent to the listening state again.

Aspects of the disclosure are to address at least the above-mentioned problems and/or disadvantages and to provide at least the advantages described below.

Accordingly, an aspect of the disclosure is to provide an electronic device and a method of operating the same may receive information related to a wake-up utterance from other external electronic devices when the wake-up utterance is generated, and identify an optimal device to be woken up (that is, switched to the listening state) on the basis of the received information, so as to reduce operation load and cumbersomeness generated due to the wake-up of many other electronic devices. According to various embodiments, an electronic device and a method of operating the same may wake up an optimal device by configuring or changing values (for example, a time-out and a priority) used when an operation of identifying a device to be woken up is performed on the basis of information generated within the environment (for example, information on a reception time point of information received during one session acquired when the operation of identifying the device to be woken up is performed or information on a device re-identified as the device to be woken up).

Additional aspects will be set forth in part in the description which follows and, in part, will be apparent from the description, or may be learned by practice of the presented embodiments.

Technical Solution

According to various embodiments, an electronic device is provided. The electronic device includes a communication circuit, a memory, and at least one processor, wherein, when instructions stored in the memory are executed, the instructions cause the at least one processor to establish communication connections with a plurality of external electronic devices for providing an intelligent speech service, receive at least one piece of information related to a user utterance including a specific word for wake-up from at least some of the plurality of external electronic devices, identify a device to be woken up among the at least some of the plurality of external electronic devices, based on at least one piece of information received during a time interval for identifying the device to be woken up, and change the time interval to a first time interval longer than the time interval, based on a reception time point of at least one piece of second information when the at least one piece of second information is received after the time interval.

According to various embodiments, a method of operating an electronic device is provided. The method includes establishing communication connections with a plurality of external electronic devices for providing an intelligent speech service, receiving at least one piece of information related to a user utterance including a specific word for wake-up from at least some of the plurality of external electronic devices, identifying a device to be woken up among the at least some of the plurality of external electronic devices, based on at least one piece of information received during a time interval for identifying the device to be woken up, and changing the time interval to a first time interval longer than the time interval, based on a reception time point of at least one piece of second information when the at least one piece of second information is received after the time interval.

According to various embodiments, an electronic device is provided. The electronic device includes a communication circuit, a memory, and at least one processor, wherein, when instructions stored in the memory are executed, the instructions cause the at least one processor to configure a network with a plurality of external electronic devices for providing an intelligent speech service, accumulate information related to the plurality of external electronic devices while an operation of waking up some of the plurality of external electronic devices configuring the network is performed, set a time interval for identifying a device to be woken up and a priority of each of the plurality of external electronic devices, based on the accumulated information, receive at least one piece of information related to a user utterance including a specific word for wake-up from at least some of the plurality of external electronic devices, and identify the device to be woken up among the at least some of the plurality of external electronic devices, based on the at least one piece of information and at least one of the time interval or the priority.

The technical solutions according to various embodiments are not limited to the above-described technical solutions, and technical solutions which have not been mentioned may be clearly understood by those skilled in the art from the specifications and the accompanied drawings.

Advantageous Effects

Various embodiments may provide an electronic device and a method of operating the same for reducing operation load and cumbersomeness generated due to wake-up of many other electronic devices by receiving information related to a wake-up utterance from other external electronic devices when the wake-up utterance is generated and identifying an optimal device to be woken up (that is, switched to a listening state) on the basis of the received information.

Various embodiments may provide an electronic device and a method of operating the same for waking up an optimal device by configuring or changing values (for example, time-out and priority) used when an operation of identifying a device to be woken up is performed on the basis of information generated within the environment (for example, information on a reception time point of information received during one session acquired when the operation of identifying the device to be woken up is performed or information on a device re-identified as the device to be woken up).

Other aspects, advantages, and salient features of the disclosure will become apparent to those skilled in the art from the following mode for carrying out the disclosure, which, taken in conjunction with the annexed drawings, discloses various embodiments of the disclosure.

BRIEF DESCRIPTION OF DRAWINGS

The above and other aspects, features, and advantages of various embodiments will be more apparent from the following description taken in conjunction with the accompanying drawings, in which:

FIG. 22 illustrates an example of an operation in which an electronic device generates an artificial intelligence model on a basis of various pieces of information accumulated when an operation of identifying a device to be woken up is performed according to various embodiments;

Throughout the drawings, like reference numerals will be understood to refer to like parts, components, and structures.

MODE FOR CARRYING OUT THE DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
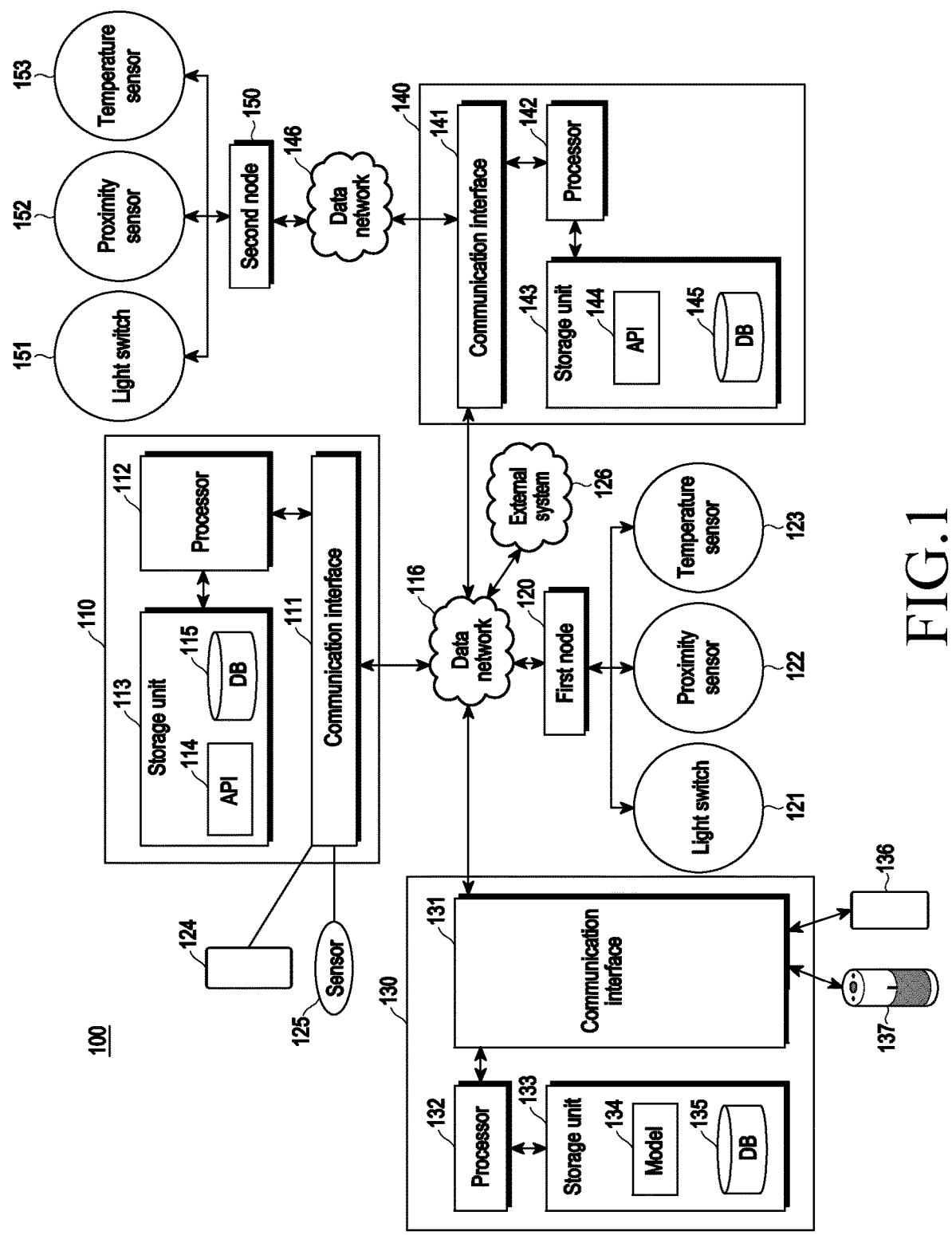
FIG. 1 illustrates an Internet of Things (IoT) system according to various embodiments.

FIG. 1 illustrates an Internet of Things (IoT) system according to various embodiments. Meanwhile, at least some of the elements in FIG. 1 may be omitted and elements which are not illustrated may be further included.

Referring to FIG. 1, an IoT system 100 according to an embodiment includes a plurality of electronic devices which can be connected to a data network 116 or 146. For example, the IoT system 100 may include at least one of a first IoT server 110, a first node 120, a voice assistance server 130, a second IoT server 140, a second node 150, or devices 121, 122, 123, 124, 125, 136, 137, 151, 152, and 153.

According to an embodiment, the first IoT server 110 may include at least one of a communication interface 111, a processor 112, or a storage unit 113. The second IoT server 140 may include at least one of a communication interface 141, a processor 142, or a storage unit 143. The "IoT server" in this document may remotely control and/or monitor one or more devices (for example, the devices 122, 123, 124, 125, 151, 152, and 153) through a relay device (for example, the first node 120 or the second node 150) or directly without any relay device on the basis of, for example, a data network (for example, the data network 116 or the data network 146). The "device" is a sensor, a home appliance, an electronic device for an office, or a device for performing a process disposed (or located) within a local environment such as, for example, a house, an office, a factory, a building, an outside point, or another type of site, and the device type has no limitation. A device for receiving a control command and performing an operation corresponding to the control command may be named a "target device". The IoT server may be named a central server in that the IoT server selects a target device from among a plurality of devices and provides a control command.

According to an embodiment, the first IoT server 110 may communicate with the devices 121, 122, and 123 through the data network 116. The data network 116 may refer to a network for long-range communication, such as, for example, the Internet or a computer network (for example, Local Area Network (LAN) or Wide area Network (WAN)) or may include a cellular network.

According to an embodiment, the first IoT server 110 may be connected to the data network 116 through the communication interface 111. The communication interface 111 may include a communication device (or a communication module) for supporting communication of the data network 116, and may be integrated into one element (for example, a single chip) or implemented as a plurality of separate elements (for example, a plurality of chips). The first IoT server 110 may communicate with the devices 121, 122, and 123 through the first node 120. The first node 120 may receive data from the first IoT server 110 through the data network 116 and transmit the received data to at least some of the devices 121, 122, and 123. Alternatively, the first node 120 may receive data from at least some of the devices 121, 122, and 123 and transmit the received data to the first IoT server 110 through the data network 116. The first node 120 may function as a bridge between the data network 116 and the devices 121, 122, and 123. Meanwhile, although FIG. 1 illustrates that there is one first node 120, this is only an example and the number of first nodes has no limitation.

The "node" in this document may be an edge computing system or a hub device. According to an embodiment, the first node 120 may support wired communication and/or wireless communication of the data network 116 and also support wired communication and/or wireless communication with the devices 121, 122, and 123. For example, the first node 120 may be connected to the devices 121, 122, and 123 through a short-range communication network such as at least one of Bluetooth, Wi-Fi, Wi-Fi direct, Z-wave, Zig-bee, INSETEON, X10, or Infrared Data Association, but the communication type has no limitation. The first node 120 may be disposed (or located) within the same environment as, for example, home, an office, a factory, a building, an outside point, or another type of sites. Accordingly, the devices 121, 122, and 123 may be monitored and/or controlled by a service provided by the first IoT server 110, and may not be required to have capability of complete network communication (for example, Internet communication) for direction connection to the first IoT server 110. Although it is illustrated that the devices 121, 122, and 123 are implemented as electronic devices within a house, such as, for example, a light switch, a proximity sensor, a temperature sensor, or the like, they are only examples and have no limitation.

According to an embodiment, the first IoT server 110 may support direct communication with the devices 124 and 125. The "direct communication" herein is communication that does not pass through a relay device, such as, for example, the first node 120, and may be, for example, communication through a cellular communication network and/or a data network.

According to an embodiment, the first IoT server 110 may transmit a control command to at least some of the devices 121, 122, 123, 124, and 125. The "control command" may be data causing a controllable device to perform a specific operation, and the specific operation is an operation performed by the device and may include outputting information, sensing information, reporting information, and managing (for example, deleting or creating) information, but the type thereof has no limitation. For example, the processor 112 may acquire information (or a request) for generating a control command from the outside (for example, at least some of the voice assistant server 130, the second IoT server 140, an external system 126, or the devices 121, 122, 123, 124, and 125) and generate the control command on the basis of the acquired information. Alternatively, the processor 112 may generate the control command when a monitoring result of at least some of the devices 121, 122, 123, 124, and 125 satisfy a predetermined condition. The processor 112 may control the communication interface 111 to transmit the control command to a target device.

According to an embodiment, the processor 112, the processor 132, or the processor 142 may be implemented by a combination of one or more of a general purpose processor, such as a Central Processing Unit (CPU), a Digital Signal Processor (DSP), an Application Processor (AP), a Communication Processor (CP), and the like, a graphic-dedicated processor, such as a Graphical Processing Unit (GPU) or a Vision Processing Unit (VPU), or an artificial intelligence-dedicated processor, such as a Neural Processing Unit (NPU). The processing units are only examples, and the processor 112 has no limitation if the processor 112 is, for example, an operation means capable of executing instructions stored in the memory 113 and outputting an executed result.

According to an embodiment, the processor 112 may configure a web-based interface on the basis of an application programming interface (API) 114 or expose resources managed by the first IoT server 110 to the outside. The web-based interface may support, for example, communication between the first IoT server 110 and an external web service. The processor 112 may allow, for example, the external system 126 to control and/or access the devices 121, 122, and 123. The external system 126 may be, for example, a system which is irrelevant to the system 100 or an independent system which is not a portion thereof. The external system 126 may be, for example, an external server or a website. However, security for access to resources of the devices 121, 122, and 123 or the first IoT server 110 from the external system 126 is needed. According to an embodiment, the processor 112 may expose an API end point (for example, a Universal Resource Locator (URL)) based on the API 114 to the outside through an automation application. According to the above description, the first IoT server 110 may transfer the control command to a target device among the devices 121, 122, and 123. Meanwhile, the description of the communication interface 141 and the processor 142 of the second IoT server 140, and an API 144 and a database 145 of the storage unit 143 may be substantially the same as the description of the communication interface 111 and the processor 112 of the first IoT server 110, and the API 114 and a database 115 of the storage unit 113. The description of the second node 150 may be substantially the same as the description of the first node 120. The second IoT server 140 may transfer the control command to a target device among the devices 151, 152, and 153. The first IoT server 110 and the second IoT server 140 may be operated by the same service provider in one embodiment, but may be operated by different service providers in another embodiment.

According to an embodiment, the voice assistant server 130 may transmit and receive data to and from the first IoT server 110 through the data network 116. The voice assistant server 130 according to an embodiment may include at least one of a communication interface 131, a processor 132, or a storage unit 133. The communication interface 131 may communicate with a smart phone 136 or an AI speaker 137 through a data network (not shown) and/or a cellular network (not shown). The smart phone 136 or the AI speaker 137 may include a microphone, and may acquire a user voice, convert the user voice into a voice signal, and transmit the voice signal to the voice assistant server 130. The processor 132 may receive the voice signal from the smart phone 136 or the AI speaker 137 through the communication interface 131. The processor 132 may process the received voice signal on a basis of a stored model 134. The processor 132 may generate (or identify) a control command using a processing result on the basis of information stored in a data base 135. According to an embodiment, the storage unit 113, 133, or 143 may include at least one type of nontransitory storage medium among a flash memory type, a hard disk type, a multimedia card micro type, a card type memory (for example, an SD memory, an XD memory, or the like), a Random Access Memory (RAM), a Static RAM (SRAM), a Read-Only Memory (ROM), an Electrically Erasable Programmable ROM (EEPROM), a Programmable Read-Only Memory (PROM), a magnetic memory, a magnetic disk, and an optical disk, but the type thereof has no limitation.

Figure 2:
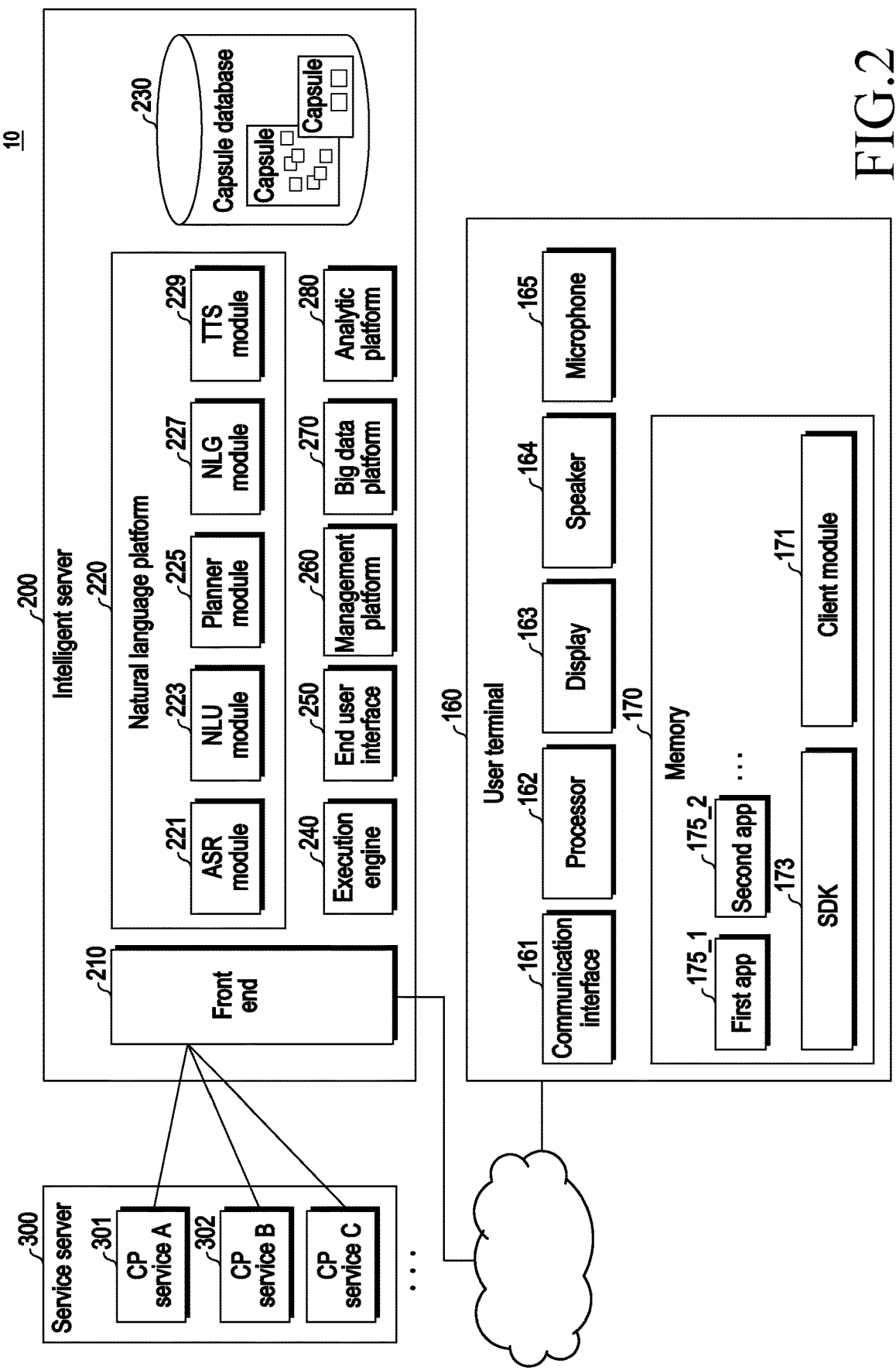
FIG. 2 is a block diagram illustrating an integrated intelligence system according to various embodiments.

FIG. 2 is a block diagram illustrating an integrated intelligence system according to various embodiments. The following description of the integrated intelligence system may be applied to the description of the IoT system illustrated in FIG. 1.

Referring to FIG. 2, an integrated intelligence system 10 according to an embodiment may include a user terminal 160, an intelligent server 200, and a service server 300.

The user terminal 160 according to an embodiment may be a terminal device (or an electronic device) capable of being connected to the Internet, and may include, for example, a mobile phone, a smart phone, a Personal Digital Assistant (PDA), a notebook computer, a TV, white goods, a wearable device, an head-mounted display (HMD), or a smart speaker.

According to the illustrated embodiment, the user terminal 160 may include a communication interface 161, a processor 162, a display 163, a speaker 164, a microphone 165, or a memory 170. The listed elements may be operatively or electrically connected to each other.

The communication interface 161 according to an embodiment may be connected to an external device and configured to transmit and receive data. The microphone 165 according to an embodiment may receive a sound (for example, user utterance) and convert the same into an electrical signal. The speaker 164 according to an embodiment may output an electrical signal in the form of a sound (for example, speech). The display 163 according to an embodiment may be configured to display an image or a video. The display 163 according to an embodiment may display a Graphic User Interface (GUI) of an executed app (or application).

The memory 170 according to an embodiment may store a client module 171, a Software Development Kit (SDK) 173, and a plurality of apps 175_1 and 175_2. The client module 171 and the SDK 173 may configure a framework (or a solution program) for performing a universal function. Further, the client module 171 or the SDK 173 may configure a framework for processing a voice input.

The plurality of apps 175_1 and 175_2 in the memory 170 according to an embodiment may be programs for performing predetermined functions. According to an embodiment, the plurality of apps 175_1 and 175_2 may include a first app 175_1 and a second app 175_2. According to an embodiment, each of the plurality of apps 175_1 and 175_2 may include a plurality of operations for performing predetermined functions. For example, the apps may include an alarm app, a message app, and/or a schedule app. According to an embodiment, the plurality of apps 175_1 and 175_2 may be executed by the processor 162 and may sequentially execute at least some of the plurality of operations.

The processor 162 according to an embodiment may control the overall operation of the user terminal 160. For example, the processor 162 may be electrically connected to the communication interface 161, the microphone 165, the speaker 164, and the display 163 to perform predetermined operations.

The processor 162 according to an embodiment may perform a predetermined function by executing a program stored in the memory 170. For example, the processor 162 may perform the following operation for processing a voice input by executing at least one of the client module 171 or the SDK 173. The processor 162 may control operations of the plurality of apps 175_1 and 175_2 through, for example, the SDK 173. The following operation which is the operation of the client module 171 or the SDK 173 may be performed by the processor 162.

The client module 171 according to an embodiment may receive a voice input. For example, the client module 171 may receive a voice signal corresponding to a user speech detected through the microphone 165. The client module 171 may transmit the received voice input to the intelligent server 200. The client module 171 may transmit state information of the user terminal 160 along with the received voice input to the intelligent server 200. The status information may be, for example, execution state information of the app.

The client module 171 according to an embodiment may receive the result corresponding to the received voice input. For example, if the intelligent server 200 obtains the result corresponding to the received voice input, the client module 171 may receive the result corresponding to the received voice input. The client module 171 may display the received result on the display 163.

The client module 171 according to an embodiment may receive a plan corresponding to the received voice input. The client module 171 may display the result obtained by performing the plurality of operations of the app on the display 163 according to the plan. The client module 171 may sequentially display, for example, the execution result of the plurality of operations on the display. In another example, the user terminal 160 may display results of only some of the plurality of operations on the display.

According to an embodiment, the client module 171 may receive a request for acquiring information required for obtaining the result corresponding to the voice input from the intelligent server 200. According to an embodiment, the client module 171 may transmit the required information to the intelligent server 200 in response to the request.

The client module 171 according to an embodiment may transmit result information of the execution of the plurality of operations to the intelligent server 200 according to the plan. The intelligent server 200 may identify that the received voice input is correctly processed using the result information.

The client module 171 according to an embodiment may include a voice recognition module. According to an embodiment, the client module 171 may recognize a voice input for performing a limited function through the voice recognition module. For example, the client module 171 may execute an intelligent app for processing a voice input to perform an organic operation through a predetermined input (for example, wake up!).

The intelligent server 200 according to an embodiment may receive information related to a user voice input from the user terminal 160 through a communication network. According to an embodiment, the intelligent server 200 may change data related to the received voice input into text data. According to an embodiment, the intelligent server 200 may generate a plan for performing a task corresponding to the user voice input on the basis of the text data.

According to an embodiment, the plan may be generated by an artificial intelligence (AI) system. The artificial intelligence system may be a rule-based system or a neural network-based system (for example, a Feedforward Neural Network (FNN) or a Recurrent Neural Network (RNN)). Alternatively, the intelligence system may be a combination thereof or an intelligent system different therefrom. According to an embodiment, the plan may be selected from a combination of predefined plans or may be generated in real time in response to a user request. For example, the intelligence system may select at least one plan among from a plurality of predefined plans.

The intelligent server 200 according to an embodiment may transmit the result of the generated plan to the user terminal 160 or transmit the generated plan to the user terminal 160. According to an embodiment, the user terminal 160 may display the result of the plan on the display. According to an embodiment, the user terminal 160 may display the result of execution of operation according to the plan on the display.

The intelligent server 200 according to an embodiment may include a front end 210, a natural language platform 220, a capsule DB 230, an execution engine 240, an end user interface 250, a management platform 260, a big data platform 270, or an analytic platform 280.

The front end 210 according to an embodiment may receive the received speech input from the user terminal 160. The front end 210 may transmit a response to the speech input.

According to an embodiment, the natural language platform 220 may include an Automatic Speech Recognition module (ASR module) 221, a Natural Language Understanding module (NLU module) 223, a planner module 225, Natural Language Generator module (NLG module) 227, or a Text To Speech module (TTS module) 229.

The automatic speech recognition module 221 according to an embodiment may convert the voice input received from the user terminal 160 into text data. The natural language understanding module 223 according to an embodiment may detect a user's intention on the basis of text data of the voice input. For example, the natural language understanding module 223 may detect a user's intention by performing syntactic analysis or semantic analysis. The natural language understanding module 223 according to an embodiment may detect a meaning of a word extracted from the voice input on the basis of a linguistic characteristic of a morpheme or a phrase (for example, grammatical element) and match the detected meaning of the word and the intent so as to determine the user intent.

The planner module 225 according to an embodiment may generate a plan on the basis of the intention determined by the natural language understanding module 223 and a parameter. According to an embodiment, the planner module 225 may determine a plurality of domains required for performing a task on the basis of the determined intent. The planner module 225 may determine a plurality of operations included in the plurality of domains determined on the basis of the intent. According to an embodiment, the planner module 225 may determine a parameter required for performing the plurality of determined operations or a result value output by the execution of the plurality of operations. The parameter and the result value may be defined by a concept of a predetermined type (or class). According to an embodiment, the plan may include a plurality of operations determined by the user intent and a plurality of concepts. The planner module 225 may gradually (or hierarchically) determine the relationship between the plurality of operations and the plurality of concepts. For example, the planner module 225 may determine the execution order of the plurality of operations determined on the basis of the user intent based on the plurality of concepts. In other words, the planner module 225 may determine the execution order of the plurality of operations on the basis of the parameter required for performing the plurality of operations and the result output by the execution of the plurality of operations. Accordingly, the planner module 225 may generate a plan including information on the relationship (for example, ontology) between the plurality of operations and the plurality of concepts. The planner module 225 may generate a plan on the basis of information stored in the capsule database 230 corresponding to a set of relationships between concepts and operations.

The natural language generator module 227 according to an embodiment may change predetermined information in the form of text. The information converted into the form of text may be the form of a natural language speech. The text to speech module 229 may convert information in the form of text into information in the form of voice.

According to an embodiment, some or all of the functions of the natural language platform 220 may be performed by the user terminal 160.

The capsule database 230 may store information on the relationship between a plurality of concepts and operations corresponding to a plurality of domains. The capsule according to an embodiment may include a plurality of operation objects (action objects or action information) and concept objects (or concept information) included in the plan. According to an embodiment, the capsule database 230 may store a plurality of capsules in the form of a Concept Action Network (CAN). According to an embodiment, the plurality of capsules may be stored in a function registry included in the capsule DB 230.

The capsule database 230 may include a strategy registry storing strategy information required when a plan corresponding to a voice input is determined. When there are a plurality of plans corresponding to the voice input, the strategy information may include reference information for determining one plan. According to an embodiment, the capsule database 230 may include a follow up registry storing the following operation to suggest the following operation to the user in a predetermined situation. The following operation may include, for example, the following speech. According to an embodiment, the capsule database 230 may include a layout registry storing layout information which is information output through the user terminal 160. According to an embodiment, the capsule database 230 may include a vocabulary registry storing vocabulary information included in the capsule information. According to an embodiment, the capsule database 230 may include a dialogue registry storing information on dialogue (or interaction) with the user. The capsule database 230 may update the stored object through a developer tool. The developer tool may include a function editor for updating, for example, the operation object or the concept object. The developer tool may include a vocabulary editor for updating a vocabulary. The developer tool may include a strategy editor for generating and registering a strategy to determine a plan. The developer tool may include a dialogue editor for generating a dialogue with the user. The developer tool may include a follow up editor for activating a follow up goal and editing a following speech that provides a hint. The follow-up goal may be determined on the basis of the current goal, a user's preference, or an environment condition. According to an embodiment, the capsule database 230 may be implemented within the user terminal 160.

The execution engine 240 according to an embodiment may obtain the result on the basis of the generated plan. The end user interface 250 may transmit the obtained result to the user terminal 160. Accordingly, the user terminal 160 may receive the result and provide the received result to the user. The management platform 260 according to an embodiment may manage information used by the intelligent server 200. The big data platform 270 according to an embodiment may collect user data. The analytic platform 280 according to an embodiment may manage quality of service (QoS) of the intelligent server 200. For example, the analytic platform 280 may manage elements and a processing speed (or efficiency) of the intelligent server 200.

The service server 300 according to an embodiment may provide a predetermined service (for example, food order or hotel reservation) to the user terminal 160. According to an embodiment, the service server 300 may be a server operated by a third party. The service server 300 according to an embodiment may provide information for generating a plan corresponding to the received voice input to the intelligent server 200. The provided information may be stored in the capsule database 230. Further, the service server 300 may provide result information of the plan to the intelligent server 200. The service server 300 may include CP services 301, 302 . . . .

In the integrated intelligence system 10, the user terminal 160 may provide various intelligent services to the user in response to a user input. The user input may include, for example, an input through a physical button, a touch input, or a voice input.

According to an embodiment, the user terminal 160 may provide a voice recognition service through an intelligent app (or a voice recognition app) stored in the user terminal 160. In this case, for example, the user terminal 160 may recognize a user speech (utterance) or a voice input received through the microphone and provide a service corresponding to the recognized voice input to the user.

According to an embodiment, the user terminal 160 may perform a predetermined operation on the basis of the received voice input along or together with the intelligent server and/or the service server. For example, the user terminal 160 may execute an app corresponding to the received voice input and perform a predetermined operation through the executed app.

According to an embodiment, when the user terminal 160 provides the service together with the intelligent server 200 and/or the service server, the user terminal may detect a user speech through the microphone 165 and generate a signal (or voice data) corresponding to the detected user speech. The user terminal may transmit the voice data to the intelligent server 200 through the communication interface 161.

The intelligent server 200 according to an embodiment may generate a plan for performing a task corresponding to the voice input or the result of the operation according to the plan in response to the voice input received from the user terminal 160. The plan may include, for example, a plurality of operations for performing a task corresponding to the voice input of the user and a plurality of concepts related to the plurality of operations. The concepts may be parameters input by execution of the plurality of operations or may be defined for result values output by the execution of the plurality of operations. The plan may include the relationship between the plurality of operations and the plurality of concepts.

The user terminal 160 according to an embodiment may receive the response through the communication interface 161. The user terminal 160 may output a voice signal generated within the user terminal 160 to the outside through the speaker 164 or output an image generated within the user terminal 160 to the outside through the display 163.

Figure 3:
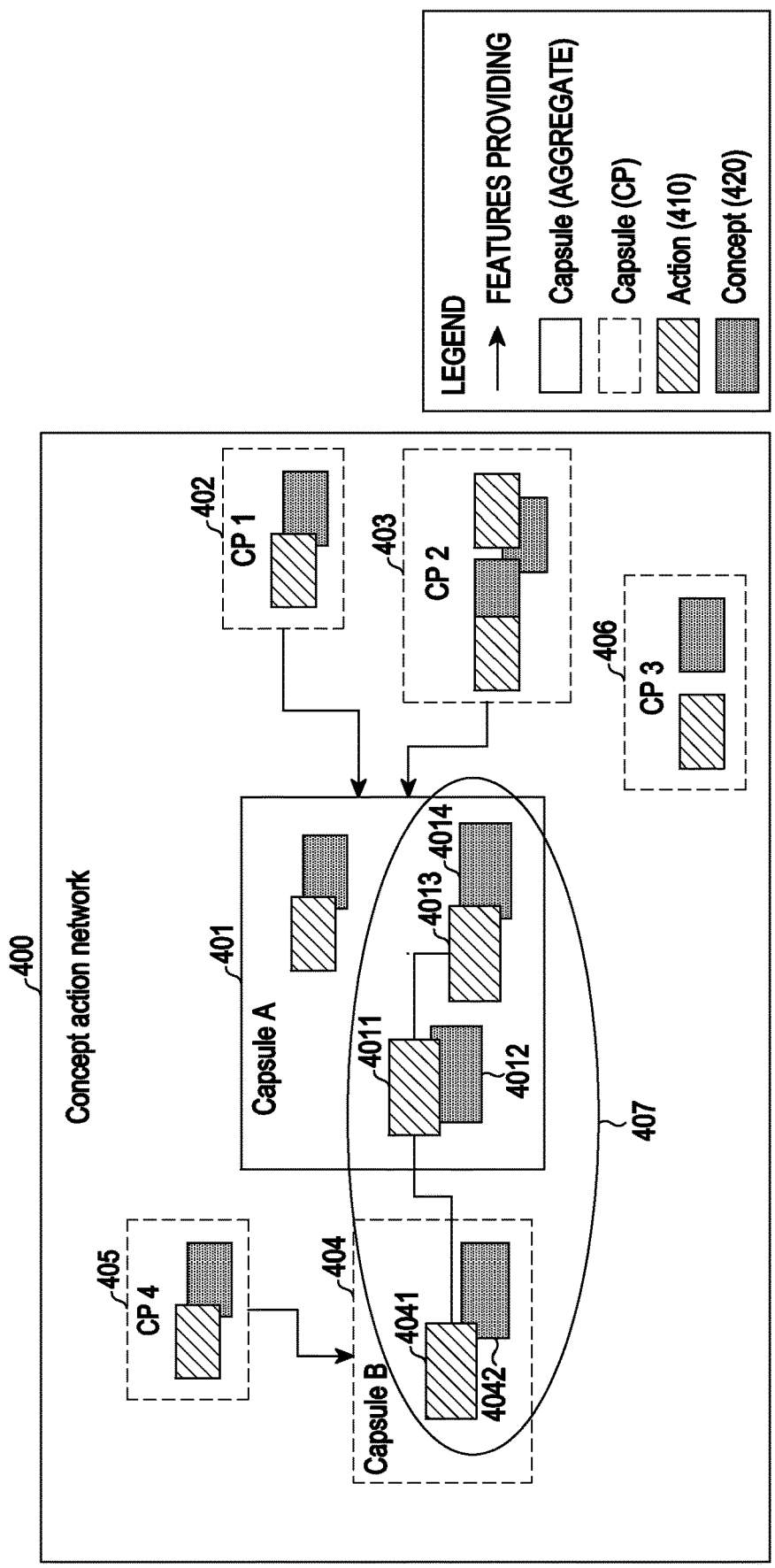
FIG. 3 illustrates a form in which relation information between concepts and actions is stored in a database according to various embodiments.

FIG. 3 illustrates a form in which relation information between concepts and actions is stored in a database according to various embodiments.

Referring to FIG. 3, a capsule database (for example, the capsule database 230) of the intelligent server 200 may store capsules in the form of a Concept Action Network (CAN) 400. The capsule database may store an operation for processing a task corresponding to a user voice input and a parameter required for the operation in the form of the CAN 400.

The capsule database may store a plurality of capsules (capsule A 401 and capsule B 404) corresponding to a plurality of domains (for example, applications). According to an embodiment, one capsule (for example, capsule A 401) may correspond to one domain (for example, location (geo) or application). Further, one capsule may correspond to at least one service provider (for example, CP1 402, CP2 403, CP3 406, or CP4 405) for performing a function of the domain related to the capsule. According to an embodiment, one capsule may include one or more operations 410 for performing a predetermined function and one or more concepts 420.

The natural language platform 220 may generate a plan for performing a task corresponding to the received voice input through the capsules stored in the capsule database. For example, the planner module 225 of the natural language platform may generate a plan through capsules stored in the capsule database. For example, a plan 407 may be generated using actions 4011 and 4013 and concepts 4012 and 4014 of the capsule A 410 and an action 4041 and a concept 4042 of the capsule B 404.

Figure 4:
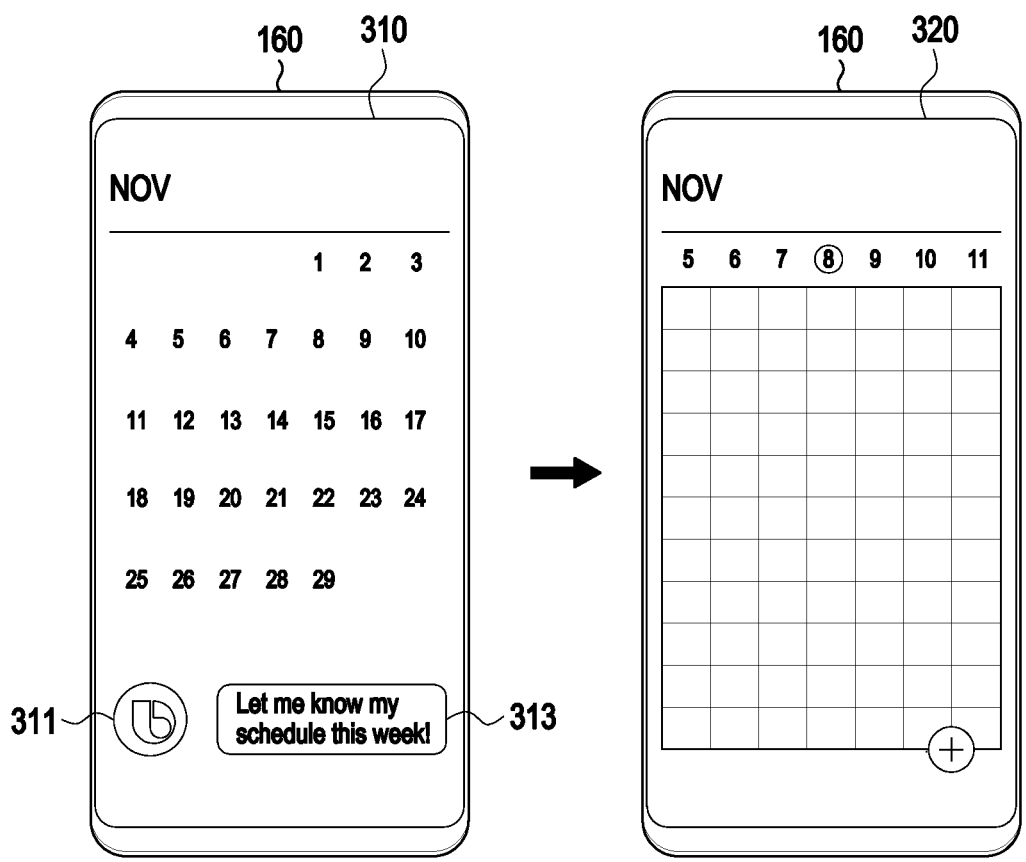
FIG. 4 illustrates screens in which a user terminal processes a speech input received through an intelligent app according to various embodiments.

FIG. 4 illustrates screens in which a user terminal processes a speech input received through an intelligent app according to various embodiments.

Referring to FIG. 4, the user terminal 160 may execute an intelligent app in order to process a user input through the intelligent server 200.

According to an embodiment, when the user terminal 160 recognizes a predetermined voice input (for example, wake up!) or receives an input through a hardware key (for example, a dedicated hardware key) in the screen 310, the user terminal 160 may execute an intelligent app for processing the voice input. The user terminal 160 may execute the intelligent app in the state in which, for example, a schedule app is executed. According to an embodiment, the user terminal 160 may display an object 311 (for example, an icon) corresponding to the intelligent app on the display 163. According to an embodiment, the user terminal 160 may receive the voice input by a user utterance. For example, the user terminal 160 may receive a voice input "Let me know my schedule this week". According to an embodiment, the user terminal 160 may display a User Interface (UI) 313 (for example, an input window) of the intelligent app displaying text data of the received voice input on the display.

According to an embodiment, in a screen 320, the user terminal 160 may display the result corresponding to the received voice input on the display. For example, the user terminal 160 may receive a plan corresponding to the received user input and display the "this week's schedule" on the display according to the plan.

Hereinafter, an example of devices included in the IoT system is described with reference to FIGS. 5A and 5B. Since the description of the IoT system illustrated in FIG. 1 and the integrated intelligence system illustrated in FIGS. 2 and 3 can be applied to the IoT system, an overlapping description is omitted.

Figure 5A:
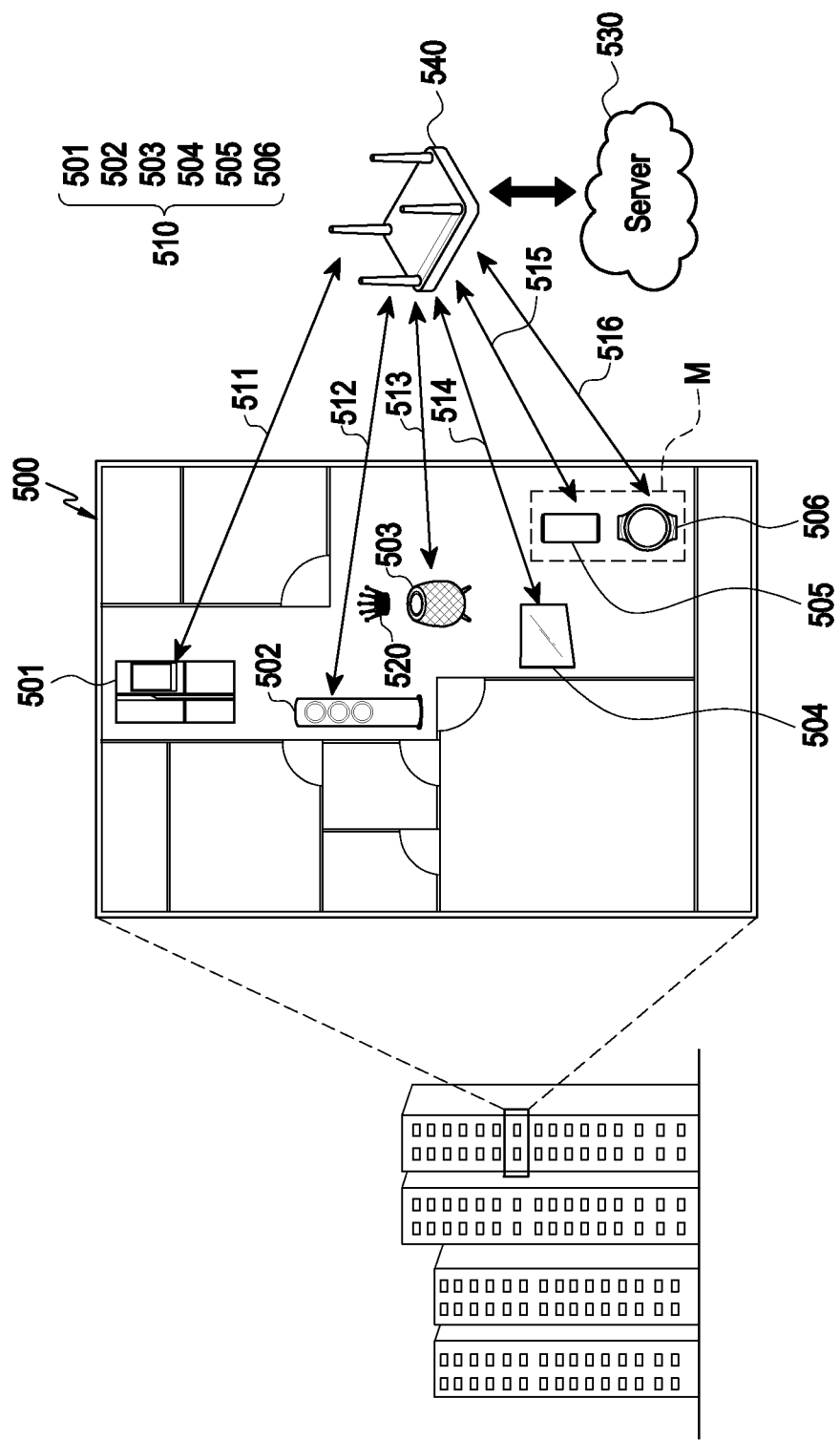
FIG. 5A illustrates an example of devices included in an IoT system according to various embodiments.

FIG. 5A illustrates example devices included in an IoT system according to various embodiments. According to various embodiments, the IoT system may be implemented to include more devices or fewer devices, and is not limited to the devices illustrated in FIG. 5A.

Figure 5B:
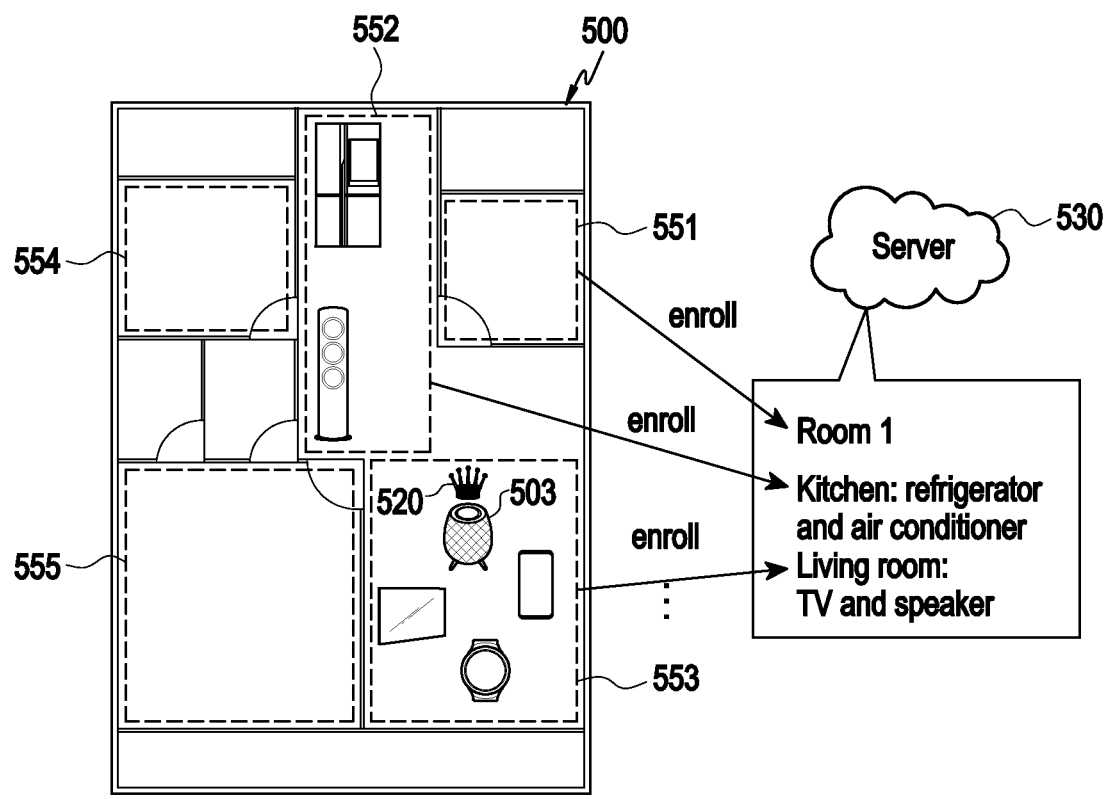
FIG. 5B illustrates an environment in which an IoT system is implemented according to various embodiments.

FIG. 5B illustrates an environment in which an IoT system according to various embodiments is implemented.

According to various embodiments, the IoT system may be implemented in a specific environment 500 and may include a plurality of electronic devices 510 and an intelligent server 530. The IoT system may be implemented within the home as illustrated in FIG. 5A or may be implemented in various environments (for example, office, factory, building, inside of traffic means, and outdoor environment), but is not limited thereto.

Hereinafter, a plurality of electronic devices 510 are first described.

According to various embodiments, the plurality of electronic devices 510 may include various types of electronic devices which can be included in the environment 500 in which the IoT system is implemented. For example, the plurality of electronic devices 510 may include not only electronic devices (for example, a refrigerator 501, an air conditioner 502, a speaker 503, and a TV 504 illustrated in FIG. 5A) in the type positioned at a fixed location but also electronic devices (M (movable), for example, a smart phone 505 and a wearable device 506 illustrated in FIG. 5A) in the type of which a location is always changed. The plurality of electronic devices 510 are not limited thereto, and may further include various types of devices (for example, a robot cleaner, a smart window, smart lighting, and various products) which can be included within the environment 500 in which the IoT system is implemented.

According to various embodiments, each of the plurality of electronic devices 510 may establish a communication connection. For example, the plurality of electronic devices 510 may establish communication connections 511, 512,

513, 514, 515, and 516 through a wireless communication scheme (for example, Wi-Fi) using an Access Point (AP) 540 or a repeater as illustrated in FIG. 5A. Each of the plurality of electronic devices 510 is not limited thereto, and may establish a communication connection through a wireless communication scheme (for example, Bluetooth) for a direct connection therebetween. The plurality of electronic devices 510 establishing the communication connection therebetween may configure at least one communication network. At this time, some of the plurality of electronic devices 510 may escape from the configured communication network or another electronic device may join in the configured communication network. For example, when some of the plurality of electronic devices move and thus are positioned at a location (or location outside the environment 500 in which the IoT system is implemented) at which the communication connection with the remaining electronic devices cannot be established, the communication connection of some of the plurality of electronic devices 510 is released and the plurality of electronic devices 510 may escape from the communication network. When another external electronic device is positioned at a location (or location within the environment in which the IoT system is implemented) at which the communication connection with the plurality of electronic devices 510 can be established, the other electronic device may establish the communication connection with the plurality of electronic devices 510 and join in the communication network. Each of the plurality of electronic devices 510 may transmit information (for example, information related to a user utterance and information on a state of the electronic device) to another electronic device included in the communication network on the basis of the communication connection, which will be described below.

According to various embodiments, at least some of the plurality of electronic devices 510 may provide various intelligent services (for example, speech recognition services). For example, at least some of the plurality of electronic devices 510 may include a program (for example, an intelligent service provision module 613 described below) for providing an intelligent service. At least some of the plurality of electronic devices 510 may receive a user utterance on the basis of execution and/or driving of the program, process the received user utterance, and provide the speech recognition service corresponding to the user utterance according to the processing result. For example, when receiving a first user utterance including a specific word (or a start word) for providing the speech recognition service (or executing a program for providing the intelligent speech service), at least some of the plurality of electronic devices 510 may perform an operation of identifying a device to be woken up. The term "woken-up" of the electronic device may mean that a state of the electronic device is switched to a state in which a user utterance for control can be acquired and processed (in other words, a state in which speech recognition and a service based on the speech recognition can be provided or a listening state for recognizing and processing the user utterance for control). For example, among the plurality of electronic devices 510, a woken-up electronic device may receive a second user utterance for controlling and transmitting the second user utterance to the intelligent server 530 described below. Some of the plurality of electronic devices 510 may receive information on the result of processing the second user utterance from the intelligent server 530 and provide a service corresponding to the second user utterance (for example, perform a specific function of the electronic device) on the basis of the received information. Since the operation of providing the speech recognition service by at least some of the plurality of electronic devices 510 may be performed as illustrated in FIGS. 2 to 4, an overlapping description is omitted. At this time, at least some of the remaining electronic devices 510 of the plurality of electronic devices 510 included in the IoT system may not provide the intelligent service. For example, a program for providing the intelligent service may not be installed in at least some of the remaining electronic devices of the plurality of electronic devices 510.

According to various embodiments, a role of each of the plurality of electronic devices 510 may be configured within the IoT system. For example, at least one device (for example, 503) of the plurality of electronic devices 510 may be configured as a "main device" 520 (or a master device) and the remaining devices may be configured as "sub devices" (or slave devices). The electronic device (for example, 503) configured as the main device 520 may receive information (for example, information related to a user utterance) from the remaining sub devices (for example, 501, 502, 504, 505, and 506) and overall control an intelligent service provision operation of the plurality of electronic devices 510 on the basis of the received information. For example, when a user utterance (for example, a user utterance within an environment in which the IoT system is implemented) is generated, the main device 520 may receive information related to the user utterance (for example, information on the strength of the user utterance) from at least some of the sub devices and identify a device to be woken up among the sub devices on the basis of the received information. For example, the main device 520 may accumulate information (for example, reception time information, information on a device re-identified as the device to be woken up, information on a state of each device, SNR information, and priority information described below) acquired during the operation of identifying the device to be woken up among the sub devices and change values (for example, a time interval or a priority described below) used when the operation of identifying the device to be woken up is performed on the basis of the accumulated information. Each of the accumulated information is described below. The main device 520 may transfer some of the accumulated information to the intelligent server 530 and thus the information may be accumulated in the intelligent server 530.

According to various embodiments, a configuration of the "main device" and the "sub device" may be automatically or manually performed. For example, when the plurality of electronic devices 510 are registered, the intelligent server 530 may automatically configure the main device 520 on the basis of information on the plurality of electronic devices (for example, information on a processing capability and information on a priority to be identified as the device to be woken up). For example, the intelligent server 530 may configure a device having the highest processing capability as the main device 520. In another example, the intelligent server 530 may configure a device having the lowest priority to be identified as the device to be woken up as the main device 520. In another example, when the user registers the plurality of electronic devices 510, one of the plurality of electronic devices 510 may be configured as the main device 520. When the main device 520 is configured among the plurality of electronic devices 510, the remaining devices of the plurality of electronic devices may be automatically configured as sub devices. The intelligent server 530 may store information on a role (main device or sub device)

configured for each of the plurality of electronic devices 510 and transmit the stored information to the main device 520.

When the number of electronic devices receiving a wake-up utterance is plural, a situation may occur in which the intelligent server 530 should process all speech information transmitted by the plurality of electronic devices 510. When all speech information transmitted by the plurality of electronic devices 510 is processed, a load of the intelligent server 530 may increase and a time spent for processing the speech information by the intelligent server 530 may increase. As described above, the load of the intelligent server 530 may be reduced as the electronic device configured as the "main device" 520 identifies the device (for example, device to be woken up) to provide the speech recognition service. The other devices which are not woken up may not provide the speech recognition service (for example, do not switch to the listening state).

Hereinafter, the intelligent server 530 is described.

According to various embodiments, the intelligent server 530 may receive information on the user utterance from the plurality of electronic devices 510, process the received user utterance, and generate information for providing the service. For example, the intelligent server 530 may convert the user utterance into text on the basis of a text conversion algorithm (for example, an Auto Speech Recognition (ASR) algorithm) and analyze a meaning of the converted text on the basis of a natural language understanding algorithm (for example, a Natural Language Understanding (NLU) algorithm). The intelligent server 530 may identify information (for example, a plan for performing a plurality of operations) for providing the service corresponding to the analyzed meaning and transmit the identified information to the plurality of electronic devices 510. For example, as described above, the plan may include a plurality of actions for performing a task corresponding to the user's speech input and a plurality of concepts related to the plurality of actions. Accordingly, the plurality of electronic devices 510 may sequentially provide at least one function on the basis of the identified information. Since the description of the intelligent server 200 illustrated in FIGS. 2 to 4 can be applied to the intelligent server 530, an overlapping description is omitted.

According to various embodiments, the intelligent server 530 may register the plurality of electronic devices 510. For example, when each of the electronic devices establishes a communication connection, the intelligent server 530 may automatically receive identification information (for example, International Mobile Equipment Identity (IMEI), Media Access Control (MAC) address, and Internet Protocol (IP) address) from each of the electronic devices and register each of the electronic devices on the basis of the received identification information. Alternatively, the intelligent server 530 may receive identification information of the plurality of electronic devices 510 from the user terminal (for example, a smart phone) used by the user (for example, a user using the IoT system) and register the electronic devices on the basis of the received identification information.

At this time, the intelligent server 530 may classify the plurality of electronic devices 510 according to the location thereof and register and/or manage the same. For example, the plurality of electronic devices 510 may be classified according to the location (for example, rooms 551, 554, and 555, kitchen 552, and living room 553) in the environment (for example, within the home) in which the IoT system is implemented as illustrated in FIG. 5B. When the plurality of electronic devices 510 are registered, the intelligent server 530 may make a request for information on the location at which the plurality of electronic devices 510 are positioned to the plurality of electronic devices 510 and receive information on the location on the basis of the location. For example, the plurality of electronic devices 510 may receive information on the location of the plurality of electronic devices 510 from the user and store the same, and the intelligent server 530 may make a request for information on the location to each of the plurality of electronic devices 510 and receive the information. In another example, the plurality of electronic devices 510 may make a request for information on the location of the plurality of electronic devices 510 to the user terminal used by the user and receive the information on the location of the plurality of electronic devices 510 input into the user terminal by the user from the user terminal. Accordingly, the intelligent server 530 may classify or group the plurality of electronic devices 510 according to the location (for example, room or living room) of the plurality of electronic devices 510 and register (enroll) and/or manage the information on the plurality of electronic devices 510 according to the location thereof.

According to various embodiments, the server 530 may transfer information on the plurality of registered electronic devices 510 to the main device 520 and allow the main device 520 to identify registered sub devices. Alternatively, the main device 520 is not limited thereto, and does not receive information on the plurality of electronic devices 510 from the intelligent server 530 but may directly receive identification information of sub devices from the sub devices and store the same.

Hereinafter, an example of the elements included in the electronic device 510 included in the IoT system is described. Meanwhile, elements of the electronic device 101 illustrated in FIG. 25 may be further included as well as the elements included in the electronic device 510 illustrated in FIG. 6.

Figure 6:
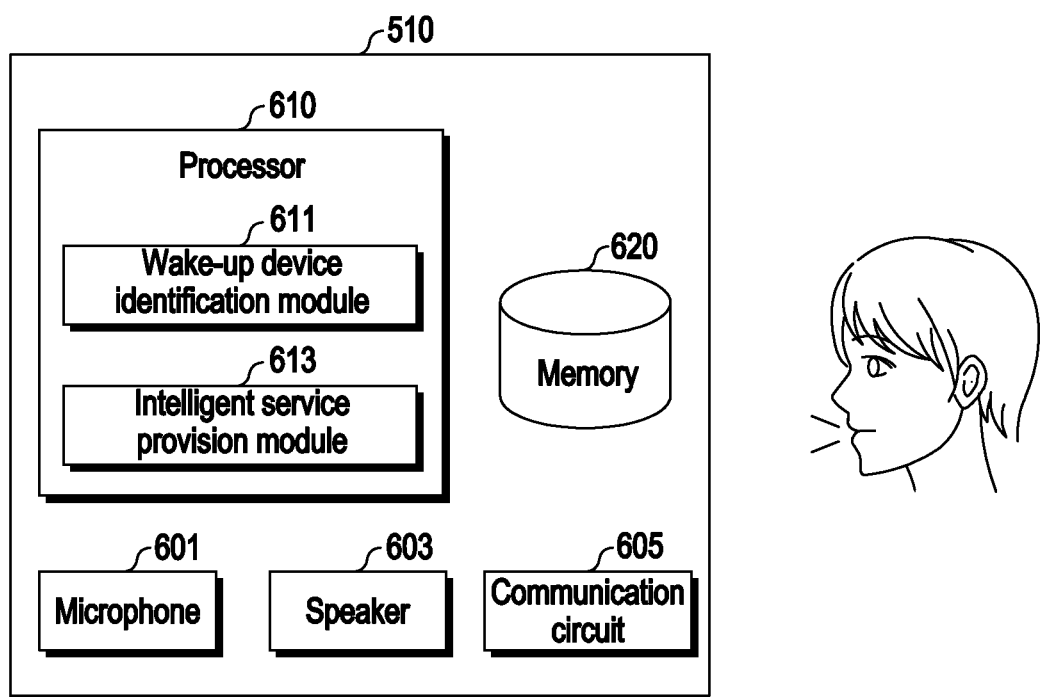
FIG. 6 illustrates an example of elements of an electronic device included in an IoT system according to various embodiments.

FIG. 6 illustrates an example of elements of an electronic device included in an IoT system according to various embodiments. According to various embodiments, the electronic device is not limited to the devices illustrated in FIG. 6, and may be implemented to include more elements or fewer elements. Hereinafter, FIG. 6 is described in more detail with reference to FIG. 7. For example, the electronic device 510 may be implemented to not include at least one element (for example, a microphone 601 and a wake-up device identification module 611) according to the implementation purpose. For example, the electronic device 510 may be implemented to not include the wake-up device identification module 611.

Figure 7:
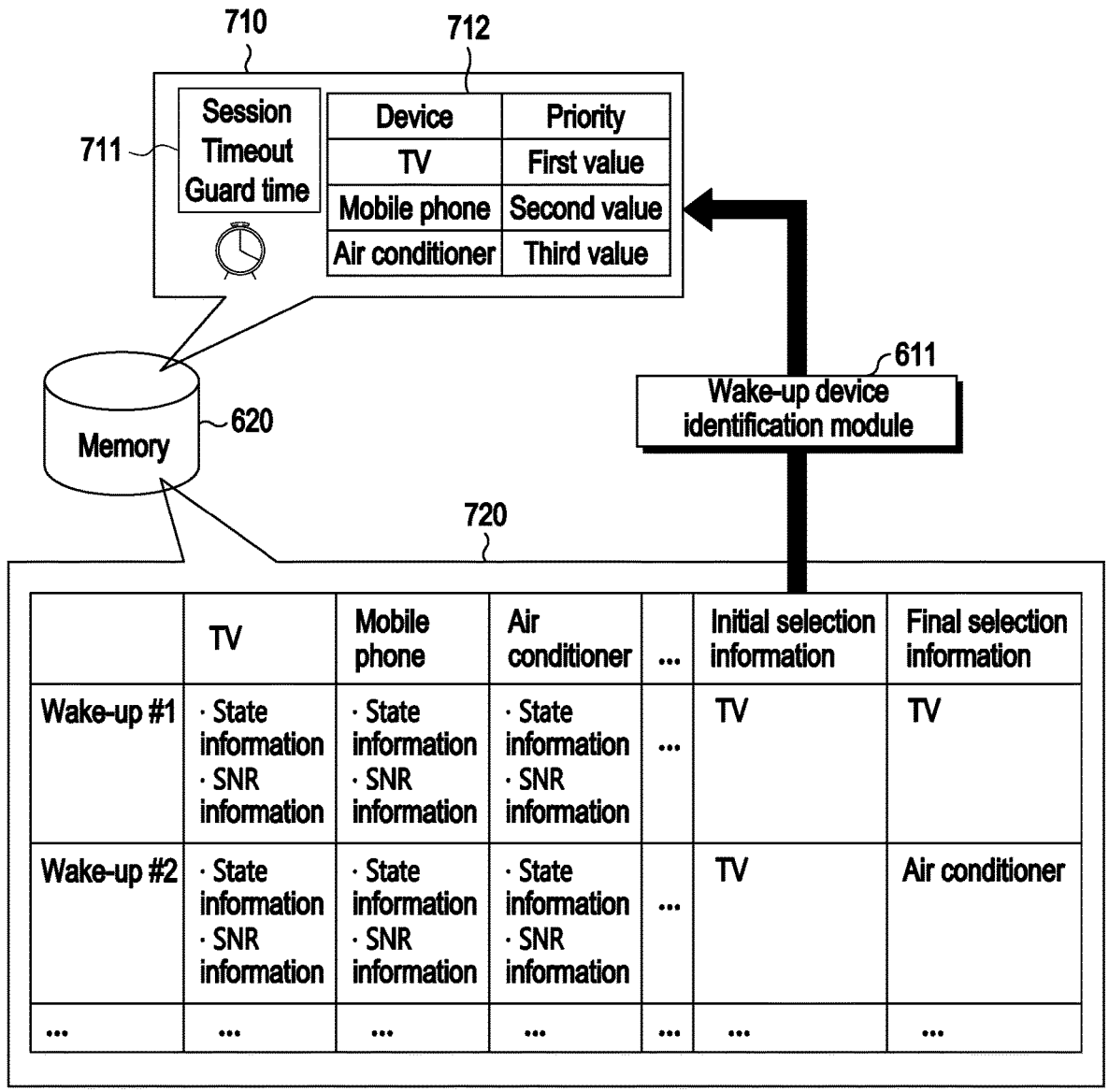
FIG. 7 illustrates an example of an operation in which an electronic device configures values used in a wake-up operation according to various embodiments.

FIG. 7 illustrates an example of an operation for configuring values used for a wake-up operation of an electronic device configured as a "main device" according to various embodiments.

According to various embodiments, the electronic device 510 may include the microphone 601, a speaker 603, a communication circuit 605, a processor 610 including the wake-up device identification module 611 and an intelligent service provision module 613, and a memory 620.

According to various embodiments, the electronic device 510 may receive a user utterance through the microphone 601.

According to various embodiments, the electronic device 510 may output a sound through the speaker 603. For example, when the electronic device 510 is woken up, the electronic device may output a sound for informing of the wake-up through the speaker 603. In another example, when sound information is received according to a processing result of the user utterance from the intelligent server 530, the electronic device 510 may output the sound through the speaker 603 on the basis of the received sound information.

According to various embodiments, the plurality of electronic devices 510 may configure the communication connection with other electronic devices 510 included in the IoT system through the communication circuit 605 and transmit and/or receive information (for example, information related to the user utterance). The information related to the user utterance may include information indicating the strength of the user utterance. For example, the information indicating the strength of the user utterance may include information on a Signal to Noise Ratio (SNR) of the user utterance or information on the quality of the user utterance. The quality of the user utterance may indicate a level of clearness of the user utterance.

Hereinafter, the processor 610 included in each of the plurality of electronic devices 510 is described. According to various embodiments, modules (for example, the wake-up device identification module 611 and the intelligent service provision module 613) included in the processor 610 of the plurality of electronic devices 510 may be stored in a storage unit (for example, the memory 620) of the electronic device 510 in the form of an application, a program, a computer code, instructions, a routine, or a process which can be executed by the processor 610 of the electronic device 510. When the modules are executed by the processor 610, the modules may cause the processor 610 to perform operations related to the modules. Hereinafter, each element included in the processor 610 is described.

The wake-up device identification module 611 and the intelligent service provision module 613 described below may be implemented as at least a portion of the client module 171.

According to various embodiments, the wake-up device identification module 611 may identify a device to be woken up among sub devices included in the IoT system. For example, the wake-up device identification module 611 may identify the device to be woken up among external electronic devices 510 on the basis of information received from the external electronic devices 510 (for example, information related to the user utterance) and values 710 used for the operation of identifying the device to be woken up. The values 710 used for the operation of identifying the device to be woken up may be pre-stored in the memory 620 as illustrated in FIG. 7 and may include information 711 on the time and information 712 on priorities of the plurality of electronic devices. The information 711 on the time may include information on at least one of one session, a first time interval (time-out) included in one session for identifying the device to be woken up, or a second time interval (guard time) which is the remaining time other than the first time (time-out). The information 712 on the priorities may indicate a preference of the plurality of external electronic devices to be identified as the device to be woken up, and a device having a relatively high priority has a higher possibility to be identified as the device to be woken up. Detailed examples of the operation of identifying the device to be woken up among the external electronic devices 510 on the basis of information received from the external electronic devices 510 of the wake-up device identification module (for example, information related to the user utterance) and the values 710 used for the operation of identifying the device to be woken up are described below.

According to various embodiments, the wake-up device identification module 611 may configure and/or change the values 710 for identifying the device to be woken up (for example, the information 711 on the time interval and the information 712 on the priorities) on the basis of accumulated information 720. Referring to FIG. 7, the accumulated information 720 may include information (not shown) on a reception time point of information received from external electronic devices acquired during operations of identifying the wake-up device, information on the state of each device (for example, a power state, a battery state, a temperature state, and an app execution state), SNR information, information on priorities, initial selection information (for example, a device identified as the device to be initially woken up during the operation of identifying the device to be woken up), and final selection information (for example, a device identified as the device to be finally woken up during the operation of identifying the device to be woken up). The wake-up device identification module 611 may configure the information 710 on the time interval and the information 712 on the priorities on the basis of the accumulated information 720, which is described below.

For example, the accumulated information 720 may be as shown in Table 1 below.

TABLE 1

| Wake-up operation | TV | | | | Mobile phone | | | Air conditioner | | | | initially selected | finally selected |
|---|---|---|---|---|---|---|---|---|---|---|---|---|---|
| | | | | | | | | current temper- | setting temper- | | | | |
| number | power | vol | SNR | priority | app_state | SNR | priority | ature | ature | SNR | priority | device | device |
| #1 | on | 10 | −10 db | 0.3 | Youtube | −98 db | 0.8 | 20 | 20 | −48 db | 0.4 | Speaker | Speaker |
| #2 | off | N/A | −98 db | 0.3 | sleep | −10 db | 0.8 | 30 | 18 | −105 db | 0.4 | air conditioner | air conditioner |

According to various embodiments, the intelligent service provision module 613 may be implemented to provide the speech recognition service. When the intelligent service provision module 613 is implemented in the form of a program or an application and then executed, the intelligent service provision module may perform an operation of providing the speech recognition service. Since the speech recognition service has been described above, an overlapping description is omitted.

Hereinafter, an example of the operation of electronic devices included in the IoT system according to various embodiments is described. According to various embodiments, the main device 520 among the electronic devices included in the IoT system may receive information on a user utterance from other sub devices 521 (see FIG. 8), identify a device to be woken up on the basis of the received information, and transmit a message (or signal) for waking up the identified device to the identified device. The woken-up device may provide an intelligent service on the basis of reception of the user utterance for control from the user and transmission of the received user utterance to the intelligent server 530. It is described that an electronic device 901 below is the "main device" 520 and external electronic devices (for example, a first external electronic device 902, a second external electronic device 903, and a third external electronic device 904) are the "sub devices" 521 by way of example.

Figure 8:
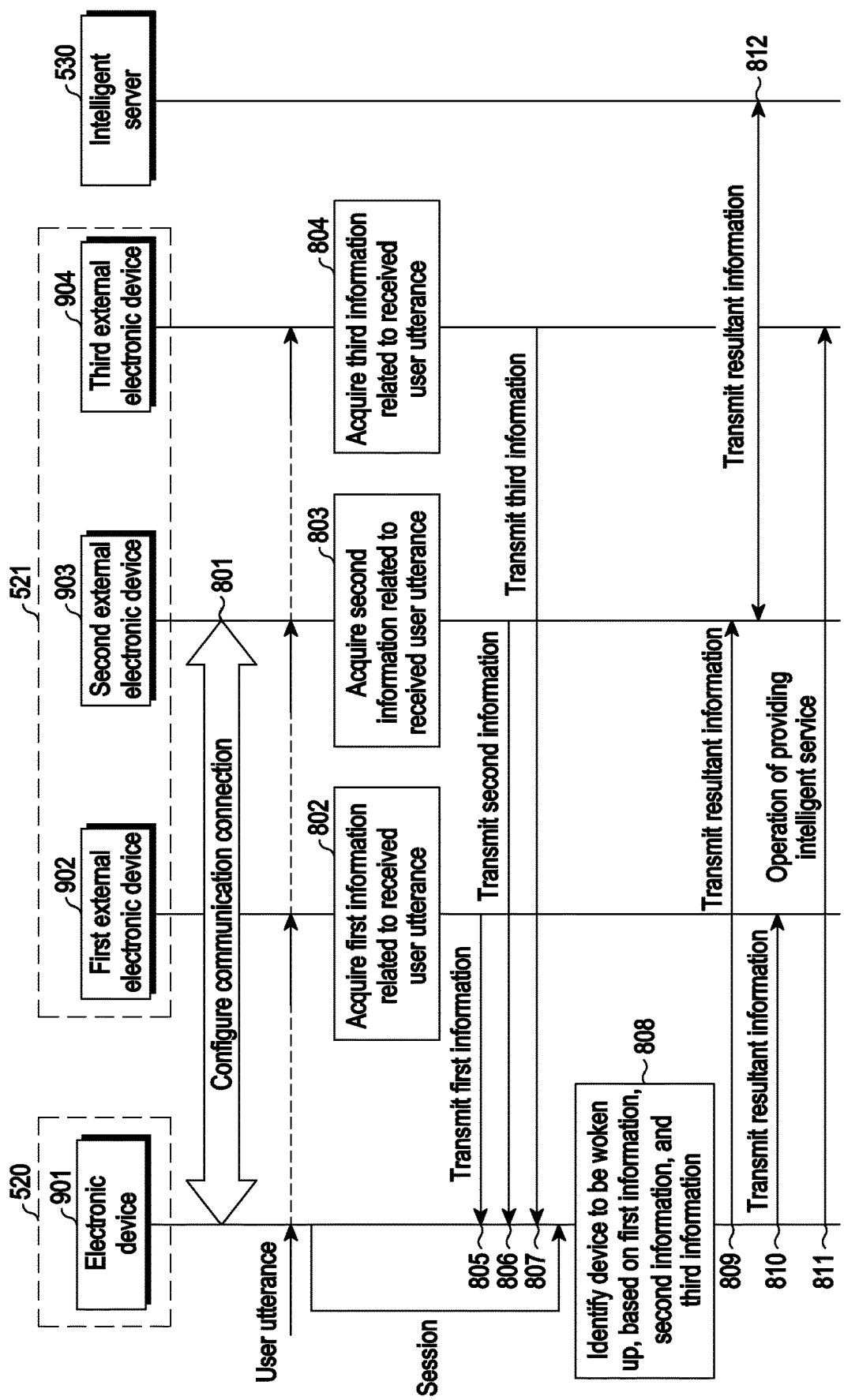
FIG. 8 is a flowchart illustrating an example of an operation of electronic devices included in an IoT system according to various embodiments.

FIG. 8 is a flowchart illustrating an example of an operation of electronic devices included in an IoT system according to various embodiments. According to various embodiments, the operations illustrated in FIG. 8 are not limited to the illustrated order but may be performed in various orders. Further, according to various embodiments, more operations than the operations illustrated in FIG. 8 may be performed, or at least one operation that is fewer than the illustrated operations may be performed. Hereinafter, FIG. 8 is described with reference to FIGS. 9A and 9B.

Figure 9A:
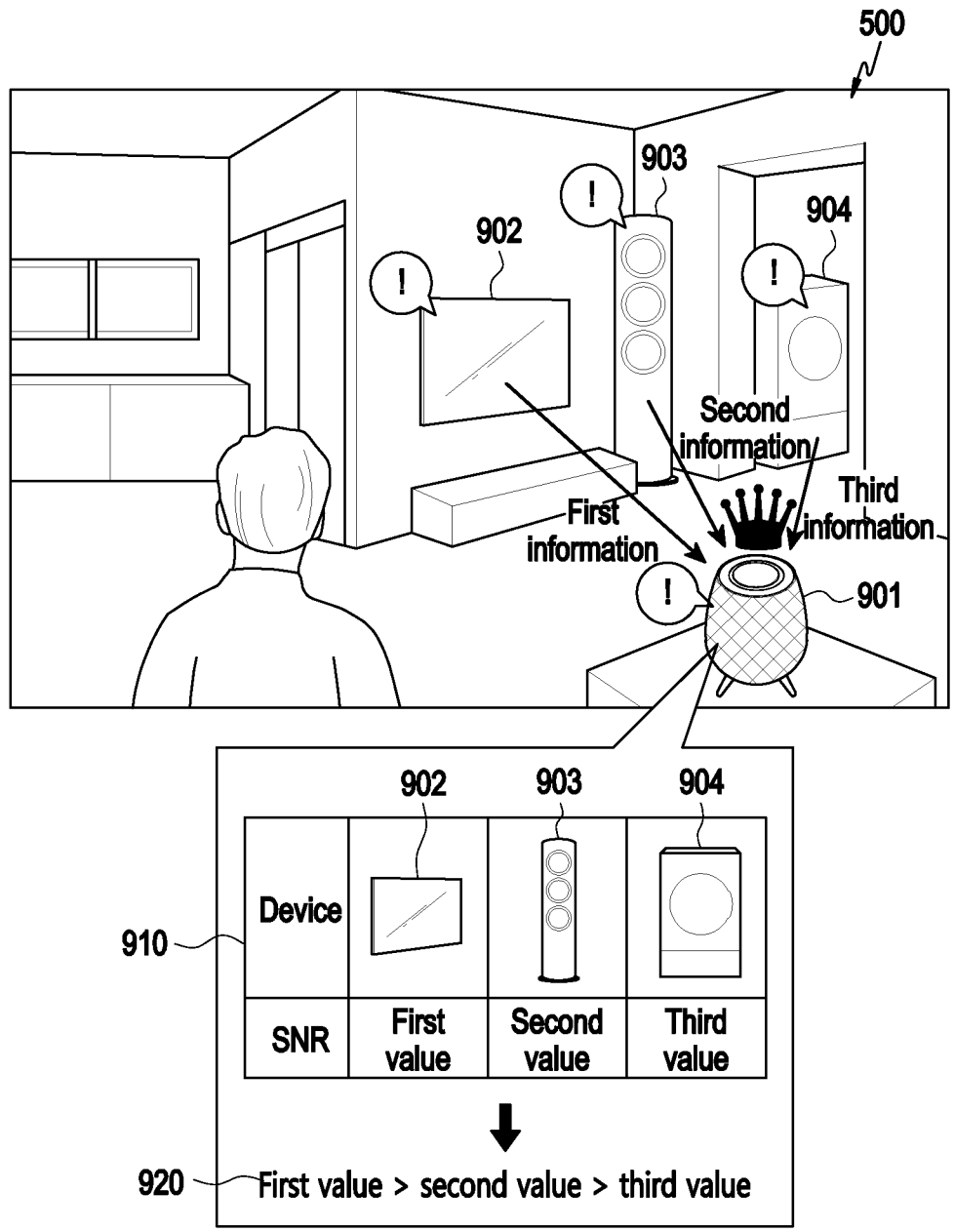
FIG. 9A illustrates an example of an operation in which a main device receives information on a user utterance from sub devices according to various embodiments.
Figure 9B:
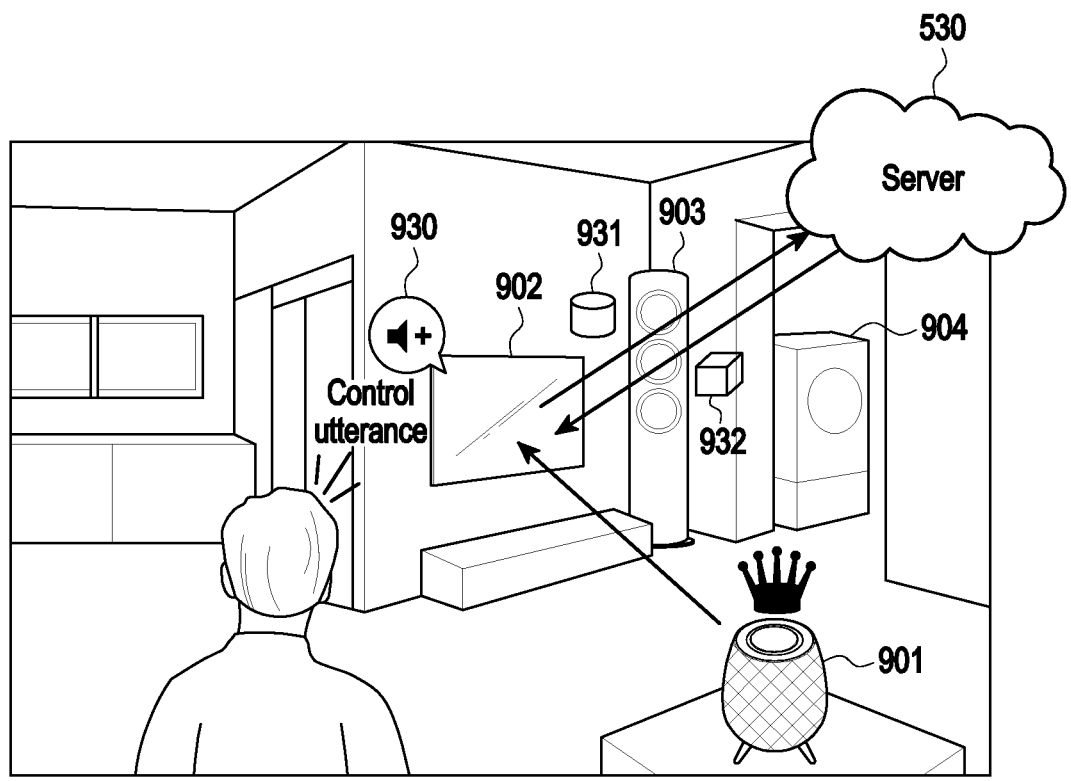
FIG. 9B illustrates an example of an operation in which a sub device provides a speech service according to various embodiments.

FIG. 9A illustrates an example of an operation in which a main device receives information on a user utterance from sub devices according to various embodiments. FIG. 9B illustrates an example of an operation in which a sub device provides a speech service according to various embodiments.

According to various embodiments, the electronic device 901 (for example, the main device 520) may configure the communication connection with other external electronic devices (for example, the sub device 521 and the first to third external electronic devices 902, 903, and 904) in operation 801. For example, referring to FIG. 9A, there may be a plurality of electronic devices 901, 902, 903, and 904 in one environment 500 (for example, within the home). Among the plurality of electronic devices 901, 902, 903, and 904, one electronic device (for example, 901) may be configured as the "main device 520" and the other remaining electronic devices (for example, 902, 903, and 904) may be configured as the "sub devices 521". Since the operation of configuring one of the plurality of electronic devices 901, 902, 903, and 904 as the "main device 520" and the operation of configuring the remaining electronic devices as the "sub devices 521" may be automatically or manually performed, which is the same as the description of FIG. 5B, an overlapping description is omitted. The "main device 520" may configure the communication connection with the other remaining "sub devices 521".

According to various embodiments, external electronic devices (for example, the first external electronic device 902, the second external electronic device 903, and the third external electronic device 904) may acquire information (for example, first information, second information, and third information) related to a user utterance in operation 802, operation 803, and operation 804. For example, referring to FIG. 9A, the user may speak a specific word (for example, a start word) within the environment 500 including a plurality of electronic devices (for example, the electronic device 901, the first external electronic device 902, the second external electronic device 903, and the third external electronic device 904). The plurality of external electronic devices 902, 903, and 904 may receive a user utterance including the specific word (for example, the start word) through the microphone. The plurality of external electronic devices may convert the acquired user utterance into text, recognize the specific word (for example, the start word), and execute and/or drive a program (for example, the intelligent service provision module 613) for providing the speech service. Alternatively, the plurality of external electronic devices 902, 903, and 904 are not limited thereto, and may receive the user utterance while the program for providing the speech service is continuously executed. The plurality of external electronic devices 902, 903, and 904 may generate information related to the acquired user utterance on the basis of acquisition of the user utterance including the specific word. The information related to the user utterance may include information indicating the strength of the user utterance. For example, the information indicating the strength of the user utterance may include information on a Signal to Noise Ratio (SNR) of the user utterance and/or information on the quality of the user utterance, but the type thereof has no limitation. The quality of the user utterance may indicate a level of clearness of the user utterance.

According to various embodiments, the electronic device may receive information related to the user utterance (for example, first information, second information, and third information) from the plurality of external electronic devices (for example, the first external electronic device 902, the second external electronic device 903, and the third external electronic device 904) in operation 805, operation 806, and operation 807. For example, the electronic device 901 may execute a program on the basis of reception of the information related to the user utterance (for example, initial reception of the information related to the user utterance from the first external electronic device 902) from one of the plurality of external electronic devices 902, 903, and 903. In another example, the electronic device 901 may also recognize the specific word included in the user utterance and execute the program for providing the speech service on the basis of reception of the user utterance through the microphone. The state of the electronic device 901 may be configured and/or switched to the state for processing the information related to the user utterance received from other external electronic devices 902, 903, and 904 on the basis of the execution of the program. For example, the electronic device 901 may configure and/or initiate a session for processing the information related to the user utterance of the electronic device 901. That is, the electronic device 901 may configure and/or initiate the session from a time point at which the information related to the user utterance is initially received from the external electronic device (for example, the first external electronic device 902) or a time point at which the user utterance is received through the microphone. The session is a time for processing a user utterance, and information received after the session may be identified as information related to another user utterance that is not the user utterance. The electronic device 901 may initiate the operation of receiving information on the user utterance (for example, first information, second information, and third information) for one session and identifying a device to be woken up among the external electronic devices 902, 903, and 904 corresponding to the information on the user utterance (for example, the first information, the second information, and the third information). For example, the electronic device 901 may classify and/or manage the external electronic devices 902, 903, and 904 corresponding to the information received for the one session as a group for one user utterance and identify the device to be woken up by the user utterance among the external electronic devices classified as the group. In other words, when the electronic device receives information after one session, the electronic device may identify the device to be woken up on the basis of only the information received for the one session except for information received after the one session. The electronic device may identify the device to be woken up in another session on the basis of information received after one session (for example, information received for another session). The session may include time-out and guard time, and the time-out and the guard time may be changed on the basis of information acquired and/or accumulated during the operation of identifying the device to be woken up, previously performed by the electronic device 901, which is described below with reference to FIGS. 13 to 15. Meanwhile, the electronic device 901 may receive information related to the external electronic devices 902, 903, and 904 (for example, identification information of the external electronic devices and information on states of the external electronic devices) from the external electronic devices 902, 903, and 904 as well as the information related to the user utterance and identify the device to be woken up on the basis thereof, which is described below with reference to FIGS. 21 to 23.

According to various embodiments, the electronic device 901 may identify the device to be woken up on the basis of a plurality of pieces of information related to the user utterance (for example, first information, second information, and third information) in operation 808. For example, the electronic device 901 may identify SNR values (for example, a first value, a second value, and a third value) of the plurality of external electronic devices (for example, the first external electronic device 902, the second external electronic device 903, and the third external electronic device 904) for the user utterance as indicated by reference numeral 910 of FIG. 9A and check the size relation between the identified SNR values as indicated by reference numeral 920 of FIG. 9A. The electronic device 901 may identify a device (for example, the first external electronic device 902) having the largest SNR value (for example, the first value) as the device to be woken up. Meanwhile, the electronic device 901 may identify the device to be woken up on the basis of information on the priorities of the plurality of external electronic devices 902, 903, and 904 as well as the size relation between the SNR values, and the priorities of the plurality of external electronic devices 902, 903, and 904 may be changed on the basis of information acquired and/or accumulated in the operation of identifying the device to be woken up, previously performed by the electronic device 901, which is described below with reference to FIGS. 16 to 18.

According to various embodiments, the electronic device may transmit resultant information acquired as the result of the operation of identifying the device to be woken up to the plurality of external electronic devices (for example, the first external electronic device 902, the second external electronic device, and the third external electronic device 904) in operation 809, operation 810, and operation 811. For example, the resultant information may include information for identifying the device to be woken up. Accordingly, the plurality of external electronic devices may identify the device to be woken up on the basis of the resultant information, and the external electronic device (for example, the first external electronic device 902) identified as the device to be woken up may be woken up to process the user utterance for control. Further, the remaining devices (for example, 903 and 904) which are not identified as the device to be woken up may end execution of the program for providing the executed speech service or may switch to the state in which the user utterance is not processed. The woken-up external electronic device 902 may provide information for informing of "wake-up". For example, the first external electronic device 902 may display a message for informing of "wake-up" on the display or output a sound for informing of "wake-up" through the speaker.

According to various embodiments, the external electronic device (for example, the first external electronic device 902) may provide the intelligent service (for example, the intelligent speech service) together with the intelligent server 530 in operation 812. For example, the woken-up electronic device (for example, 902) may receive a user utterance (for example, "turn up the volume") for control of the woken-up electronic device 902 through the microphone and transmit information 931 on the received user utterance to the intelligent server 530 as illustrated in FIG. 9B. The woken-up electronic device (for example, 902) may receive information 932 for providing a specific service acquired as the result of processing the user utterance from the intelligent server 530 and perform at least one operation 930 (for example volume up operation)(or perform a function of the woken-up electronic device (for example, 901)) on the basis of the received information 932. The information 932 for providing the specific service may include a plurality of actions for performing a task corresponding to the user's speech input and a plurality of concepts related to the plurality of actions as described above. For example, the woken-up electronic device (for example, 902) may receive the information 932 for providing the specific service acquired as the result of processing the user utterance from the intelligent server 530, and display a screen including specific information on the basis of the received information 932 or output a sound through the speaker.

As described above, as the electronic device configured as the "main device 520" selects an optimal device among a plurality of other external electronic devices configured as the "sub devices 521", a problem of waking up two or more external electronic devices by the user utterance may be solved. Accordingly, an operation in which external electronic devices which are unnecessary for the speech service among two or more woken-up external electronic devices provide the speech service may end, and thus the unnecessary load of the operation of the external electronic devices may be reduced.

Hereinafter, another example of the operation of the electronic device included in the IoT system according to various embodiments is described.

According to various embodiments, when the electronic device configured as the "main device" receives information related to the user utterance from the plurality of external electronic devices, the electronic device may identify the optimal device to be woken up among the plurality of external electronic devices on the basis of values (for example, time-out and priorities) used for the operation of identifying the device to be woken up as well as the information related to the user utterance. For example, the values may include information on a time interval (for example, time-out) for processing information related to the user utterance received from the plurality of external electronic devices or information on priorities of the plurality of external electronic devices to be selected as the device to be woken up. Further, the electronic device may configure the values on the basis of information acquired in the operation of identifying the device to be woken up, previously performed and thus allow the optimal electronic device to be identified as the device to be woken up within the environment in which the IoT system implemented.

Figure 10:
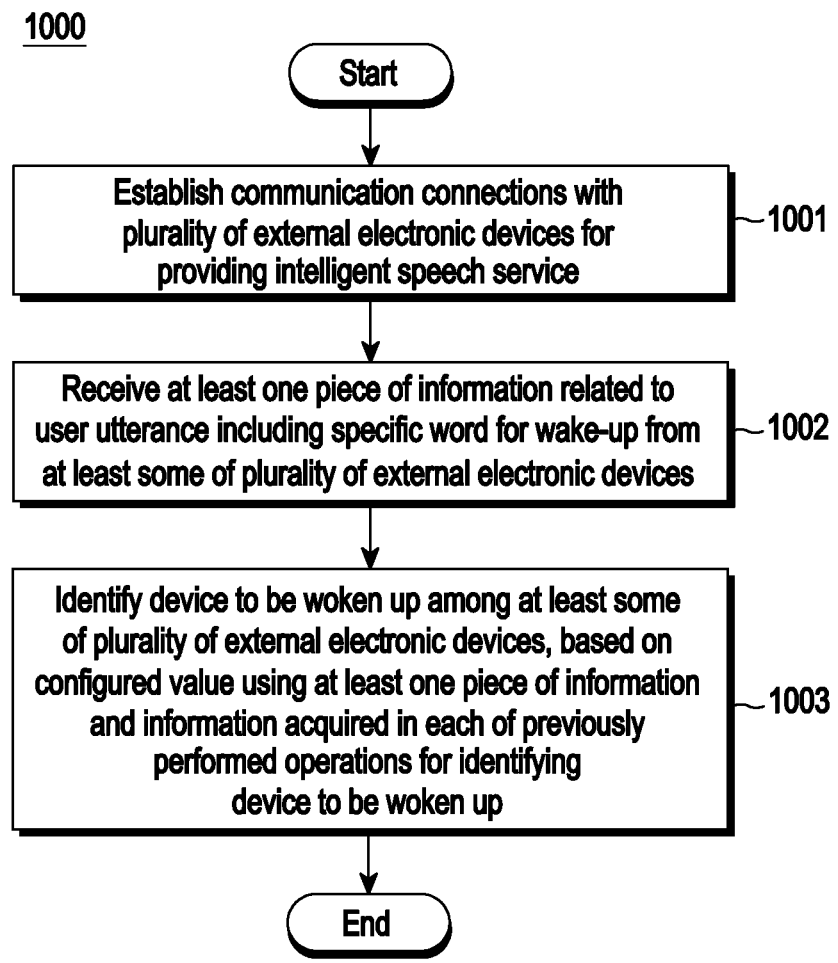
FIG. 10 is a flowchart illustrating an example of an operation of an electronic device according to various embodiments.

FIG. 10 is a flowchart illustrating an example of an operation of an electronic device according to various embodiments. According to various embodiments, in a method 1000, the operations illustrated in FIG. 10 are not limited to the illustrated order but may be performed in various orders. Further, according to various embodiments, more operations than the operations illustrated in FIG. 10 may be performed, or at least one operation that is fewer than the illustrated operations may be performed. Hereinafter, FIG. 10 is described with reference to FIGS. 11 and 12.

Figure 11:
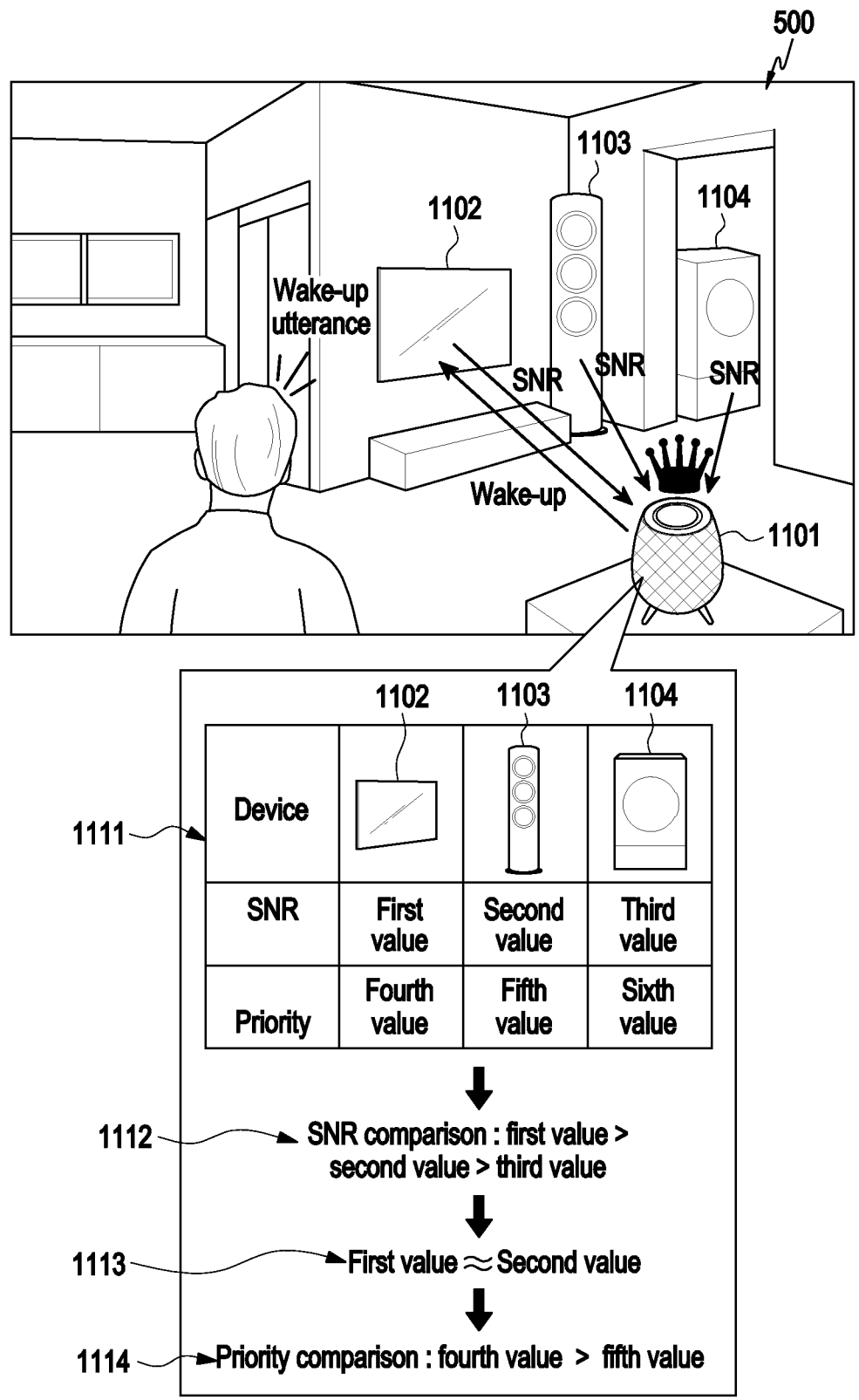
FIG. 11 illustrates an example of an operation in which an electronic device identifies a device to be woken up according to various embodiments.
Figure 12:
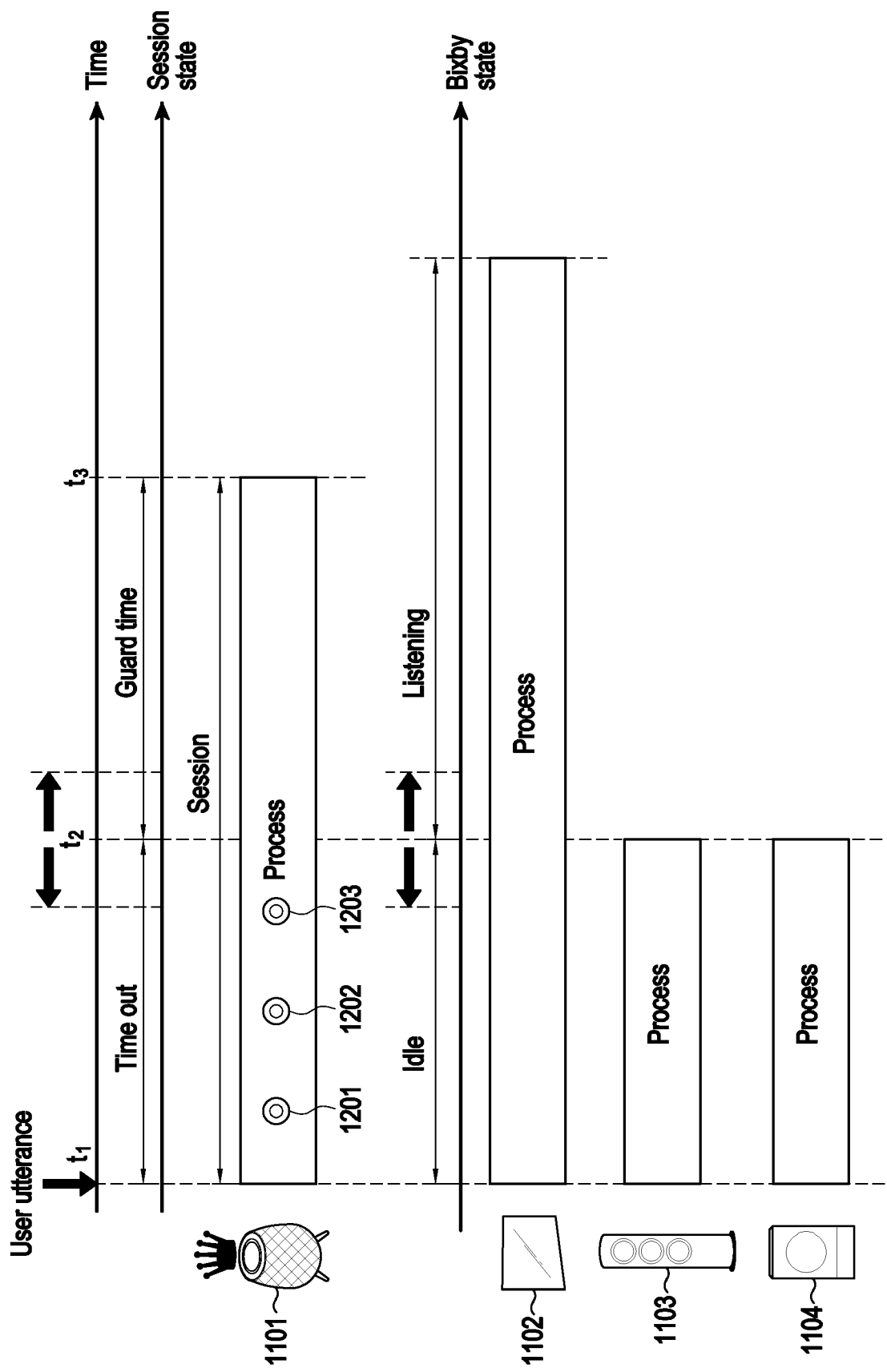
FIG. 12 illustrates an example of an operation in which an electronic device processes information related to a user utterance according to various embodiments.

FIG. 11 illustrates an example of an operation in which an electronic device configured as a "main device" identifies a device to be woken up according to various embodiments. FIG. 12 illustrates an example of an operation in which an electronic device configured as a "main device" processes information related to a user utterance according to various embodiments.

According to various embodiments, an electronic device (for example, the electronic device 1101) may configure the communication connection with a plurality of external electronic devices (for example, the external electronic devices 1102, 1103, and 1104) for providing an intelligent speech service in operation 1001. For example, the electronic device 1101 configured as the "main device" may configure the communication connection with other external electronic devices 1102, 1103, and 1104 included within an environment (for example, within the home) as illustrated in FIG. 11. Since operation 1001 of the electronic device 1101 may be performed identically as operation 801 of the electronic device 1101, an overlapping description is omitted.

According to various embodiments, the electronic device (for example, the electronic device 1101) may receive at least one piece of information related to a user utterance including a specific word (for example, a start word) for wake-up from at least some of the plurality of external electronic devices 1102, 1103, and 1104 in operation 1002. For example, as illustrated in FIG. 11, when the user speaks an utterance including a specific word (for example, a wake-up utterance), the electronic device 1101 may receive information (for example, information on the strength of the user utterance) related to the user utterance acquired by other external electronic devices 1102, 1103, and 1104 from other external electronic devices 1102, 1103, and 1104 on the basis of the communication connection. Since operation 1002 of the electronic device 1101 is performed identically as operations 805 to 807 of the electronic device 1101, an overlapping description is omitted.

According to various embodiments, the electronic device (for example, the electronic device 1101) may identify the device to be woken up among at least some of the plurality of external electronic devices 1102, 1103, and 1104 using a value configured on the basis of at least one piece of information and information acquired in each of the operations for identifying the device to be woken-up, previously performed in operation 1003. For example, the value is a value used when the operation of identifying the device to be woken-up is performed, and may include information on a predetermined time interval (for example, time-out) for identifying the device to be woken-up by processing information related to the user utterance received from the plurality of external electronic devices 1102, 1103, and 1104 and information on priories of the plurality of external electronic devices 1102, 1103, and 1104 to be selected as the device to be woken up. Hereinafter, the operation in which the electronic device 1101 identifies the device to be woken up on the basis of information on each time interval or information on priories is described.

Hereinafter, an example of the operation in which the electronic device 1101 identifies the device to be woken up on the basis of a predetermined time interval for processing information related to the user utterance received from the plurality of external electronic devices 1102, 1103, and 1104 is first described.

According to various embodiments, the electronic device 1101 may identify the device to be woken up by processing at least one piece of information (for example, 1201, 1202, and 1203) received during a predetermined time interval (time-out) among information related to the user utterance received from the external electronic devices 1102, 1103, and 1104. For example, the electronic device 1101 may receive information related to the user utterance from the plurality of external electronic devices 1102, 1103, and 1104 during one session from a time point at which information (for example, 1201) related to the user utterance is initially received from one external electronic device (for example, the first external electronic device 1102) among the plurality of external electronic devices 1102, 1103, and 1104 as illustrated in FIG. 12. In another example, the electronic device 1101 may receive a user utterance and receive information related to the user utterance from the plurality of external electronic devices 1102, 1103, and 1104 during one session on the basis of a program for providing the speech service from a time point at which the user utterance is received. The one session is a time for processing one user utterance, and information received after the one session may be identified as information related to another user utterance which is not the one user utterance. Since the session is the same as that described with reference to FIGS. 8, 9A, and 9B, an overlapping description is omitted. As illustrated in FIG. 12, when the information related to the user utterance is received from the external electronic device 1101, the one session may include a first time interval (time-out) in which the electronic device 1101 processes the information (for example, identify SNR values and check the size relation between the SNR values) to identify the device to be woken up and a second time interval (guard time) in which the electronic device 1101 does not process the information when receiving the information related to the user utterance from the external electronic device 1101. The electronic device 1101 may perform the operation of identifying the device to be woken up on the basis of information 1201, 1202, and 1203 (for example, SNR values) related to the user utterance of the external electronic devices 1102, 1103, and 1104 (for example, the first external electronic device 1102 and the second external electronic device 1103) received during the first time interval (time-out) as illustrated in FIG. 12. The first information 1201 may be received from the first external electronic device 1102, the second information 1202 may be received from the second external electronic device 1103, and the third information 1203 may be received from the third external electronic device 1104. The electronic device 1101 may identify the external electronic devices 1102, 1103, and 1104 corresponding to the information 1201, 1202, and 1203 received during the first time interval (time-out) as a candidate group of devices to be woken up by the user utterance and identify the device to be woken up among the external electronic devices 1102, 1103, and 1104 included in the candidate group on the basis of the information. The electronic device 1101 may transmit resultant information of the operation of identifying the device to be woken up to the external electronic devices 1102, 1103, and 1104. The plurality of external electronic devices 1102, 1103, and 1104 may execute a program for providing the speech service from a time point at which the user utterance is received and configure a state of the external electronic device 1101 (for example, a device state) as an idle state for receiving the resultant information as illustrated in FIG. 12. When the plurality of external electronic devices 1102, 1103, and 1104 receive the resultant information, the external electronic device (for example, the first external electronic device 1102) to be woken up may receive the user utterance for controlling and switching the idle state to a listening state for providing the speech recognition service, and the remaining external electronic devices 1101 may end execution of the program.

According to various embodiments, the electronic device 1101 may pre-configure and store information on the time interval and initiate and/or configure the session for performing the operation of identifying the device to be woken up on the basis of the information on the time interval. The information on the time interval may include at least one piece of information indicating a length of one session, information indicating a length of the first time interval (time-out) included in the one session, or information indicating a length of the second time interval (guard time). However, it is not limited thereto, and the information on the length of the time interval may indicate information on a length of one session and a ratio between the first time interval (time-out) and the second time interval (guard time) during one session.

At this time, the electronic device 1101 configured as the "main device" may dynamically change the length of the first time interval (time-out) as illustrated in FIG. 12. The time point at which the electronic device 1101 configured as the main device receives information 1201, 1202, and 1203 from the plurality of external electronic devices 1102, 1103, and 1104 may vary depending on a state of the communication connection between the electronic device 1101 and the plurality of external electronic devices 1102, 1103, and 1104, and the performance (for example, communication performance) of the external electronic device 1101. For example, when the state of the communication connection is poor and/or congested, or when the performance of the external electronic devices 1102, 1103, and 1104 is low, the electronic device 1101 may receive the information from the external electronic devices 1102, 1103, and 1104 after the first time interval (time-out). Accordingly, the electronic device 1101 may configure and/or change, and store information on the length of the first time interval (time-out) on the basis of the time point at which information on the user utterance is received from the external electronic devices 1102, 1103, and 1104 during a previous session (for example, a session before the current session or a session before the current time point). For example, the electronic device 1101 may extend or reduce the length of the conventional first time interval (time-out) on the basis of the time point at which the information on the user utterance is received from the external electronic devices 1102, 1103, and 1104 during the previous session. In other words, the current first time point (time-out) in which the electronic device 1101 identifies the device to be woken up may be configured after being changed from the conventional first time interval (time-out). Meanwhile, the first time interval (time-out) in the case in which the operation in which the electronic device 1101 performs the operation of identifying the device to be woken is performed may be a value preset in the electronic device 1101. Detailed examples of the operation in which the electronic device 1101 changes the length of the first time interval (time-out) are described below with reference to FIGS. 13 to 15. At this time, when the length of the session is maintained, the second time interval (guard time) may be automatically changed to the length of the remaining time other than the configured length of the first time interval (time-out). Alternatively, when the length of the session is variable, the length of the second time interval (guard time) is maintained, and the length of the session may be changed by an amount of the change in the length of the first time interval (time-out).

The number of candidate devices for identifying the device to be woken up may be appropriately controlled according to the dynamic change in the time-out or the time point at which the idle state of the external electronic device 1101 switches to the listening state may be appropriately controlled.

Hereinafter, an example of the operation in which the electronic device 1101 identifies the device to be woken up on the basis of a predetermined time interval for processing information related to the user utterance received from the plurality of external electronic devices 1102, 1103, and 1104 is described.

According to various embodiments, the electronic device 1101 may identify the device to be woken up among the plurality of external electronic devices 1102, 1103, and 1104 on the basis of information on priorities of the external electronic devices 1102, 1103, and 1104 (for example, a fourth value, a fifth value, and a sixth value) as well as the information on the user utterance received from the external electronic devices 1102, 1103, and 1104. For example, the electronic device 1101 may receive the user utterance having the high strength among the plurality of external electronic devices 1102, 1103, and 1104 and identify the external electronic device 1101 having the highest priority as the device to be woken up. For example, the electronic device 1101 may perform the operation of identifying information on SNR values of the user utterance (for example, the first value, the second value, and the third value) from the external electronic devices 1102, 1103, and 1104 (for example, the first external electronic device 1102, the second external electronic device 1103, and the third external electronic device 1104) as indicated by reference numeral 1111 of FIG. 11 and checking the size relation between the SNR values as indicated by reference numeral 1112 of FIG. 11. At this time, the SNR values of the user utterance (for example, the first value, the second value, and the third value) may be values received during the first time interval (time-out). The electronic device 1101 may identify a largest SNR value (for example, the first value) and an SNR value (for example, the second value) similar to the largest SNR value according to the comparison result between the SNR values as indicated by reference numeral 1113 of FIG. 11. One value similar to another value may mean that the one value is included within a predetermined range from the other value (for example, within a specific rate of the other value). The electronic device 1101 may identify the external electronic devices 1102, 1103, and 1104 (for example, the first external electronic device 1102 and the second external electronic device 1103) corresponding to the identified similar SNR values (for example, the first value and the second value) and identify priorities (for example, the fourth value and the fifth value) corresponding to (or configured in) the identified external electronic devices. The electronic device 1101 may identify the external electronic device (for example, the first external electronic device 1102) having a higher (or the highest) priority (for example, the fourth value) among the identified external electronic devices 1102, 1103, and 1104 as the device to be woken up on the basis of the identification of the priorities as indicated by reference numeral 1114 of FIG. 11. Meanwhile, when there is no value which is similar to the largest SNR value, the electronic device 1101 may identify the external electronic device (for example, the first external electronic device 1102) corresponding to the largest SNR value as the device to be woken up.

According to various embodiments, the electronic device 1101 configured as the "main device" may perform the operation of pre-configuring and storing information on the priorities of the plurality of external electronic devices 1102, 1103, and 1104 and identifying the device to be woken up on the basis of the information on the priorities.

First, the electronic device 1101 may receive information on the priority initially configured in each of the plurality of external electronic devices 1102, 1103, and 1104 and store the received information on the priority. For example, the electronic device 1101 may receive information on the priority of the external electronic device 1101 from an external server (for example, the intelligent server 530). In another example, the electronic device 1101 may receive information on the priority configured in the external electronic device 1101 from each of the external electronic devices 1102, 1103, and 1104. In another example, the electronic device 1101 may already store the information on the priorities of the external electronic devices 1102, 1103, and 1104 with no need to receive the information.

At this time, the electronic device 1101 configured as the "main device" may change the priorities of the plurality of external electronic devices 1102, 1103, and 1104 and control an optimal device that matches a user's intent to be woken up. For example, the electronic device 1101 may change the priorities of the plurality of external electronic devices 1102, 1103, and 1104 on the basis of information indicating that the external electronic device 1101 is selected as the woken-up device during previous sessions (for example, sessions before the current session or the current time point). In other words, the priorities (for example, the fourth value, the fifth value, and the sixth value) of the plurality of current external electronic devices 1102, 1103, and 1104 to identify the device to be woken up may be configured after being changed from the conventional priorities. Detailed examples of the operation in which the electronic device 1101 changes the priorities of the external electronic devices 1102, 1103, and 1104 are described below with reference to FIGS. 16 to 18.

Hereinafter, another example of the operation of the electronic device included in the IoT system according to various embodiments is described.

According to various embodiments, an electronic device (for example, the electronic device 1410) configured as the "main device" may change a time interval (for example, time-out) for identifying the device to be woken up on the basis of a reception time point of information (for example, information related to a user utterance) received during one session.

Figure 13:
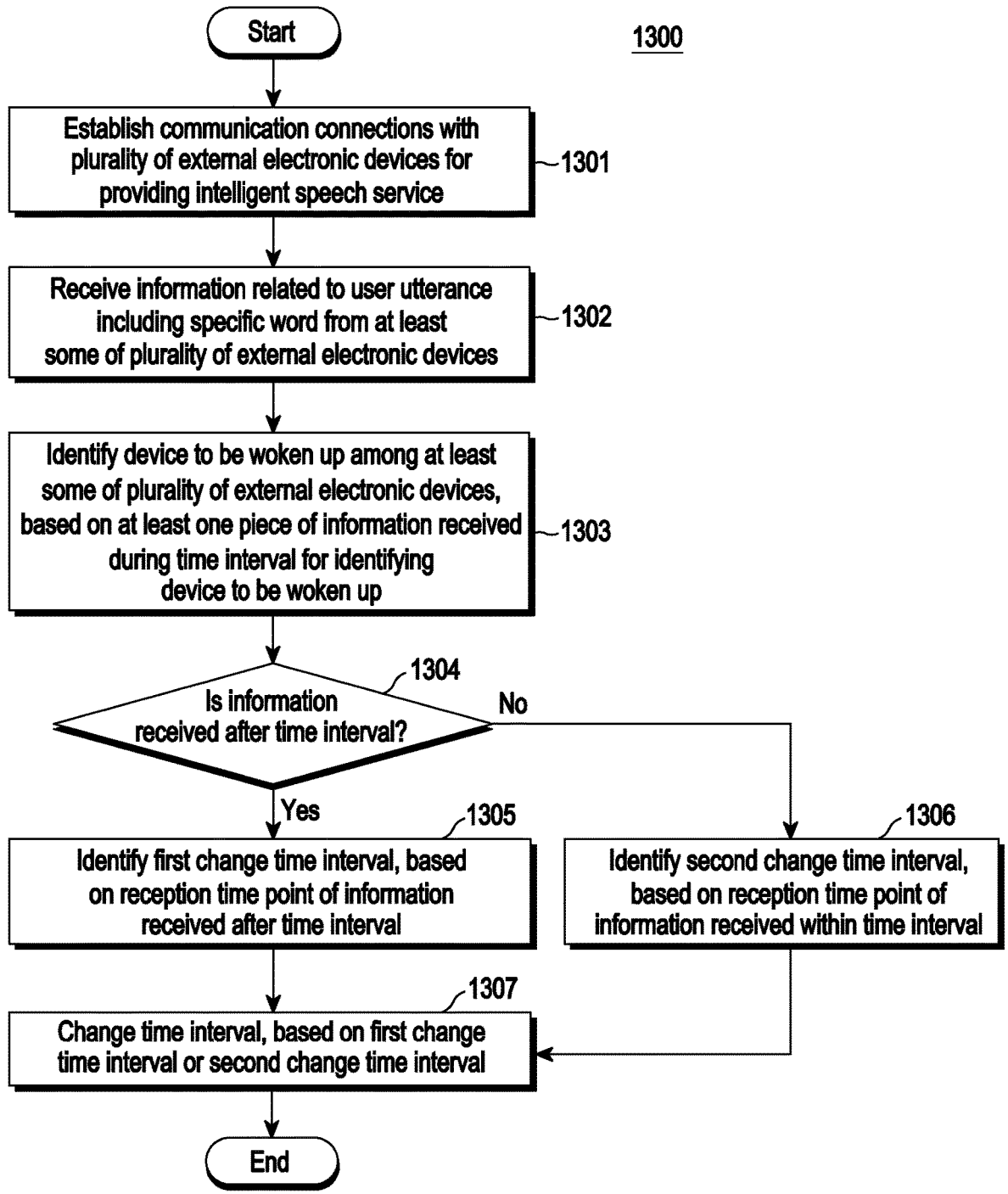
FIG. 13 is a flowchart illustrating an example of an operation of an electronic device according to various embodiments.

FIG. 13 is a flowchart illustrating an example of an operation of an electronic device according to various embodiments. According to various embodiments, in a method 1300, the operations illustrated in FIG. 13 are not limited to the illustrated order but may be performed in various orders. Further, according to various embodiments, more operations than the operations illustrated in FIG. 13 may be performed, or at least one operation that is fewer than the illustrated operations may be performed. Hereinafter, FIG. 13 is described with reference to FIGS. 14 and 15.

Figure 14:
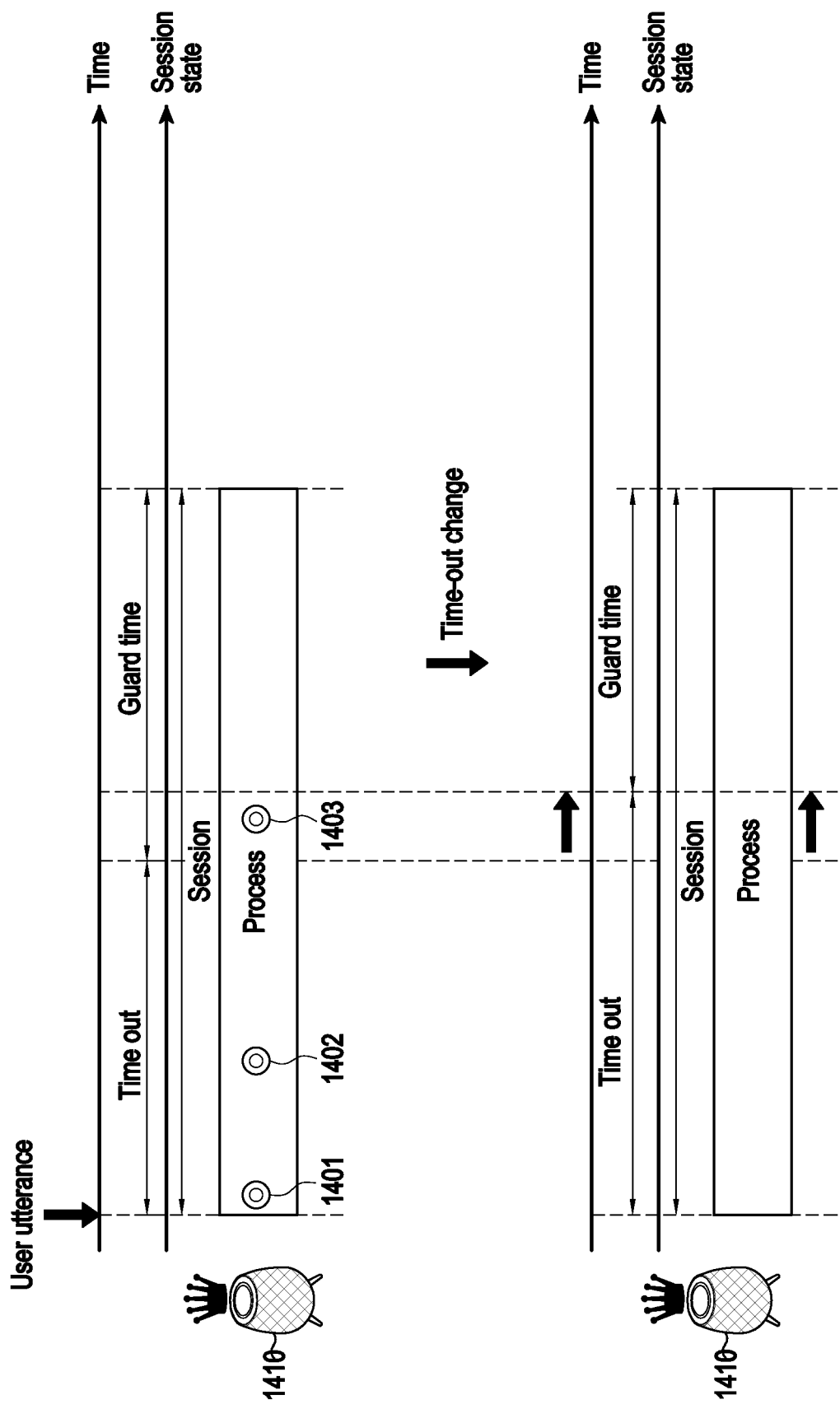
FIG. 14 illustrates an example of an operation in which an electronic device extends a predetermined time interval according to various embodiments.

FIG. 14 illustrates an example of an operation in which an electronic device extends a predetermined time interval according to various embodiments.

Figure 15:
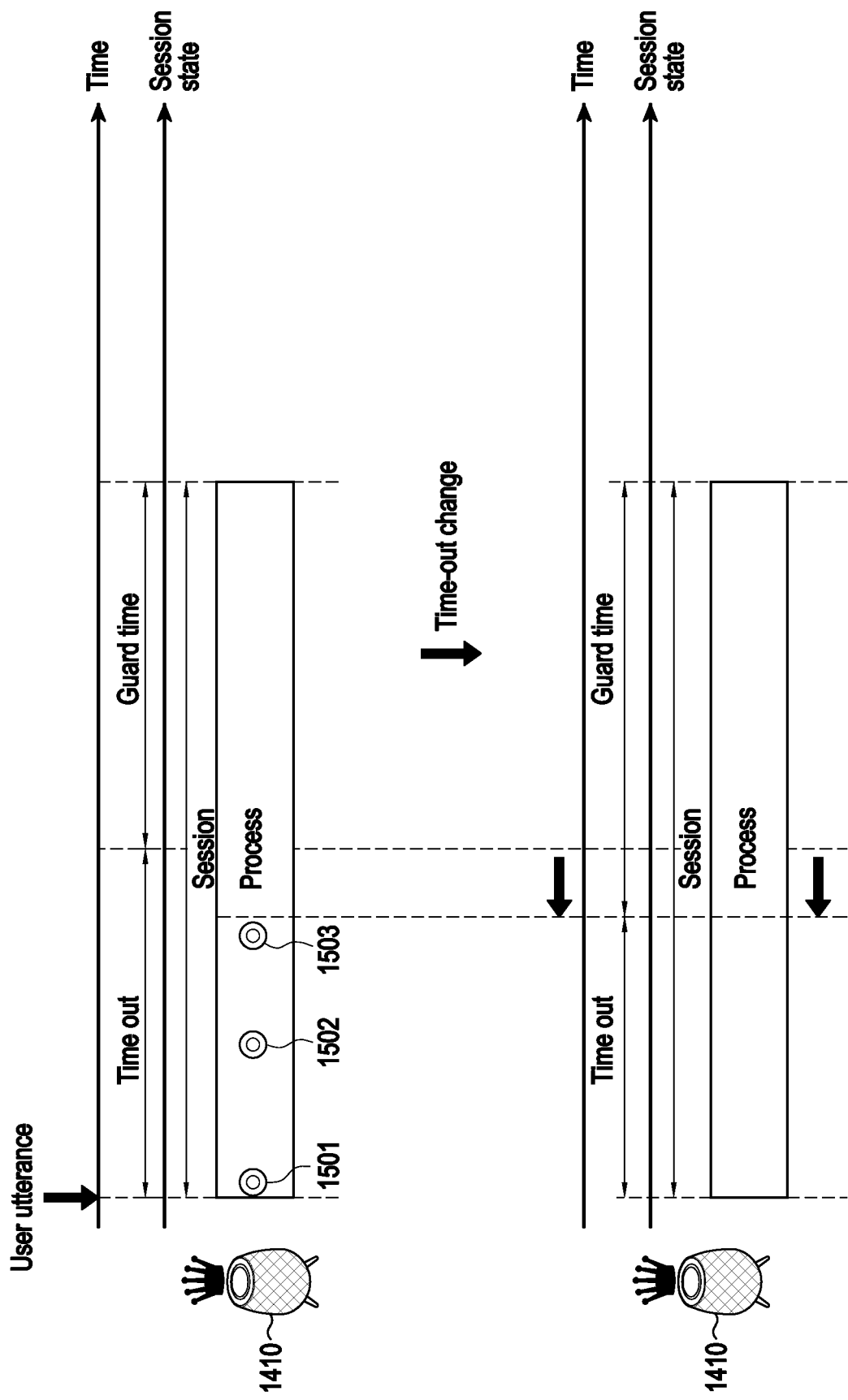
FIG. 15 illustrates an example of an operation in which an electronic device reduces a predetermined time interval according to various embodiments.

FIG. 15 illustrates an example of an operation in which an electronic device reduces a predetermined time interval according to various embodiments.

According to various embodiments, the electronic device (for example, the electronic device 1410) may configure the communication connection with a plurality of external electronic devices to provide the intelligent speech service in operation 1301 and receive information related to a user utterance including a specific word from at least some of the external electronic devices in operation 1302. For example, the electronic device 1410 configured as the "main device" may configure the communication connection with other external electronic devices included in an environment (for example, within the home). When the user speaks (for example, wake-up utterance) a specific word (for example, a start word) within one environment, the electronic device 1410 may receive information (for example, information on the strength of the user utterance) related to the user utterance acquired by other external electronic devices from the other external electronic devices on the basis of the communication connection. Since operation 1301 to operation 1302 of the electronic device 1410 may be performed identically as operation 801 of the electronic device 1410 and operation 805 to operation 807 of the electronic device 1410, an overlapping description is omitted. According to various embodiments, the electronic device (for example, the electronic device 1410) may identify the device to be woken up among at least some of the plurality of external electronic devices on the basis of at least one piece of first information received during a time interval for identifying the device to be woken up in operation 1303. For example, as illustrated in FIGS. 14 and 15, when a user utterance including a specific word is received through the microphone, the electronic device 1410 may execute and/or drive a program for providing the intelligent speech service. The electronic device 1410 may configure and/or initiate one session from a time point at which information related to the user utterance (for example, 1401 of FIG. 14 or 1501 of FIG. 15) is initially received from the external electronic device or a time point at which the user utterance is received, and receive information related to the user utterance (for example, information on an SNR value) from other external electronic devices during the configured one session. The electronic device 1410 may identify the device to be woken up on the basis of the information related to the user utterance received during a predetermined first time interval (for example, time-out) of the session. For example, the electronic device 1410 may identify the device to be woken up (for example, identify an external electronic device corresponding to the largest SNR value (for example, transmitting information)) as the device to be woken up) on the basis of the result of comparison of the size relation between SNR values. In another example, when similar SNR values are identified, the electronic device 1410 may identify the device to be woken up on the basis of priorities of the external electronic devices. Since operation 1303 of the electronic device 1410 may be performed identically as operation 808 of the electronic device 1410 or operation 1003 of the electronic device 1410, an overlapping description is omitted.

According to various embodiments, the electronic device (for example, the electronic device 1410) may identify whether information (for example, information related to the user utterance) after a time interval (for example, time-out) is received in operation 1304. The electronic device 1410 may identify whether information related to the user utterance is received from at least some of the plurality of external electronic devices during the remaining time intervals (for example, guard time) after a predetermined time (for example, time-out) of one session. For example, the electronic device 1410 may identify whether the identified time point is included in the remaining time interval (guard time) after the predetermined time interval (time-out) by comparing a time point at which information (for example, 1401, 1402, 1403, 1501, 1502, and 1503) is received from the plurality of external electronic devices and time slots of the time intervals (time out and guard time). The electronic device 1410 may calculate a first time slot from a time point at which the session is initiated to a first time point after the predetermined time interval (time-out) and identify a second time slot from the first time point to a second time point after the remaining time intervals (guard time). The electronic device 1410 may identify the time point at which information (for example, 1401, 1402, 1403, 1501, 1502, and 1503) is received from the plurality of external electronic devices and identify whether the identified time point is included in the first time slot or the second time slot. In another example, the electronic device 1410 may identify the time point at which information (for example, 1401, 1402, 1403, 1501, 1502, and 1503) is received from the plurality of external electronic devices in real time and identify whether the identified time point is included in the remaining time intervals after the predetermined time interval. For example, the electronic device 1410 may identify the lapse of the time by configuring a timer from the time point at which the session is initiated (for example, time point at which the user utterance is received). When information is received from the external electronic device while the lapse of the time is identified, the electronic device 1410 may identify a time interval (for example, time-out or guard time) including the identified time point. Meanwhile, it is not limited thereto, and the electronic device 1410 may identify a time point at which the information is transmitted from the plurality of external electronic devices instead of the time point at which the information is received by the electronic device 1410 and identify whether the identified transmission time point is included in the time slot.

According to various embodiments, when information is received after the time interval (for example, time-out), the electronic device (for example, 1410) may identify a first change time interval (for example, a time interval longer than the time-out) on the basis of the reception time point of the information received after the time interval in operation 1305. For example, the electronic device 1410 may identify a first length of the first time interval (time-out) to include the reception time point of the information 1403 received during a second time interval (guard time) after the first time interval (time-out) as illustrated in FIG. 14. For example, the electronic device 1410 may identify a time point at which the first time interval (time-out) passes from the time point at which the session is initiated (for example, the time point at which the user utterance is received), calculate a difference between the identified time point and the reception time point of the information 1403 received during the second time interval (guard time), and identify a new first time interval by adding the calculated difference to the current first time interval (for example, time-out). In another example, the electronic device 1410 may identify a time length from the time point at which the session is initiated (for example, the time point at which the user utterance is received) to the time point at which the information 1403 is received as the first time interval (for example, time-out) to be changed to. At this time, even though the reception of the information is delayed, the electronic device 1410 may include the reception time point of the information 1403 in the first time interval (time-out) by identifying the time length obtained by adding a predetermined time length to the identified time length as the first time interval (time-out) to be changed to. If the number of pieces of information received during the second time interval (guard time) after the first time interval (time-out) is plural, the electronic device 1410 may identify the first time interval (time-out) to be changed to on the basis of the reception time point of information received last among the information received during the second time point (guard time). Alternatively, the electronic device 1410 may calculate a predetermined time point on the basis of reception time points of information received during the second time interval (guard time) and change the time interval on the basis of the calculated time point. The calculated time point may include a time point corresponding to an average of the reception time points, the latest reception time point among the remaining time points of the reception time points except for top or bottom time points at a predetermined rate, and a time point corresponding to an average of the remaining time points.

According to various embodiments, when a predetermined condition is satisfied, the electronic device 1410 may perform the operation of identifying a first change time interval based on a reception time information of information (for example, 1403) received after the time interval (time-out). In other words, the electronic device 1410 may perform the operation of identifying reception time points of information identified to satisfy the predetermined condition among the information received after the time interval (time-out) and identifying the first change time interval on the basis of the identified reception time points.

For example, satisfaction of the predetermined condition may include identification of the external electronic device corresponding to the information (for example, 1403) received after the time interval (time-out) as the device to be woken up. The electronic device 1410 may identify information received during the second time interval (for example, guard time) as well as the information received during the first time interval (for example, time-out) and identify the device to be woken up on the basis of the information. Unlike the operation in which the electronic device 1410 identifies the device to be woken up and then control the identified device to be woken up in operation 1303, the electronic device 1410 may not control the identified device to be woken up after the operation of identifying the device to be woken up on the basis of the information (for example, 1403). The electronic device 1410 may identify the external electronic device corresponding to the information received during the second time interval (guard time) as the device to be woken up (for example, when an SNR value of the external electronic device is the largest) according to the result of the operation of identifying the device to be woken up. The electronic device 1410 may perform the operation of changing the length of the first time interval (for example, time-out) based on the reception time point of the information on the basis of the identification result. When the external electronic device corresponding to the information received during the second time interval is not identified as the device to be woken up, the electronic device 1410 may not perform the operation of changing the length of the first time interval. If the number of pieces of information received during the second time interval is plural, the electronic device 1410 may identify the information identified as the device to be woken up among the plurality of pieces of information and perform the operation of changing the length of the first time interval (for example, time-out) on the basis of the reception time of the identified information.

In another example, satisfaction of the predetermined condition may include identification that a location (for example, living room) related to the information received after the predetermined time interval (for example, time-out) corresponds to a location (for example, living room) related to the information received during the predetermined time interval. The control operation based on the location is described below with reference to FIGS. 19, 20A, and 20B.

According to various embodiments, when the electronic device (for example, 1410) does not receive information after the time interval (for example, time-out), the electronic device may identify a second change time interval (for example, a time interval having a length shorter than the time-out) on the basis of the reception time point of the information received within the time interval in operation 1306. For example, the electronic device 1410 may perform the operation of changing the length of the first time interval (time-out) on the basis of the latest reception time point (for example, the reception time point of the information 1503) among reception time points of information 1501, 1502, and 1503 received during the first time interval (time-out) as illustrated in FIG. 15. For example, the electronic device 1410 may change the length of the first time interval (time-out) to the length of a time from the time point at which the session is initiated (for example, the time point at which the user utterance is received) to the latest reception time point (for example, the reception time point of the information 1503). At this time, the electronic device 1410 may change the length of the first time interval (time-out) by adding a predetermined time length to the length of the time from the time point at which the session is initiated (for example, the time point at which the user utterance is received) to the latest reception time point (for example, the reception time point of the information 1503) so as to include the reception time point of the information in the first time interval although the reception of the information is delayed.

According to various embodiments, when the predetermined condition is satisfied, the electronic device 1410 may perform the operation of changing the time interval (time-out change) on the basis of the reception time point of the information received during the time interval (time-out) (for example, the reception time point of the information 1503). For example, satisfaction of the predetermined condition may include identification that a location (for example, living room) related to the information received last among the information received during the predetermined time interval (for example, time-out) corresponds to a location (for example, living room) related to other information. The control operation based on the location is described below with reference to FIGS. 19, 20A, and 20B.

According to various embodiments, the electronic device (for example, 1410) may change the time interval (for example, time-out) on the basis of the first change time interval or the second change time interval in operation 1307. For example, the electronic device 1410 may change and/or configure and store the currently configured time interval (time-out) to the length of the time interval (time-out) to be directly changed to in response to identification of the length of the time interval (time-out) to be changed to in operation 1305 and operation 1306. In another example, it is not limited thereto, and the electronic device 1410 may perform the operations (operation 1305 and operation 1306) of identifying the time interval (time-out) by a predetermined number of times (for example, 100 times) and change the time interval (time-out) on the basis of the identified time lengths on the basis of the operations of identifying the time-out performed by the predetermined number of times. For example, the electronic device 1410 may calculate an average value of the time lengths and change the first time interval (time-out) to the calculated average value. At this time, the electronic device 1410 may identify the remaining time lengths other than top or bottom time lengths at a predetermined rate among the time lengths and calculate an average value of the remaining time lengths.

Hereinafter, another example of the operation of the electronic device included in the IoT system according to various embodiments is described.

According to various embodiments, an electronic device (for example, 1711) configured as the "main device" may change priorities of at least some of a plurality of external electronic devices (for example, 1712 and 1713) on the basis of information on a finally identified device to be woken up according to the result of the operation of identifying the device to be woken up.

Figure 16:
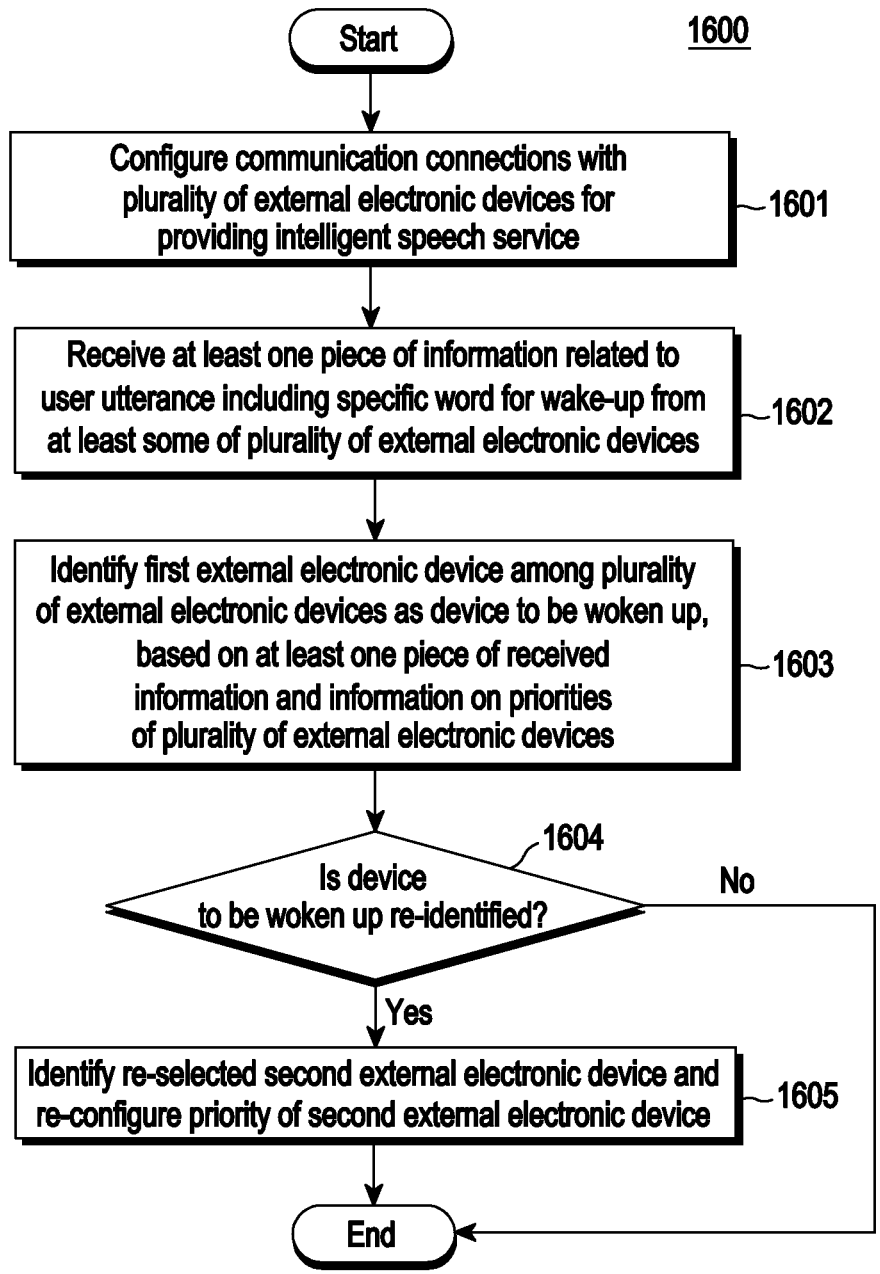
FIG. 16 is a flowchart illustrating an example of an operation of an electronic device according to various embodiments.

FIG. 16 is a flowchart illustrating an example of an operation of an electronic device according to various embodiments. According to various embodiments, in a method 1600, the operations illustrated in FIG. 16 are not limited to the illustrated order but may be performed in various orders. Further, according to various embodiments, more operations than the operations illustrated in FIG. 16 may be performed, or at least one operation that is fewer than the illustrated operations may be performed. Hereinafter, FIG. 16 is described with reference to FIGS. 17 and 18.

Figure 17:
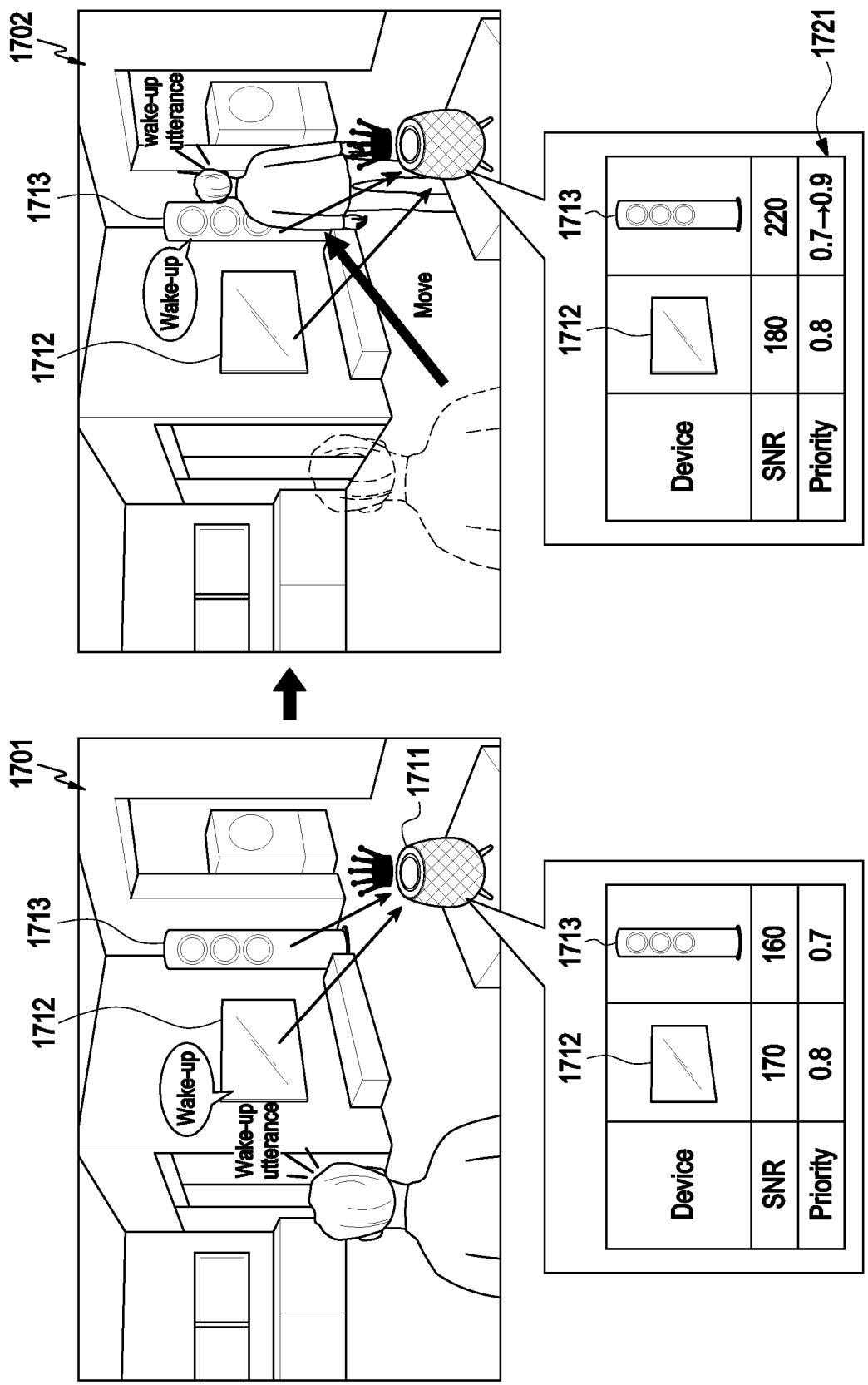
FIG. 17 illustrates an example of an operation in which an electronic device identifies a device to be finally woken up according to various embodiments.
Figure 18:
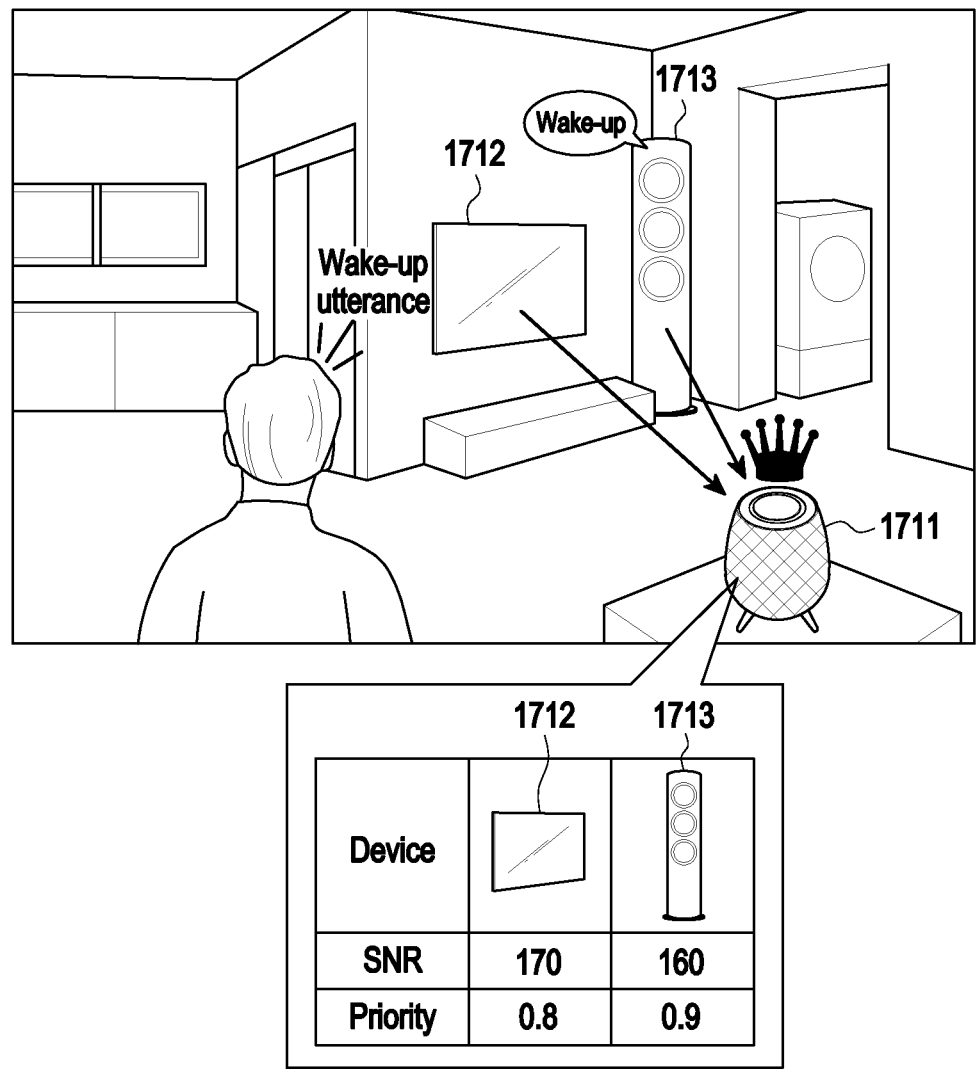
FIG. 18 illustrates an example of an operation in which an electronic device changes priorities of a plurality of external electronic devices according to various embodiments.

FIG. 17 illustrates an example of an operation in which an electronic device identifies a device to be finally woken up according to various embodiments. FIG. 18 illustrates an example of an operation in which an electronic device changes priorities of a plurality of external electronic devices according to various embodiments.

According to various embodiments, the electronic device (for example, an electronic device 1711) may configure the communication connection with the plurality of external electronic devices (for example, the external electronic devices 1712 and 1713) to provide the intelligent speech service in operation 1601 and receive information related to a user utterance including a specific word from at least some of the plurality of external electronic devices in operation 1602. For example, the electronic device 1711 configured as the "main device" may configure the communication connection with other external electronic devices 1712 and 1713 included in one environment (for example, within the home) as indicated by reference numeral 1701 of FIG. 17. When the user speaks a specific word (for example, a first user utterance) within one environment, the electronic device 1711 may receive information related to the user utterance (for example, information on the strength of the user utterance) acquired by other external electronic devices 1712 and 1713 from the other external electronic devices 1712 and 1713 on the basis of the communication connection. Since operation 1601 to operation 1602 of the electronic device 1711 may be performed identically as operation 801 of the electronic device 1711 and operation 805 to operation 807 of the electronic device 1711, an overlapping description is omitted.

According to various embodiments, the electronic device (for example, the electronic device 1711) may identify a first external electronic device (for example, the external electronic device 1712) among the plurality of external electronic devices as the device to be woken up on the basis of at least one piece of information received in operation 1603 and information on priorities of the plurality of external electronic devices (for example, the external electronic devices 1712 and 1713). For example, the electronic device 1711 may identify the device to be woken up among the plurality of external electronic devices 1712 and 1713 on the basis of a plurality of SNR values (for example, 170 db and 160 db) received from the plurality of external electronic devices 1712 and 1713 and priorities (for example, 0.8 and 0.7) of the plurality of external electronic devices 1712 and 1713 as indicated by reference numeral 1701 of FIG. 17. At this time, the received SNR values may be values received during a predetermined time interval (for example, time-out) of one session. For example, the electronic device 1711 may identify the largest SNR value (for example, a first value) according to the result of comparison between the plurality of SNR values and identify the identified external electronic device 1711 (for example, the first external electronic device 1712) having the largest SNR value as the device to be woken up. In another example, the electronic device 1711 may identify an SNR value (for example, 160 db) similar to the largest SNR value (for example, 170 db) according to the result of comparison between the plurality of SNR values and identify external electronic devices 1712 and 1713 (for example, the first external electronic device 1712 and the second external electronic device 1713) corresponding to the identified similar SNR values. The electronic device 1711 may identify priorities (for example, 0.8 and 0.7) corresponding to (or configured in) the identified external electronic devices 1712 and 1713 and identify the external electronic device 1711 (for example, the first external electronic device 1712) having a higher priority (for example, 0.8) as the device to be woken up. Since operation 1603 of the electronic device 1711 may be performed identically as operation 808 of the electronic device 1711 or operation 1003 of the electronic device 1711, an overlapping description is omitted.

According to various embodiments, the electronic device (for example, the electronic device 1711) may identify whether the device to be woken up is reselected in operation 1604. For example, after controlling a specific external electronic device 1711 to be woken up in operation 1603, the electronic device 1711 may re-identify another external electronic device 1711 as the device to be woken up. Hereinafter, examples of the operation in which the electronic device 1711 re-identifies another external electronic device 1711 as the device to be woken up are described.

For example, the electronic device 1711 may re-identify another external electronic device (for example, the external electronic device 1713) as the device to be woken up on the basis of reception of a second user utterance different from the first user utterance. For example, as indicated by reference numeral 1702 of FIG. 17, the user may move to a location adjacent to another external electronic device 1711 (for example, the second external electronic device 1713) from the conventional location (for example, a location far away from the second external electronic device 1713) and speak a specific word (for example, a start word) (for example, the second user utterance). On the basis of reception of the second user utterance, the electronic device 1711 may initiate a session different from one session initiated on the basis of reception of the first user utterance and perform the operation of re-identifying the device to be woken up. The electronic device 1711 may perform the operation of comparing SNR values received during a predetermined time interval (for example, time-out) of another session and re-identify the second external electronic device 1713 having the largest SNR value (for example, 220 db) as the device to be woken up as indicated by reference numeral 1702 of FIG. 17. At this time, the electronic device 1711 may identify a time difference between the one session and another session (or a time difference between a time point at which the device to be woken up is initially identified and a time point at which another external electronic device 1711 is re-identified or a time difference between a time point at which the first user utterance is received and a time point at which the second user utterance is received), and when the identified time interval is equal to or smaller than a preset value, perform the operation 1721 of changing priorities of the external electronic devices 1712 and 1713 (for example, change 0.7 to 0.9). It is not limited thereto, and the electronic device 1711 may perform the operation of changing the priorities of the external electronic devices 1712 and 1713 without identifying the time difference between one session and another session.

In another example, the electronic device 1711 may re-identify another external electronic device (for example, the external electronic device 1713) as the device to be woken up on the basis of the operation in which the user inputs another external electronic device (for example, the external electronic device 1713) as the device to be woken up. For example, another external electronic device 1713 may receive a user input for waking up the device (for example, receive an input for selecting the device to be woken up on an interface provided on the display of the device), and the electronic device 1711 may receive a message or a signal informing that the other external electronic device 1713 is woken up from the external electronic device 1711. In another example, the electronic device 1711 may receive a user input for directly waking up the other external electronic device 1713 (for example, receive an input for selecting the device to be woken up on an interface provided on the display of the electronic device 1711). In another example, the user may wake up the other external electronic device 1713 through a user terminal, and the electronic device 1711 may receive a message or a signal informing that the external electronic device 1711 is woken up from the user terminal and/or the intelligent server 530.

According to various embodiments, when it is identified that the external electronic device 1711 is reselected, the electronic device 1711 may change the priority of the second external electronic device 1713 re-identified as the device to be woken up in operation 1605. For example, the electronic device 1711 may configure the priority of the second external electronic device 1713 re-identified as the device to be woken up to be higher as indicated by reference numeral 1702 of FIG. 17. For example, the electronic device 1711 may configure the priority of the second external electronic device 1713 to be higher than the priority of the first external electronic device 1712 initially identified as the device to be woken up. Accordingly, even when the user speaks at the original location (for example, at a distance far away from the second external electronic device 1713) as illustrated in FIG. 18, the electronic device 1711 may identify the second external electronic device 1713 rather than the first external electronic device 1712 as the device to be woken up on the basis of the priority (for example, 0.9) of the second external electronic device 1713 higher than the priority (for example, 0.8) of the first external electronic device 1712.

Hereinafter, another example of the operation of the electronic device included in the IoT system according to various embodiments is described.

According to various embodiments, an electronic device (for example, 2010) configured as the "main device" may configure values (for example, time-out and priority) used for the operation of identifying the device to be woken up on the basis of information on locations of other external electronic devices (for example, 2013, 2014, 2015, and 2016) configured as "sub devices".

Figure 19:
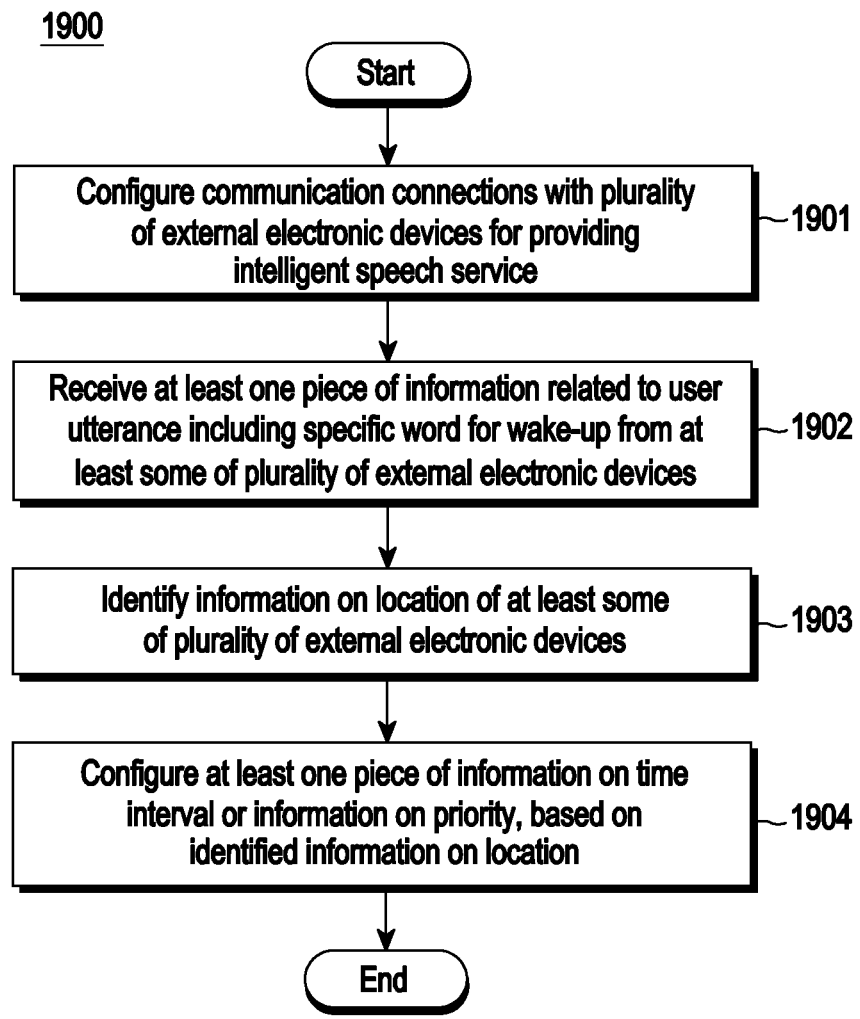
FIG. 19 is a flowchart illustrating an example of an operation of an electronic device according to various embodiments.

FIG. 19 is a flowchart illustrating an example of an operation of an electronic device according to various embodiments. According to various embodiments, in a method 1900, the operations illustrated in FIG. 19 are not limited to the illustrated order but may be performed in various orders. Further, according to various embodiments, more operations than the operations illustrated in FIG. 19 may be performed, or at least one operation that is fewer than the illustrated operations may be performed. Hereinafter, FIG. 19 is described with reference to FIGS. 20A and 20B.

Figure 20A:
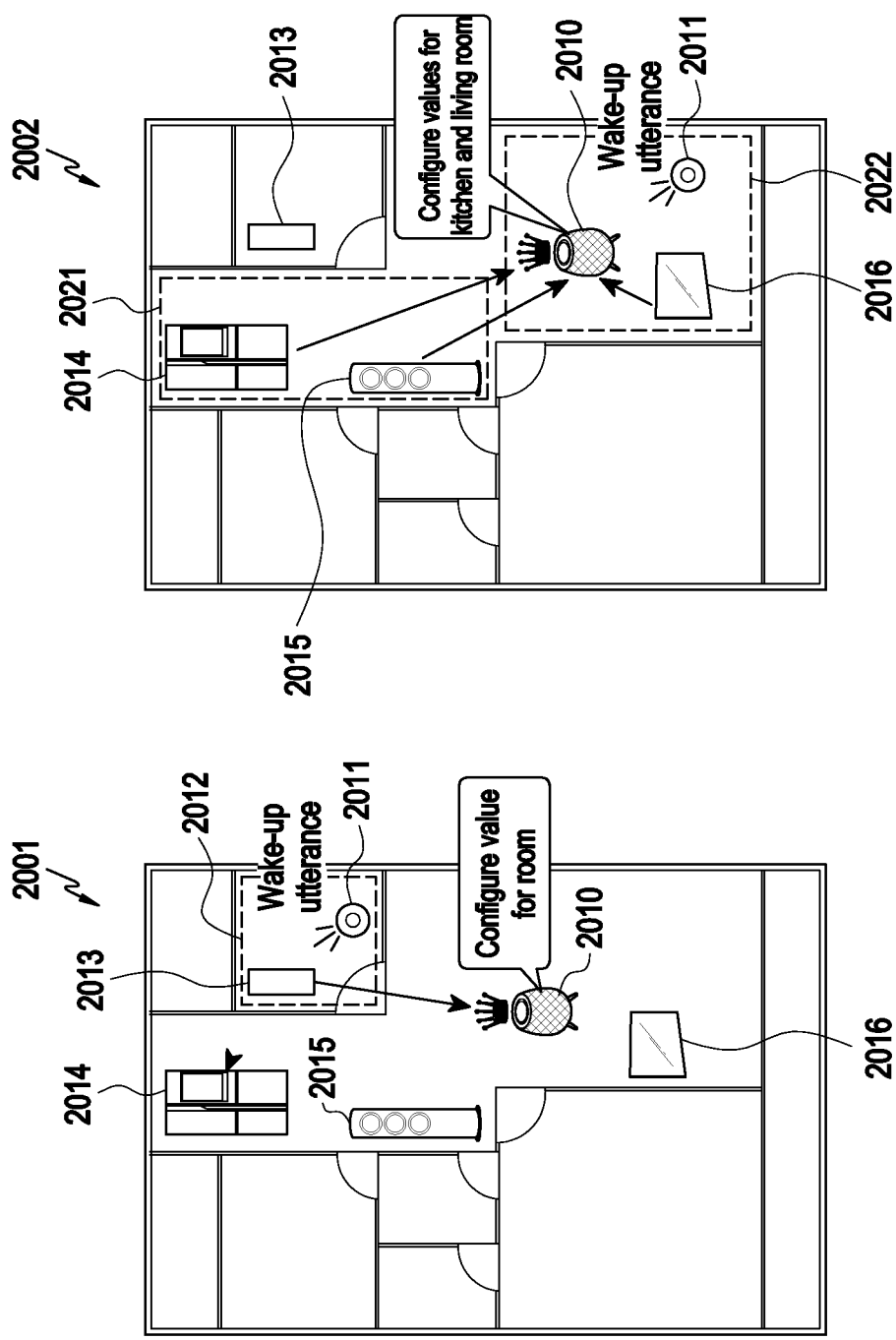
FIG. 20A illustrates an example of an operation in which an electronic device generates an artificial intelligence model on a basis of various pieces of information accumulated when a device to be woken up is identified according to various embodiments.
Figure 20B:
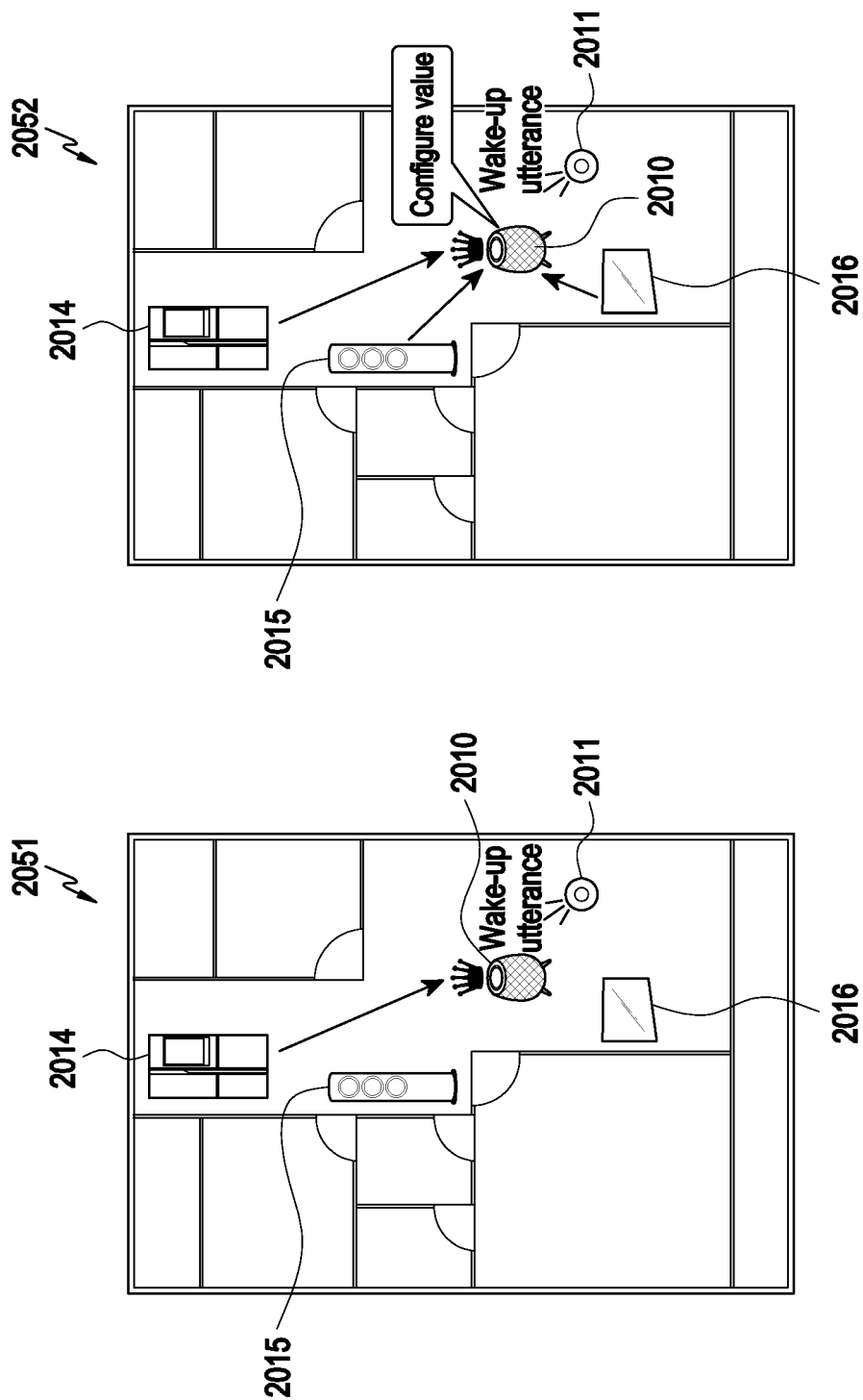
FIG. 20B illustrates an example of an operation in which an electronic device identifies a device to be woken up on a basis of a generated artificial intelligence model according to various embodiments.

FIG. 20A illustrates an example of an operation in which an electronic device generates an artificial intelligence model on a basis of various pieces of information accumulated when a device to be woken up is identified according to various embodiments. FIG. 20B illustrates an example of an operation in which an electronic device identifies a device to be woken up on a basis of a generated artificial intelligence model according to various embodiments.

According to various embodiments, the electronic device (for example, the electronic device 2010) may configure the communication connection with a plurality of external electronic devices (for example, the external electronic devices 2013, 2014, 2015, and 2016) to provide the intelligent speech service in operation 1901, and receive at least one piece of information related to a user utterance including a specific word for wake-up from at least some of the plurality of external electronic devices 2013, 2014, 2015, and 2016 in operation 1902. For example, the electronic device 2010 configured as the "main device" may configure the communication connection with other external electronic devices 2013, 2014, 2015, and 2016 included in one environment (for example, within the home) illustrated in FIGS. 20A to 20B. When a user (for example, 2011) speaks a specific word (for example, a first user utterance) within one environment, the electronic device 2010 may receive information related to the user utterance (for example, information on the strength of the user utterance) acquired by the other external electronic devices 2013, 2014, 2015, and 2016 from the other external electronic devices 2013, 2014, 2015, and 2016 on the basis of the communication connection. Since operation 1901 to operation 1902 of the electronic device 2010 may be performed identically as operation 801 of the electronic device 2010 and operation 805 to operation 807 of the electronic device 2010, an overlapping description is omitted.

According to various embodiments, the electronic device (for example, the electronic device 2010) may identify information on the location of at least some of the plurality of external electronic devices (for example, the external electronic devices 2013, 2014, 2015, and 2016) in operation 1903, and configure at least one piece of information on a time interval or a priority on the basis of the identified information on the location in operation 1904. For example, as illustrated in FIG. 5B, the external electronic devices 2013, 2014, 2015, and 2016 may be registered according to the location thereof (for example, a room 2012, a kitchen 2021, and a living room 2022) within the environment. When receiving the information related to the user utterance from at least some of the external electronic devices 2013, 2014, 2015, and 2016, the electronic device 2010 may identify the location of at least some of the external electronic devices 2013, 2014, 2015, and 2016 on the basis of the registered locations of the external electronic devices 2013, 2014, 2015, and 2016. Hereinafter, an example of operations for configuring values (for example, time-out and priority) on the basis of the information on the location of the electronic device 2010 is described.

According to various embodiments, the electronic device 2010 may configure and manage the values (for example, time-out and priority) according to each of the locations (for example, the room 2012, the kitchen 2021, and the living room 2022) within the environment. For example, the electronic device 2010 may configure information on the time-out and the priority according to each specific location. For example, when the user 2011 speaks a wake-up utterance in at a specific location (for example, the room 2012) within the environment as indicated by reference numeral 2001 of FIG. 20A, the electronic device 2010 may receive information related to the user utterance (for example, the wake-up utterance) from at least one external electronic device 2013 positioned at the specific location (for example, the room 2012). Other external electronic devices 2014, 2015, and 2016 positioned at other locations (for example, the kitchen 2021 and the living room 2022) within the environment may not receive the user utterance or may receive a user utterance having the strength smaller than a threshold value and thus may not transmit information related to the user utterance to the electronic device 2010 configured as the "main device". The electronic device 2010 may perform the operation of identifying the device to be woken up on the basis of reception of the information related to the utterance of the user 2011 from at least one external electronic device 2012 positioned at the specific location (for example, the room 2012). The electronic device 2010 may acquire at least one piece of information on the reception time point at which information is received during one session described in FIGS. 13 to 15 or information on the device re-identified as the device to be woken up described in FIGS. 16 to 18 while the device to be woken up is identified, and configure and/or change at least one of the time-out or the priority on the basis of the acquired information. Since the operation in which the electronic device 2010 configures and/or changes at least one of the time-out or the priority may be performed identically as that described in FIGS. 13 to 18, an overlapping description is omitted. The electronic device 2010 may store and manage information on the configured time-out and the configured priority to be associated with the specific location (for example, the room 2012). Thereafter, when receiving information related to the user utterance from at least one external electronic device 2010 registered in the specific location (for example, the room 2012), the electronic device 2010 may perform the operation of identifying the device to be woken up on the basis of the information on the time-out and the priority stored to be associated with the specific location (for example, the room 2012). In another example, when the electronic device 2010 receives information related to the user utterance from the external electronic devices 2014, 2015, and 2016 positioned at two or more locations (for example, the kitchen 2021 and the living room 2022) as indicated by reference numeral 2002 of FIG. 20A, the electronic device may configure and/or change at least one of the time-out or the priority and store the same to be associated with the two or more locations (for example, the kitchen 2021 and the living room 2022).

As described above, when the user 2011 speaks the wake-up utterance at different locations within the environment according to management of the priority and the time-out according to each location within the environment, the operation of identifying an optimal device to be woken up on the basis of the time-out and the priority suitable for situations of different locations (for example, the external electronic devices 2013, 2014, 2015, and 2016 positioned according the location thereof) (for example, the time-out is not unnecessarily lengthened) may be performed.

According to various embodiments, when receiving information from a predetermined number or more of external electronic devices 2014, 2015, and 2016 as indicated by reference numerals 2051 to 2052 of FIG. 20B, the electronic device 2010 may perform the operation of configuring and/or changing values (for example, time-out and priority). The preset number may be a number corresponding to a predetermined ratio of the number of registered external electronic devices 2014, 2015, and 2016.

Hereinafter, another example of the operation of the electronic device included in the IoT system according to various embodiments is described.

According to various embodiments, an electronic device (for example, the electronic device 2301) configured as the "main device" may accumulate various pieces of information while each of the operations of identifying the device to be woken-up is performed, and generate an artificial intelligence model on the basis of the accumulated various pieces of information (for example, state information of the external electronic devices (for example, the external electronic devices 2302, 2303, and 2304), information on SNRs of the external electronic devices, and initially selected device information). The electronic device may input various pieces of information acquired during the operation of identifying the device to be woken up into the generated artificial intelligence model and identify the output external electronic device as the device to be woken up.

Figure 21:
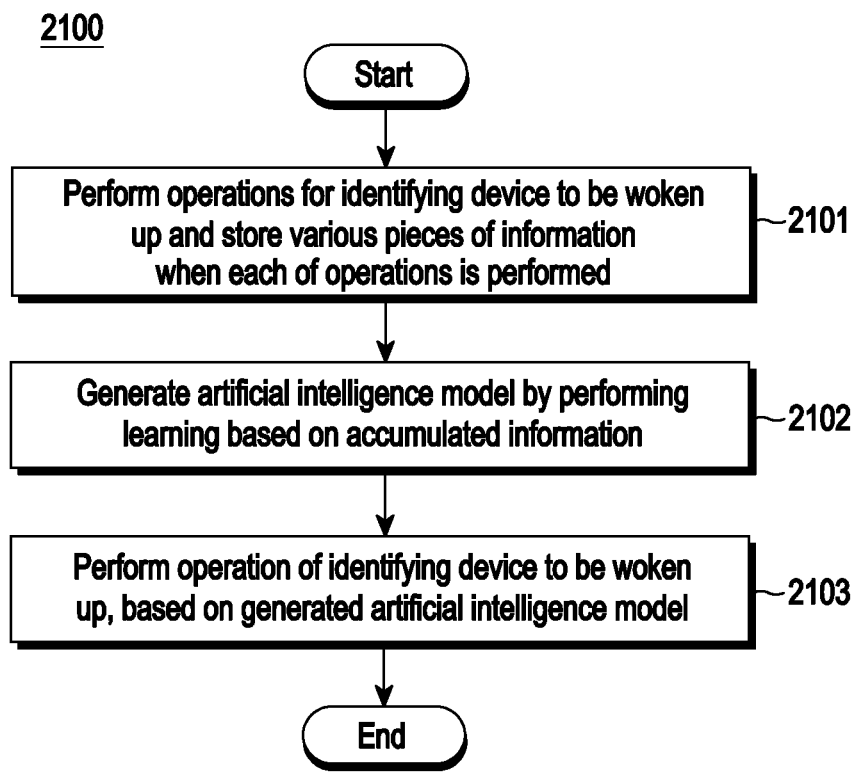
FIG. 21 is a flowchart illustrating an example of an operation of a configured electronic device according to various embodiments.

FIG. 21 is a flowchart illustrating an example of an operation of a configured electronic device according to various embodiments. According to various embodiments, in a method 2100, the operations illustrated in FIG. 21 are not limited to the illustrated order but may be performed in various orders. Further, according to various embodiments, more operations than the operations illustrated in FIG. 21 may be performed, or at least one operation that is fewer than the illustrated operations may be performed. Hereinafter, FIG. 21 is described with reference to FIGS. 22 to 23.

Figure 23:
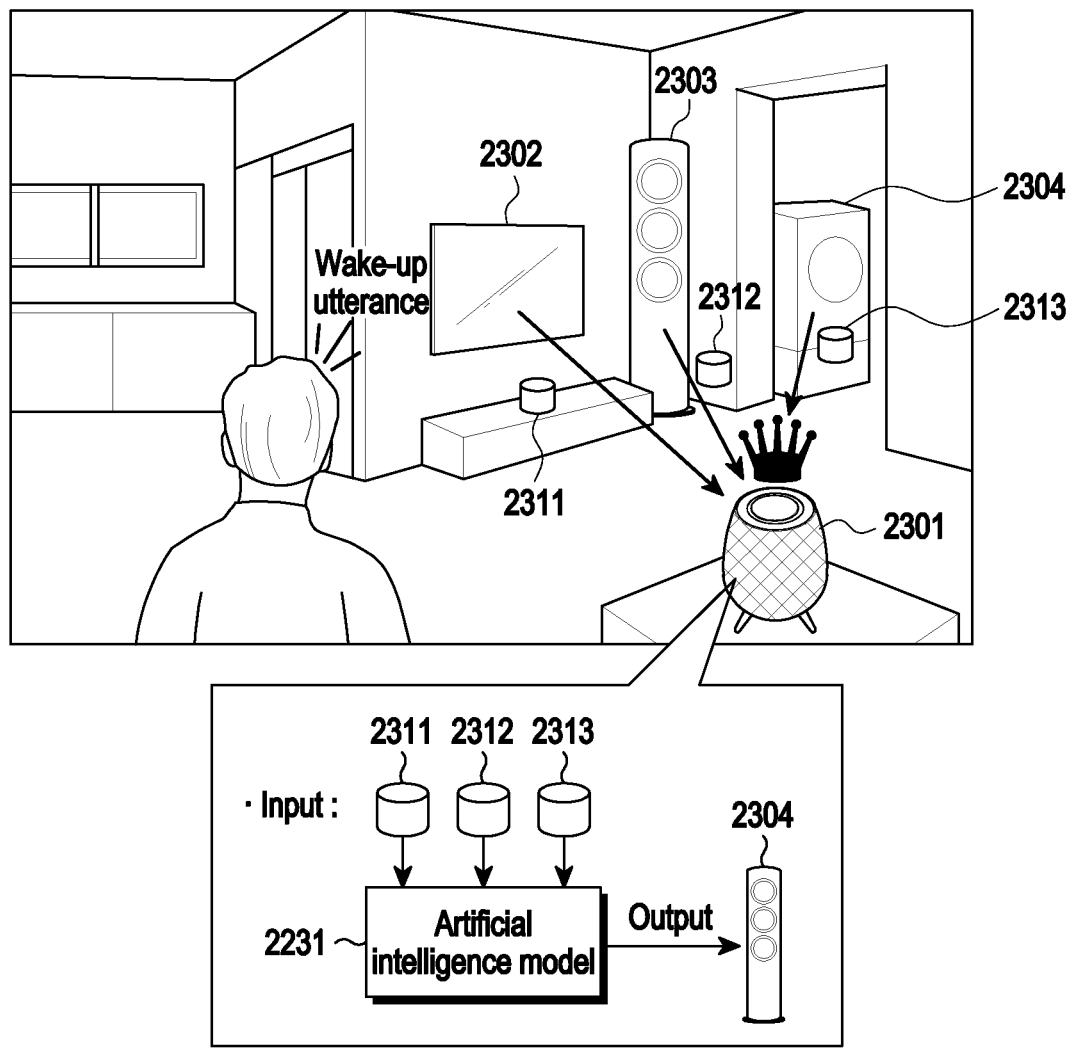
FIG. 23 illustrates an example of an operation in which an electronic device identifies a device to be woken up on a basis of a generated artificial intelligence model according to various embodiments.

FIG. 22 illustrates an example of an operation in which an electronic device generates an artificial intelligence model on a basis of various pieces of information accumulated when an operation of identifying a device to be woken is performed according to various embodiments. FIG. 23 illustrates an example of an operation in which an electronic device identifies a device to be woken up on a basis of a generated artificial intelligence model according to various embodiments.

According to various embodiments, the electronic device (for example, the electronic device 2301 of FIG. 23) may perform operations of identifying the device to be woken up and store various pieces of information when the operations of identifying the device to be woken up are performed in operation 2101. For example, the electronic device (for example, the electronic device 2301 of FIG. 23) configured as the "main device" may perform the operations of identifying the device to be woken up by multiple times on the basis of reception of a user utterance including a specific word or reception of information related to the user utterance from external electronic devices (for example, the external electronic devices 2302, 2303, and 2304 of FIG. 23) configured as "sub devices". The electronic device (for example, the electronic device 2301 of FIG. 23) may configure and/or initiate sessions for identifying the device to be woken up and accumulate various pieces of information acquired during the sessions. For example, the various pieces of information may include information (information on each device) on states of external electronic devices (for example, the external electronic devices 2302, 2303, and 2304 of FIG. 23), information on an SNR value of the external electronic device (SNR information of each device), information on priorities of the external electronic devices (for example, the external electronic device 2302, 2303, and 2304 of FIG. 23) (not shown), information on the external electronic device identified as the device to be initially woken up (for example, initial selection information), and information on the external electronic device identified as the device to be finally woken up after the device to be initially woken up is identified, as indicated by reference numeral 2201 of FIG. 22. For example, the electronic device (for example, the electronic device 2301 of FIG. 23) may further receive information on the state of the external electronic device along with information related to the user utterance (for example, information on the SNR value) from each of the plurality of external electronic devices (for example, the external electronic devices 2302, 2303, and 2304 of FIG. 23) when the operation of identifying the device to be woken up. When the user utterance is received, the external electronic device may identify information on the state of the external electronic device along with information related to the user utterance on the basis of reception of the user utterance and transmit the identified information to the electronic device (for example, the electronic device 2301 of FIG. 23). The information on the state may include information on the state of the external electronic device which can be sensed and/or identified according to each type (for example, TV, mobile phone, air conditioner, wearable watch, refrigerator, robot cleaner, and speaker) of the external electronic devices (for example, the external electronic devices 2302, 2303, and 2304 of FIG. 23). For example, the information on the state may include information on a charging state, information on an application execution state (for example, information indicating an application being executed in a foreground mode), information on a current temperature, and information on a currently configured mode as indicated by reference numeral 2201 of FIG. 22. The state information is not limited thereto and may include various pieces of information which can be sensed according to each type of the device.

According to various embodiments, the electronic device (for example, the electronic device 2301 of FIG. 23) may generate an artificial intelligence model by performing learning on the basis of accumulated information in operation 2102. For example, the electronic device (for example, the electronic device 2301 of FIG. 23) may perform learning (for example, machine learning or deep learning) based on the various pieces of information as training data through an artificial intelligence learning algorithm (for example, a machine learning algorithm or a deep learning algorithm) as indicated by reference numeral 2202 of FIG. 22. Since not only the artificial intelligence learning algorithm such as general ensemble but also various types of machine learning or deep learning algorithms can be used as the artificial intelligence learning algorithm, a detailed description thereof is omitted. The electronic device (for example, the electronic device 2301 of FIG. 23) may perform learning by configuring, as output data of the artificial intelligence model to be generated, final selection information (that is, information on the external electronic device finally identified as the device to be woken up) among the various pieces of information and configuring, as input data of the artificial intelligence model to be generated, the remaining information (for example, information on state of the external electronic devices (for example, the external electronic device 2302, 2303, and 2304 of FIG. 23) (state information), information on the SNR value of the external electronic device (SNR information), information on priorities of the external electronic devices (for example, the external electronic devices 2302, 2303, and 2304 of FIG. 23) (priority information), and initial selection information). For example, the electronic device (for example, the electronic device 2301 of FIG. 23) may generate an artificial intelligence model 2231 (for example, a machine learning model or a deep learning model) by performing the operation of assigning a weighted value to each of the external electronic devices (for example, the external electronic devices 2302, 2303, and 2304 of FIG. 23) finally identified as the device to be woken up, which are configured as the output data, according to each of the information (for example, the state information, the SNR information, the priority information, and the initial selection information as indicated by reference numeral 2202 of FIG. 22) configured as the input data as indicated by reference numeral 2202 of FIG. 22. The generated artificial intelligence model 2231 may be configured to output the finally identified external electronic device in response to the input of the state information, the SNR information, the priority information, and the initial selection information as indicated by reference numeral 2203 of FIG. 22. The finally identified external electronic device may be identified as the device to be woken up in the current session.

According to various embodiments, the electronic device (for example, the electronic device 2301 of FIG. 23) may perform the operation of identifying the device to be woken up on the basis of the generated artificial intelligence model in operation 2103. For example, when receiving a user utterance including a specific word for initiating provision of the intelligent speech service as illustrated in FIG. 23, the electronic device 2301 may configure and/or initiate one session and acquire state information 2311, 2312, and 2313 along with information on the strength (for example, SNR value) of the user utterance from the external electronic devices 2302, 2303, and 2304 during one session. Further, the electronic device 2301 of FIG. 23 may identify information on priorities of the external electronic devices 2302, 2303, and 2304 transmitting information during one session. In addition, the electronic device (for example, the electronic device 2301 of FIG. 23) may identify the device to be woken up (that is, acquire initial selection information) on the basis of the SNR information or the information on the priorities. The electronic device (for example, the electronic device 2301 of FIG. 23) may input the acquired state information, SNR information, information on the priorities, and initial selection information into the generated artificial intelligence model 2231 and acquire information on the finally selected electronic device 2301 output from the artificial intelligence model 2231. The electronic device (for example, the electronic device 2301 of FIG. 23) may identify the finally selected device 2304 as the device to be woken up and control the corresponding device 2304 to be woken up (for example, transmit result information indicating that the corresponding device 2304 is identified as the device to be woken up).

Meanwhile, the artificial intelligence model 2231 is not limited thereto and may be generated to output information on priorities or information on time-out. For example, the electronic device (for example, the electronic device 2301 of FIG. 23) may perform learning by configuring, as output data, the information on the priorities or the information on the time-out among accumulated information and configuring, as input data, at least one piece of the remaining information (for example, at least one piece of state information, SNR information, initial selection information, or final selection information) other than the information on the priorities or the information on the time-out. The artificial intelligence model 2231 generated according to the performance of the learning may output the information on the priorities or the information on the time-out in response to the input of at least one piece of the state information, the SNR information, the initial selection information, or the final selection information. The electronic device (for example, the electronic device 2301 of FIG. 23) may configure the priority of each device on the basis of the information on the priorities output through the input of information received during one session by the artificial intelligence model 2231 or configure time-out on the basis of the output information on the time-out, and perform the operation of identifying the device to be woken up.

Hereinafter, another example of the operation of the electronic device included in the IoT system according to various embodiments is described.

According to various embodiments, when a new device (for example, an external electronic device 2521) is provided within an environment, an electronic device (for example, 2510) configured as the "main device" may update values (for example, time-out and priority) used for the operation of identifying the device to be woken up.

Figure 24:
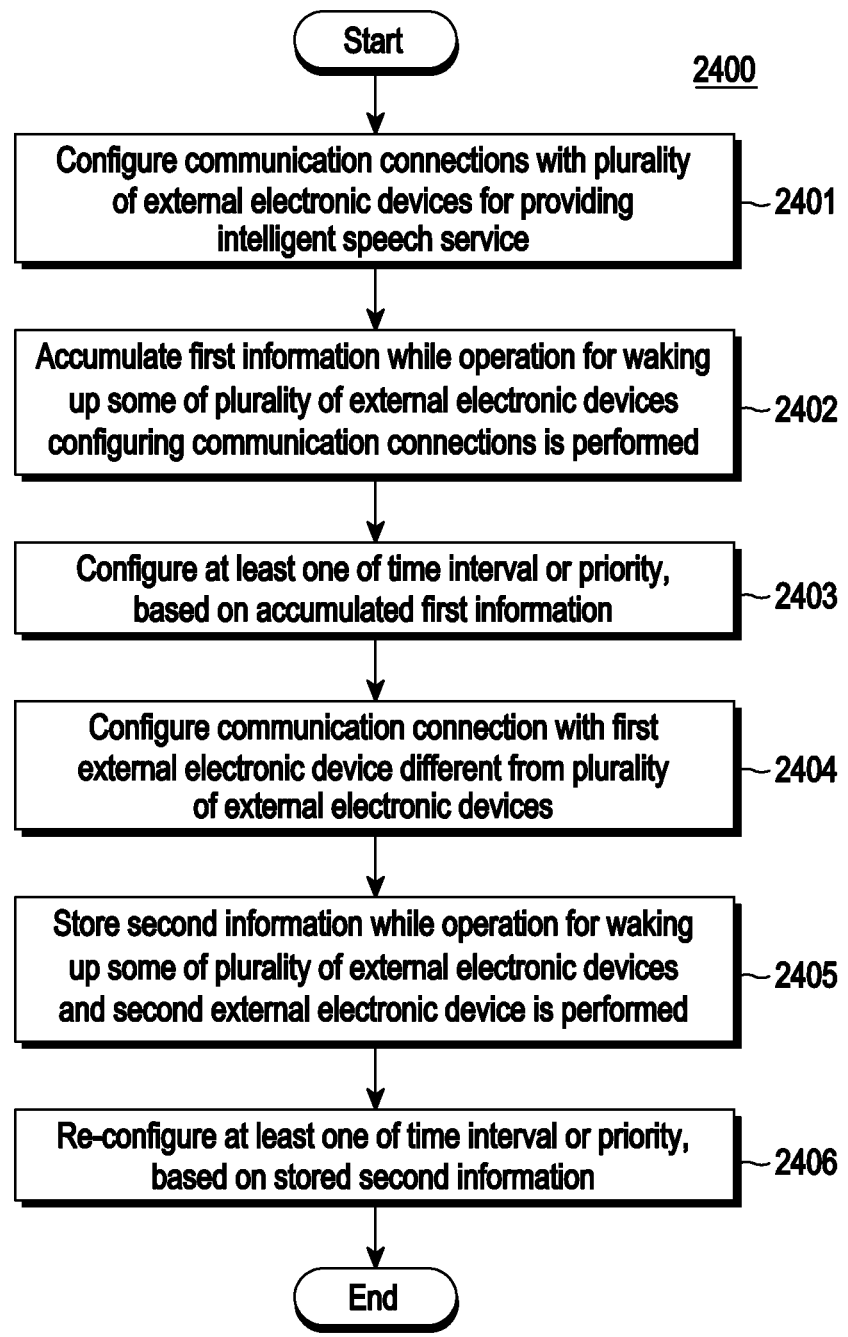
FIG. 24 is a flowchart illustrating an example of an operation of an electronic device according to various embodiments.

FIG. 24 is a flowchart illustrating an example of an operation of an electronic device according to various embodiments. According to various embodiments, in a method 2400, the operations illustrated in FIG. 24 are not limited to the illustrated order but may be performed in various orders. Further, according to various embodiments, more operations than the operations illustrated in FIG. 24 may be performed, or at least one operation that is fewer than the illustrated operations may be performed. Hereinafter, FIG. 24 is described with reference to FIG. 25.

Figure 25:
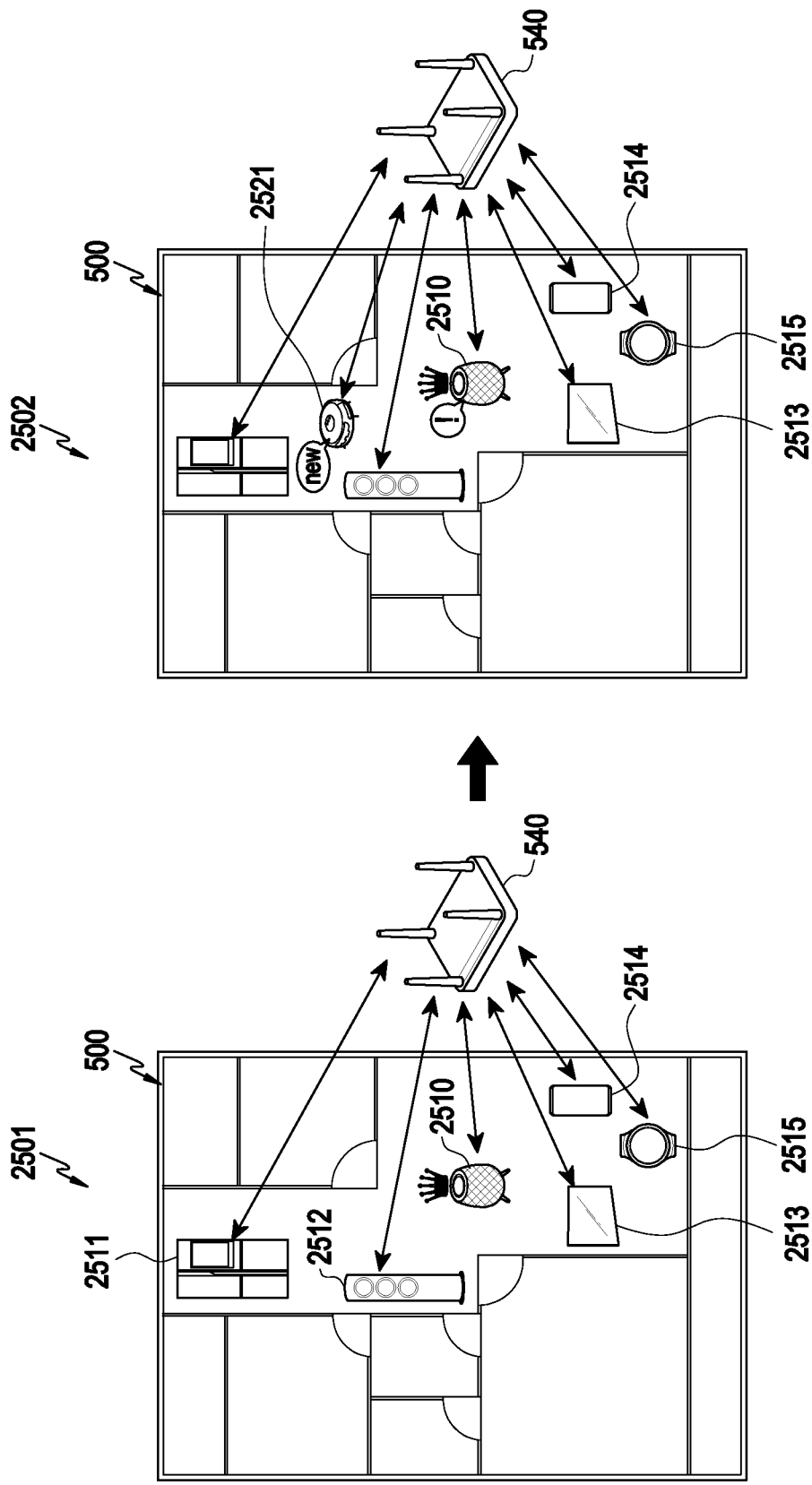
FIG. 25 illustrates an example of an operation in which an electronic device generates an artificial intelligence model on a basis of various pieces of information accumulated when an operation of identifying a device to be woken up is performed according to various embodiments.

FIG. 25 illustrates an example of an operation in which an electronic device generates an artificial intelligence model on a basis of various pieces of information accumulated when an operation of identifying a device to be woken is performed according to various embodiments.

According to various embodiments, an electronic device (for example, an electronic device 2510) may configure the communication connection with a plurality of external electronic devices (for example, the external electronic devices 2511, 2512, 2513, 2514, and 2515) to provide the intelligence speech service in operation 2401. For example, the electronic device 2510 may configure the communication connection (for example, configure the communication connection through a repeater) with other external electronic devices 2511, 2512, 2513, 2514, and 2515 included in one environment (for example, within the home) as indicated by reference numeral 2501 of FIG. 25. Since operation 2401 of the electronic device 2510 may be performed identically as operation 801 of the electronic device 2510, an overlapping description is omitted.

According to various embodiments, the electronic device (for example, 2510) may accumulate first information while the operation of waking-up some of the plurality of external electronic devices (for example, 2511, 2512, 2513, 2514, and 2515) configuring the communication connection is performed in operation 2402. For example, the electronic device 2510 may accumulate information acquired during the operation of identifying the device to be woken up on the basis of a wake-up utterance of the user generated within the environment. The information may include reception time points of information received from the plurality of external electronic devices 2511, 2512, 2513, 2514, and 2515 during one session, described in FIGS. 13 to 15, information on external electronic devices 2511, 2512, 2513, 2514, and 2515 re-identified as the device to be woken up, described in FIGS. 16 to 18, or various pieces of information, described in FIGS. 21 to 23 (for example, the state information of the external electronic devices 2511, 2512, 2513, 2514, and 2515, the SNR information, the initial selection information, and the final selection information).

According to various embodiments, the electronic device (for example, 2510) may configure at least one of a time interval or a priority on the basis of the accumulated first information in operation 2403. For example, the electronic device 2510 may configure (for example, extend or reduce) time-out on the basis of the reception time points of information received from the plurality of external electronic devices 2511, 2512, 2513, 2514, and 2515 received during one session, described in FIGS. 13 to 15. In another example, the electronic device 2510 may change the priorities of the external electronic devices 2511, 2512, 2513, 2514, and 2515 re-identified on the basis of the information on the electronic devices re-identified as the device to be woken up, as described in FIGS. 16 to 18. In another example, the electronic device 2510 may generate the artificial intelligence model, described in FIGS. 21 to 23 and configure the time-out or the priority on the basis of the generated artificial intelligence model. Since operation 2403 of the electronic device 2510 may be performed identically as that described in FIGS. 13 to 15, FIGS. 16 to 18, and FIGS. 21 to 23, an overlapping description is omitted.

According to various embodiments, the electronic device (for example, 2510) may configure the communication connection with a first external electronic device (for example, the external electronic device 2521) different from the plurality of external electronic devices 2511, 2512, 2513, 2514, and 2515 in operation 2404. For example, as indicated by reference numeral 2502 of FIG. 25, a new device (for example, the first external electronic device 2521) is provided within the environment, and the newly provided device may configure the communication connection (for example, the communication connection through the AP 540) with the other external electronic devices 2511, 2512, 2513, 2514, and 2515 and may be registered in the intelligent server 530. The electronic device 2510 configured as the "main device" may identify information on the registered first external electronic device 2521 (for example, identification information and information on the priority) on the basis of the registration.

According to various embodiments, the electronic device (for example, 2510) may store second information while the operation of waking-up some of the plurality of external electronic devices 2511, 2512, 2513, 2514, and 2515 and the first external electronic device (for example, the external electronic device 2521) is performed in operation 2405. For example, when the user speaks a wake-up utterance in the state in which the newly provided device (for example, the first external electronic device 2521) is located, the electronic device 2510 may receive information related to the user utterance (for example, information on the strength of the user utterance) from the newly provided external electronic device 2521 and the conventionally provided external electronic devices 2511, 2512, 2513, 2514, and 2515, and perform the operation of identifying the device to be woken up. The electronic device 2510 may acquire the information (for example, the information on the time points described in FIGS. 13 to 15, the information on the external electronic device re-identified as the device to be woken up described in FIGS. 15 to 18, and various pieces of accumulated information described in FIGS. 21 to 23) while the operation of identifying the device to be woken up is performed.

According to various embodiments, the electronic device 2510 may reconfigure at least one of the time interval or the priority on the basis of the stored second information in operation 2406. For example, the electronic device 2510 may reduce or extend preset time-out on the basis of the reception time of the information received from the newly provided device 2321 as described in FIGS. 13 to 15. In another example, when the external electronic device re-identified as the device to be woken up exists as described in FIGS. 15 to 18, the electronic device 2510 may change priorities of the external electronic devices 2511, 2512, 2513, 2514, and 2515. In another example, the electronic device 2510 may update information such as state information and SNR information of the newly provided device in various pieces of pre-accumulated information as described in FIGS. 21 to 23, generate a new artificial intelligence model on the basis of the various pieces of updated information, and reconfigure the time-out and the priority on the basis of the generated model.

Figure 26:
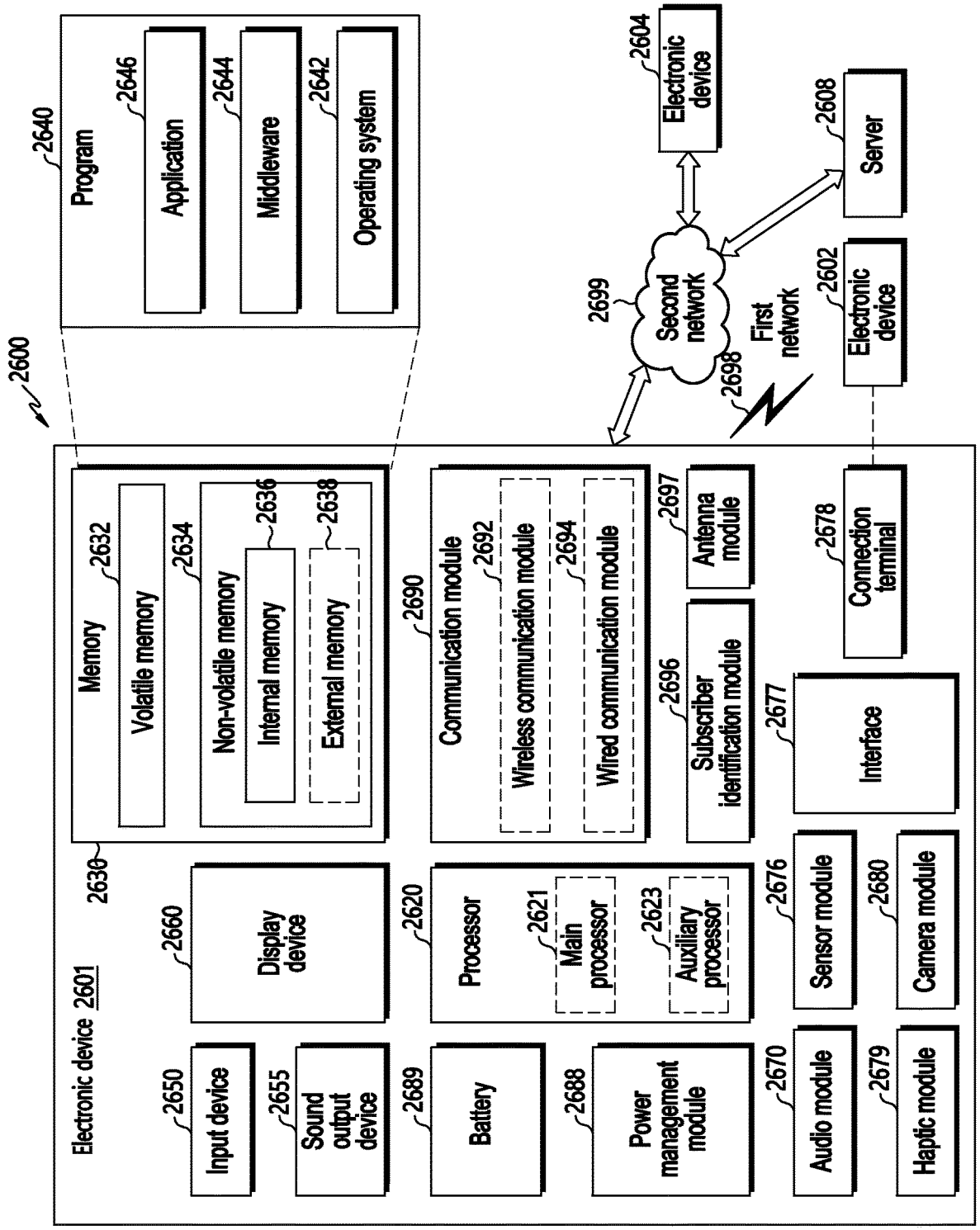
FIG. 26 is a block diagram illustrating an electronic device within a network environment according to various embodiments.

FIG. 26 is a block diagram illustrating an electronic device within a network environment according to various embodiments. Since the description of an electronic device 2601 within the network environment 2600 made below may correspond to the above description of the electronic devices included in the IoT system, an overlapping description is omitted.

Referring to FIG. 26, in a network environment 2600, an electronic device 2601 may communicate with an electronic device 2602 through a first network 2698 (for example, a short-range wireless communication network) or communicate with an electronic device 2604 or a server 2608 through a second network 2699 (for example, a long-range wireless communication network). According to an embodiment, the electronic device 2601 may communicate with the electronic device 2604 through the server 2608. According to an embodiment, the electronic device 2601 may include a processor 2620, a memory 2630, an input device 2650, a sound output device 2655, a display device 2660, an audio module 2670, a sensor module 2676, an interface 2677, a haptic module 2679, a camera module 2680, a power management module 2688, a battery 2689, a communication module 2690, a subscriber identification module 2696, or an antenna module 2697. In some embodiments, the electronic device 2601 may exclude at least one of the elements (for example, the display device 2660 or the camera module 2680) or may further include one or more other elements. In some embodiments, some of the elements may be implemented as a single integrated circuit. For example, the sensor module 2676 (for example, a fingerprint sensor, an iris sensor, or an illumination sensor) may be implemented while being embedded into the display device 2660 (for example, a display).

The processor 2620 may control at least one other element (for example, a hardware or software element) of the electronic device 2601 connected to the processor 2620 by executing, for example, software (for example, the program 2640) and perform various data processing or calculations. According to an embodiment, as at least a portion of the data processing or the calculations, the processor 2620 may load a command or data received from another element (for example, the sensor module 2676 or the communication module 2690) to the volatile memory 2632, process the command or data stored in the volatile memory 2632, and store resultant data in the nonvolatile memory 2634. According to an embodiment, the processor 2620 may include a main processor 2621 (for example, a central processing unit or an application processor) and an auxiliary processor 2623 (for example, a graphic processing unit, an image signal processor, a sensor hub processor, or a communication processor) which may operate independently from the main processor or together with the main processor. Additionally or alternatively, the auxiliary processor 2623 may use lower power than the main processor 2621 or may be configured to specialize in a predetermined function. The auxiliary processor 2623 may be implemented separately from or as a portion of the main processor 2621.

The auxiliary processor 2623 may control at least some of the functions or states related to at least one (for example, the display device 2660, the sensor module 2676, or the communication module 2690) of the electronic device 2601 on behalf of the main processor 2621 while the main processor 2621 is in an inactive (for example, sleep) state or together with the main processor 2621 while the main processor 2621 is in an active (for example, application execution) state. According to an embodiment, the auxiliary processor 2623 (for example, the image signal processor or the communication processor) may be implemented as a part of other elements (for example, the camera module 2680 or the communication module 2690) functionally relevant thereto.

The memory 2630 may store various pieces of data used by at least one element (for example, the processor 2620 or the sensor module 2676) of the electronic device 2601. Data may include, for example, software (for example, the program 2640) and input data or output data on a command related thereto. The memory 2630 may include the volatile memory 2632 or the nonvolatile memory 2634.

The program 2640 may be stored in the memory 2630 as software and may include, for example, an operating system 2642, middleware 2644, or an application 2646.

The input device 2650 may receive a command or data to be used by an element of the electronic device 2601 (for example, the processor 2620) from the outside (for example, user) of the electronic device 2601. The input device 2650 may include, for example, a microphone, a mouse, a keyboard, or a digital pen (for example, stylus pen).

The sound output device 2655 may output a sound signal to the outside of the electronic device 2601. The sound output device 2655 may include, for example, a speaker or a receiver. The speaker may be used for general purposes, such as reproducing multimedia or recording and the receiver may be used for receiving an incoming call. According to an embodiment, the receiver may be implemented separately from the speaker or as a portion of the speaker.

The display device 2660 may visually provide information to the outside (for example, user) of the electronic device 2601. The display device 2660 may include, for example, a display, a hologram device, a project, and a control circuit for controlling the corresponding device. According to an embodiment, the display device 2660 may include a touch circuit (circuitry) configured to detect a touch or a sensor circuit (for example, a pressure sensor) configured to measure the intensity of force generated by the touch.

The audio module 2670 may convert a sound into an electrical signal or, conversely, convert an electrical signal into a sound. According to an embodiment, the audio module 2670 may acquire a sound through the input device 2650 or output a sound through the sound output device 2655 or an external electronic device (for example, the electronic device 2602) (for example, a speaker or headphones) directly or wirelessly connected to the electronic device 2601.

The sensor module 2676 may detect an operation state (for example, power or temperature) of the electronic device 2601 or an external environment state (for example, user state) and generate an electrical signal or a data value corresponding to the detected state. According to an embodiment, the sensor module 2676 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 2677 may support one or more predetermined protocols which can be used to directly or wirelessly connect the electronic device 2601 to the external electronic device (for example, the electronic device 2602). According to an embodiment, the interface 2677 may include, for example, a High-Definition Multimedia Interface (HDMI), a Universal Serial Bus (USB) interface, an SD card interface, or an audio interface.

A connectivity terminal 2678 may include a connector through which the electronic device 2601 can be physically connected to the external electronic device (for example, the electronic device 2602). According to an embodiment, the connectivity terminal 2678 may include, for example, an HDMI connector, a USB connector, an SD card connector, or an audio connector (for example, a headphone connector).

The haptic module 2679 may convert an electric signal into mechanical (for example, vibration or motion) or electrical stimulation that the user can recognize through the sense of touch or the sense of movement. According to an embodiment, the haptic module 2679 may include, for example, a motor, a piezoelectric element, or an electro-stimulation device.

The camera module 2680 may capture a still image and a moving image. According to an embodiment, the camera module 2680 may include one or more lenses, image sensors, image signal processors, or flashes.

The power management module 2688 may mange the power supplied to the electronic device 2601. According to an embodiment, the power management module 2688 may be implemented as at least a portion of, for example, a Power Management Integrated Circuit (PMIC).

The battery 2689 may supply power to at least one element of the electronic device 2601. According to an embodiment, the battery 2689 may include, for example, a non-rechargeable primary cell, a rechargeable secondary cell, or a fuel cell.

The communication module 2690 may support establishment of a direct (for example, wired) communication channel or a wireless communication channel between the electronic device 2601 and the external electronic device (for example, the electronic device 2602, the electronic device 2604, or the server 2608) and communication through the established communication channel. The communication module 2690 may include one or more communication processors which operate independently from the processor 2620 (for example, application processor) and support direct (for example, wired) communication or wireless communication. According to an embodiment, the communication module 2690 may include a wireless communication module 2692 (for example, a cellular communication module, a short-range wireless communication module, or a Global Navigation Satellite System (GNSS) communication module) or a wired communication module 2694 (for example, a Local Area Network (LAN) communication module or a power line communication module). Among the communication modules, the corresponding communication module may communicate with the external electronic device through a first network 2698 (for example, a short-range communication network such as Bluetooth, Wi-Fi direct or Infrared Data Association (IrDA)) or a second network 2699 (for example, a long-range communication network such as a cellular network, Internet, or a computer network (for example, a LAN or WAN)). Such various types of communication modules may be integrated into one element (for example, a single chip) or implemented as a plurality of elements (for example, a plurality of chips) separated from each other. The wireless communication module 2692 may identify and authenticate the electronic device 2601 within a communication network such as the first network 2698 or the second network 2699 using subscriber information (for example, International Mobile Subscriber Identity (IMSI)) stored in the subscriber identification module 2696.

The antenna module 2697 may transmit signals or power from the outside (for example, external electronic device) or receive the same from the outside. According to an embodiment, the antenna module may include one antenna including a conductive material configured on a substrate (for example, printed circuit board (PCB)) or a radiator configured in a conductive pattern. According to an embodiment, the antenna module 2697 may include a plurality of antennas. In this case, at least one antenna suitable for a communication scheme used by a communication network such as the first network 2698 or the second network 2699 may be selected from among, for example, the plurality of antennas by the communication module 2690. The signals or power may be transmitted or received between the communication module 2690 and the external electronic device through at least one selected antenna. According to some embodiments, another component (for example, RFIC) as well as the radiator may be additionally configured as a portion of the antenna module 2697.

At least some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, instructions or data) therebetween.

According to an embodiment, a command or data may be transmitted or received between the electronic device 2601 and the external electronic device 2604 through the server 2608 connected to the second network 2699. Each of the electronic devices 2602 and 2604 may be a device which is the same type as or a different type from that of the electronic device 2601. According to an embodiment, all or some of the operations executed by the electronic device 2601 may be executed by one or more external electronic devices of the external electronic devices 2602, 2604, or 2608. For example, when the electronic device 2601 performs any function or service automatically or in response to a request from a user or another device, the electronic device 2601 may make a request for performing at least some of the functions or services to one or more external electronic devices instead of performing the functions or services by itself, or may additionally make the request. The one or more external electronic devices receiving the request may perform at least some of the requested functions or services or an additional function or service related to the request and may transfer the result thereof to the electronic device 2601. The electronic device 2601 may provide the result or additionally process the result and provide the processed result as at least a portion of a response to the request. To this end, for example, cloud computing, distributed computing, or client-server computing technology may be used.

The electronic device according to various embodiments disclosed in this document may be various types of electronic devices. The electronic device may include, for example, a portable communication device (for example, a smart phone), a computer device, a portable multimedia device, a portable medical device, a camera, a wearable device, or a home appliance. The electronic device according to an embodiment of this document is not limited to the above-described devices.

The various embodiments and the terms used herein are not intended to limit the technical features disclosed herein to specific implementation forms, and should be understood to include various modifications, equivalents, and/or alternatives to the corresponding embodiments. In connection with the description of drawings, similar reference numerals may be used for similar or relative elements. A singular form corresponding to an item may include one or a plurality of items unless clearly specially indicated in context. In this document, each of the expressions "A or B", "at least one of A and B", "at least one of A or B", "A, B, or C," at least one of A, B, and C, and "at least one of A, B, or C" may include (1) one of the items listed together in the corresponding expression among the expressions or all available combinations thereof. The expressions "first" or "second" may be used to simply distinguish a corresponding element from another corresponding element, and do not limit corresponding elements in another aspect (for example, importance or order). When it is mentioned that any (for example, first) element is "coupled" or "connected" to another (for example, second) element with the term "functionally" or "communicationally" or without the term, it means that any element may be connected to another element directly (for example, through a wire), wirelessly, or through a third element.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a portion thereof. For example, according to an embodiment, the module may be implemented in the form of an Application-Specific Integrated Circuit (ASIC).

Various embodiments of this document may be implemented as software (for example, the program 2640) including one or more instructions stored in a machine (for example, the electronic device 2601)-readable storage medium (for example, the internal memory 2636 or the external memory 2638). For example, the processor (for example, the processor 2620) of the device (for example, the electronic device 2601) may call at least one of the one or more stored instructions from the storage medium and execute the same. This allows the device to perform at least one function according to at least one loaded command. The one or more commands may include code generated by a compiler or code which can be executed by an interpreter. The machine-readable storage medium may be provided in the form of a nontransitory storage medium. The term "nontransitory" means that the storage medium is a tangible device and does not include a signal (for example, an electromagnetic wave) and does not distinguish the case in which data is stored in the storage medium semi-permanently and the case in which data is stored in the storage medium temporarily.

According to an embodiment, a method according to various embodiments disclosed in this document may be provided while being included in a computer program product. The computer program product may be traded as a product between a seller and a buyer. The computer program product may be distributed in the form of a machine-readable storage medium (for example, a Compact Disc Read-Only Memory (CD-ROM)) or distributed online (for example, downloaded or uploaded) through an application store (for example, Play Store™) or directly between two user devices (for example, smart phones). If distributed online, at least a portion of the computer program products may be at least temporarily stored in or temporarily generated by the machine-readable storage medium, such as a memory of the manufacturer's server, a server of the application store, or a relay server.

According to various embodiments, each of the elements (for example, the module or the program) may include a singular entity or a plurality of entities. According to various embodiments, one or more of the corresponding elements or operations may be omitted, or one or more other elements or operations may be added. Alternatively or additionally, the plurality of elements (for example, the module or the program) may be integrated into one element. In this case, the integrated element may perform one or more functions of each of the plurality of elements in the same way or similarly to being performed by the corresponding element among the plurality of elements before the integration. According to various embodiments, operations performed by the module, the program, or another element may be sequentially, in parallel, repeatedly, or heuristically executed, or one or more of the operations may be executed in another order, or omitted, or one or more other operations may be added.

According to various embodiments, an electronic device (for example, 503 of FIG. 5A) may be provided, wherein the electronic device (for example, 503 of FIG. 5A) may include: a communication circuit; a memory; and at least one processor, wherein, when instructions stored in the memory are executed, the instructions cause the at least one processor to configure communication connections with a plurality of external electronic devices (for example, 501, 502, 504, 505, and 506 of FIG. 5A) for providing an intelligent speech service, receive at least one piece of information related to a user utterance including a specific word for wake-up from at least some of the plurality of external electronic devices (for example, 501, 502, 504, 505, and 506 of FIG. 5A), identify a device to be woken up among at least some of the plurality of external electronic devices (for example, 501, 502, 504, 505, and 506 of FIG. 5A) on the basis of at least one piece of information received during a time interval (for example, time-out) for identifying the device to be woken up among the at least one piece of received information, and change the time interval (for example, time-out) to a first time interval (for example, time-out) longer than the time interval (for example, time-out) on the basis of a reception time point of at least one piece of second information when the at least one piece of second information is received after the time interval (for example, time-out).

According to various embodiments, the electronic device (for example, 503 of FIG. 5A) may be provided, wherein the electronic device (for example, 503 of FIG. 5A) may be configured as a main device, the plurality of external electronic devices (for example, 501, 502, 504, 505, and 506 of FIG. 5A) may be configured as sub devices, and the main device may be configured to identify the device to be woken up among the sub devices.

According to various embodiments, the electronic device (for example, 503 of FIG. 5A) may be provided, wherein the device to be woken up may be a first external electronic device, the instructions may cause the at least one processor to control the first external electronic device to be woken up, and the woken-up first external electronic device may receive and becomes able to process a first user utterance for controlling the first external electronic device.

According to various embodiments, the electronic device (for example, 503 of FIG. 5A) may be provided, wherein the identified device to be woken up may be a first external electronic device, and the instructions may cause the at least one processor to, when the device to be woken up is re-identified based on the at least one piece of first information and the at least one piece of second information, identify at least one second external electronic device, which is different from the first external electronic device, corresponding to the at least one piece of second information as the device to be woken up and change the time interval (for example, time-out) to the first time interval (for example, time-out) on the basis of the identification of the at least one second external electronic device as the device to be woken up.

According to various embodiments, the electronic device (for example, 503 of FIG. 5A) may be provided, wherein the instructions may cause the at least one processor to, when a number of at least one piece of second information is plural, change the time interval (for example, time-out) to the first time interval (for example, time-out) on the basis of a latest reception time point among at least one reception time point of the at least one piece of second information.

According to various embodiments, the electronic device (for example, 503 of FIG. 5A) may be provided, wherein the instructions may cause the at least one processor to, when the at least one piece of second information is not received after the time interval (for example, time-out), identify third information received last among the at least one piece of first information received during the time interval (for example, time-out) and change the time interval (for example, time-out) to a second time interval (for example, time-out) shorter than the time interval, based on a reception time point of the identified third information.

According to various embodiments, the electronic device (for example, 503 of FIG. 5A) may be provided, wherein the instructions may cause the at least one processor to calculate an average value of the first time interval (for example, time-out) and the second time interval (for example, time-out) and change the time interval (for example, time-out) to the calculated average value.

According to various embodiments, the electronic device (for example, 503 of FIG. 5A) may be provided, wherein the at least one piece of first information may include information on a strength related to the user utterance identified in at least some of the plurality of external electronic devices (for example, 501, 502, 504, 505, and 506 of FIG. 5A), and the instructions cause the at least one processor to identify the first external electronic device transmitting information on a highest strength related to the user utterance among at least some of the plurality of external electronic devices (for example, 501, 502, 504, 505, and 506 of FIG. 5A) on the basis of the at least one piece of first information.

According to various embodiments, the electronic device (for example, 503 of FIG. 5A) may be provided, wherein the memory may store information on priorities of the plurality of external electronic devices (for example, 501, 502, 504, 505, and 506 of FIG. 5A) to be identified as the device to be woken up, and the instructions cause the at least one processor to identify the first external electronic device and a second external electronic device among at least some of the plurality of external electronic devices (for example, 501, 502, 504, 505, and 506 of FIG. 5A) on the basis of the at least one piece of first information and identify the first external electronic device having a higher priority among the first external electronic device and the second external electronic device as the device to be woken up on the basis of the information on the priorities of the plurality of external electronic devices (for example, 501, 502, 504, 505, and 506 of FIG. 5A).

According to various embodiments, the electronic device (for example, 503 of FIG. 5A) may be provided, wherein the instructions may cause the at least one processor to identify that the second external electronic device is re-identified as the device to be woken up after the first external electronic device is identified as the device to be woken up and change a priority of the second external electronic device to a priority higher than the priority of the first external electronic device, based on the re-identification of the second external electronic device as the device to be woken up.

According to various embodiments, the electronic device (for example, 503 of FIG. 5A) may be provided, wherein the instructions may cause the at least one processor to accumulate information acquired in at least one operation of identifying the device to be woken up, performed before the at least one piece of information is received, and the accumulated information includes at least one piece of information on an SNR of each of the plurality of external electronic devices (for example, 501, 502, 504, 505, and 506 of FIG. 5A) acquired in each of the operations for wake-up, performed before the at least one piece of information is received, information on a time point at which information is received from each of the plurality of external electronic devices (for example, 501, 502, 504, 505, and 506 of FIG. 5A), information related to a state of each of the plurality of external electronic devices (for example, 501, 502, 504, 505, and 506 of FIG. 5A), information on a device identified to be initially woken up, and information on a device to be finally woken up.

According to various embodiments, the electronic device (for example, 503 of FIG. 5A) may be provided, wherein the instructions may cause the at least one processor to configure a value used in the operation of identifying the device to be woken up, based on information related to the plurality of external electronic devices (for example, 501, 502, 504, 505, and 506 of FIG. 5A), and the value includes at least one of the time interval (for example, time-out) for identifying the device to be woken up or priorities of the plurality of external electronic devices (for example, 501, 502, 504, 505, and 506 of FIG. 5A) to be identified as the device to be woken up.

According to various embodiments, the electronic device (for example, 503 of FIG. 5A) may be provided, wherein the instructions may cause the at least one processor to perform learning, based on an algorithm for generating an artificial intelligence model using, as training data, at least some pieces of information related to the plurality of external electronic devices (for example, 501, 502, 504, 505, and 506 of FIG. 5A) of the plurality of external electronic devices (for example, 501, 502, 504, 505, and 506 of FIG. 5A), and the artificial intelligence model is configured to output information on the device to be finally woken up in response to an input of the information on the SNR of each of the plurality of external electronic devices (for example, 501, 502, 504, 505, and 506 of FIG. 5A), the information related to the state of each of the plurality of external electronic devices (for example, 501, 502, 504, 505, and 506 of FIG. 5A), and the information on the device to be initially woken up.

According to various embodiments, the electronic device (for example, 503 of FIG. 5A) may be provided, wherein the instructions may cause the at least one processor to identify first information related to the SNR of each of at least some of the plurality of external electronic devices (for example, 501, 502, 504, 505, and 506 of FIG. 5A) and second information related to the state of each of at least some of the plurality of external electronic devices (for example, 501, 502, 504, 505, and 506 of FIG. 5A) from at least one piece of information received from at least some of the plurality of external electronic devices (for example, 501, 502, 504, 505, and 506 of FIG. 5A), identify third information on the device identified to be woken up, determined based on the at least one piece of information, and identify the device to be woken up, output from the artificial intelligence model through an input of the first information, the second information, and the third information into the artificial intelligence model.

According to various embodiments, a method of operating an electronic device (for example, 503 of FIG. 5A) includes: configuring communication connections with a plurality of external electronic devices (for example, 501, 502, 504, 505, and 506 of FIG. 5A) for providing an intelligent speech service; receiving at least one piece of information related to a user utterance including a specific word for wake-up from at least some of the plurality of external electronic devices (for example, 501, 502, 504, 505, and 506 of FIG. 5A); identifying a device to be woken up among at least some of the plurality of external electronic devices (for example, 501, 502, 504, 505, and 506 of FIG. 5A) on the basis of at least one piece of information received during a time interval (for example, time-out) for identifying the device to be woken up among the at least one piece of received information; and changing the time interval (for example, time-out) to a first time interval (for example, time-out) longer than the time interval (for example, time-out) on the basis of a reception time point of at least one piece of second information when the at least one piece of second information is received after the time interval (for example, time-out).

According to various embodiments, the method may be provided, wherein the electronic device (for example, 503 of FIG. 5A) may be configured as a main device, the plurality of external electronic devices (for example, 501, 502, 504, 505, and 506 of FIG. 5A) may be configured as sub devices, and the main device identifies the device to be woken up among the sub devices.

According to various embodiments, the method may be provided, wherein the device to be woken up may be a first external electronic device, the method may further include controlling the first external electronic device to be woken up, and the woken-up first external electronic device may receive and become able to process a first user utterance for controlling the first external electronic device.

According to various embodiments, the method may be provided, wherein the device to be woken up may be a first external electronic device, and the method may further include: when the device to be woken up is re-identified based on the at least one piece of first information and the at least one piece of second information, identifying at least one second external electronic device, which is different from the first external electronic device, corresponding to the at least one piece of second information as the device to be woken up; and changing the time interval (for example, time-out) to the first time interval (for example, time-out) on the basis of the identification of the at least one second external electronic device as the device to be woken up.

According to various embodiments, the method may further include, when a number of at least one piece of second information is plural, changing the time interval (for example, time-out) to the first time interval (for example, time-out) on the basis of a latest reception time point among at least one reception time point of the at least one piece of second information.

According to various embodiments, an electronic device (for example, 503 of FIG. 5A) includes: a communication circuit; a memory; and at least one processor, wherein, when instructions stored in the memory are executed, the instructions cause the at least one processor to configure a network with a plurality of external electronic devices (for example, 501, 502, 504, 505, and 506 of FIG. 5A) for providing an intelligent speech service, accumulate information related to the plurality of external electronic devices (for example, 501, 502, 504, 505, and 506 of FIG. 5A) while an operation of waking up some of the plurality of external electronic devices (for example, 501, 502, 504, 505, and 506 of FIG. 5A) configuring the network is performed, configure a time interval (for example, time-out) for identifying a device to be woken up and a priority of each of the plurality of external electronic devices (for example, 501, 502, 504, 505, and 506 of FIG. 5A) on the basis of the accumulated information, receive at least one piece of information related to a user utterance including a specific word for wake-up from at least some of the plurality of external electronic devices (for example, 501, 502, 504, 505, and 506 of FIG. 5A), and identify the device to be woken up among at least some of the plurality of external electronic devices (for example, 501, 502, 504, 505, and 506 of FIG. 5A) on the basis of the at least one piece of information and at least one of the configured time interval (for example, time-out) and the priority.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
communication circuitry;
memory storing one or more computer programs; and
one or more processors communicatively coupled to the communication circuitry and the memory,
wherein the one or more computer programs include computer-executable instructions that, when executed by the one or more processors individually or collectively, cause the electronic device to:
establish communication connections with a plurality of external electronic devices for providing an intelligent speech service,
receive at least one piece of information related to a user utterance including a specific word for wake-up from at least some of the plurality of external electronic devices,
identify a device to be woken up among the at least some of the plurality of external electronic devices, based on at least one piece of first information received from a first external electronic device of the plurality of external electronic devices during a time interval for identifying the device to be woken up,
identify a first time interval longer than the time interval, based on a reception time point of at least one piece of second information when the at least one piece of second information is received from a second external electronic device of the plurality of external electronic devices after the time interval,
identify a second time interval shorter than the time interval, based on a reception time point of third information received from a third external electronic device of the plurality of external electronic devices last among the at least one piece of first information received during the time interval, and
change the time interval based on the first time interval and the second time interval and further based on a quality of a communication state between the first external electronic device of the plurality of external electronic devices and the electronic device and a quality of a communication state between the second external electronic device of the plurality of external electronic devices and the electronic device.

2. The electronic device of claim 1,
wherein the electronic device is configured as a main device,
wherein the plurality of external electronic devices are configured as sub devices, and
wherein the main device is configured to identify the device to be woken up among the sub devices.

3. The electronic device of claim 2,
wherein the identified device to be woken up is the first external electronic device of the plurality of external electronic devices, and
wherein the one or more computer programs further include computer-executable instructions that, when executed by the one or more processors individually or collectively, cause the electronic device to:
control the first external electronic device of the plurality of external electronic devices to be woken up such that the first external electronic device of the plurality of external electronic devices is capable of receiving a first user utterance for controlling the first external electronic device of the plurality of external electronic devices and processing the first user utterance.

4. The electronic device of claim 1,
wherein the identified device to be woken up is the first external electronic device of the plurality of external electronic devices, and
wherein the one or more computer programs further include computer-executable instructions that, when executed by the one or more processors individually or collectively, cause the electronic device to:
when the device to be woken up is re-identified based on the at least one piece of first information and the at least one piece of second information, identify at least one of the second external electronic device or the third external electronic device, which is different from the first external electronic device of the plurality of external electronic devices, corresponding to the at least one piece of second information as the device to be woken up, and
change the time interval to the first time interval, based on the identification of the at least one of the second external electronic device or the third external electronic device as the device to be woken up.

5. The electronic device of claim 4, wherein the one or more computer programs further include computer-executable instructions that, when executed by the one or more processors individually or collectively, cause the electronic device to:

when a number of the at least one piece of second information is plural, change the time interval to the first time interval, based on a latest reception time point among at least one reception time point of the at least one piece of second information.

6. The electronic device of claim 1, wherein the one or more computer programs further include computer-executable instructions that, when executed by the one or more processors individually or collectively, cause the electronic device to:

when the at least one piece of second information is not received after the time interval, identify the third information received last among the at least one piece of first information received during the time interval, and change the time interval to the second time interval shorter than the time interval, based on the reception time point of the identified third information.

7. The electronic device of claim 6, wherein the one or more computer programs further include computer-executable instructions that, when executed by the one or more processors individually or collectively, cause the electronic device to:

calculate an average value of the first time interval and the second time interval, and change the time interval to the calculated average value.

8. The electronic device of claim 3, wherein the at least one piece of first information includes information on a strength related to the user utterance identified by the at least some of the plurality of external electronic devices, and wherein the one or more computer programs further include computer-executable instructions that, when executed by the one or more processors individually or collectively, cause the electronic device to:

identify the first external electronic device of the plurality of external electronic devices as an external electronic device transmitting information on a highest strength related to the user utterance among the at least some of the plurality of external electronic devices, based on the at least one piece of first information.

9. The electronic device of claim 8, wherein the memory stores information on priorities of the plurality of external electronic devices, and wherein the one or more computer programs further include computer-executable instructions that, when executed by the one or more processors individually or collectively, cause the electronic device to:

identify a first candidate external electronic device and a second candidate external electronic device among the at least some of the plurality of external electronic devices, based on the at least one piece of first information, and identify the first external electronic device of the plurality of external electronic devices as an external electronic device having a higher priority among the first candidate external electronic device and a candidate second external electronic device of the plurality of external electronic devices, based on the information on the priorities of the plurality of external electronic devices.

10. The electronic device of claim 9, wherein the one or more computer programs further include computer-executable instructions that, when executed by the one or more processors individually or collectively, cause the electronic device to:

identify that the candidate second external electronic device of the plurality of external electronic devices is re-identified as the device to be woken up after the first external electronic device of the plurality of external electronic devices is identified as the device to be woken up, and change a priority of the second candidate external electronic device to a first priority higher than the priority of the first candidate external electronic device, based on the re-identification of the second candidate external electronic device as the device to be woken up.

11. The electronic device of claim 1, wherein the one or more computer programs further include computer-executable instructions that, when executed by the one or more processors individually or collectively, cause the electronic device to:

accumulate information acquired in at least one operation of identifying the device to be woken up, performed before the at least one piece of information is received, and wherein the accumulated information includes at least one of, information on a signal to noise ratio (SNR) of each of the plurality of external electronic devices acquired in each of the operations for wake-up, performed before the at least one piece of information is received, information on a time point at which information is received from each of the plurality of external electronic devices, information related to a state of each of the plurality of external electronic devices, information on a device identified to be initially woken up, or information on a device to be finally woken up.

12. The electronic device of claim 11, wherein the one or more computer programs further include computer-executable instructions that, when executed by the one or more processors individually or collectively, cause the electronic device to:

set a value used for the operation of identifying the device to be woken up, based on information related to the plurality of external electronic devices, and wherein the value includes at least one of the time interval for identifying the device to be woken up or priorities of the plurality of external electronic devices to be identified as the device to be woken up.

13. The electronic device of claim 11, wherein the one or more computer programs further include computer-executable instructions that, when executed by the one or more processors individually or collectively, cause the electronic device to:

perform learning, based on an algorithm for generating an artificial intelligence model using, as training data, at least some pieces of information related to the plurality of external electronic devices of the plurality of external electronic devices, wherein the artificial intelligence model is configured to output information on a device to be finally woken up in response to an input of the information on the SNR of each of the plurality of external electronic devices, wherein the information related to the state of each of the plurality of external electronic devices, and wherein the information on a device to be initially woken up.

14. The electronic device of claim 13, wherein the one or more computer programs further include computer-executable instructions that, when executed by the one or more processors individually or collectively, cause the electronic device to:
    identify first information related to the SNR of each of the at least some of the plurality of external electronic devices and second information related to the state of each of the at least some of the plurality of external electronic devices from the at least one piece of information received from the at least some of the plurality of external electronic devices,
    identify third information on a device identified to be woken up, determined based on the at least one piece of information, and
    identify the device to be woken up from the artificial intelligence model based on an input of the first information, the second information, and the third information into the artificial intelligence model.

15. A method performed by an electronic device, the method comprising:
    establishing, by the electronic device, communication connections with a plurality of external electronic devices for providing an intelligent speech service;
    receiving, by the electronic device, at least one piece of information related to a user utterance including a specific word for wake-up from at least some of the plurality of external electronic devices;
    identifying, by the electronic device, a device to be woken up among the at least some of the plurality of external electronic devices, based on at least one piece of first information received from a first external electronic device of the plurality of external electronic devices during a time interval for identifying the device to be woken up;
    identifying, by the electronic device, a first time interval longer than the time interval, based on a reception time point of at least one piece of second information received from a second external electronic device of the plurality of external electronic devices when the at least one piece of second information is received after the time interval;
    identifying, by the electronic device, a second time interval shorter than the time interval, based on a reception time point of third information received received from a third external electronic device of the plurality of external electronic devices last among the at least one piece of first information received during the time interval; and
    changing, by the electronic device, the time interval based on the first time interval and the second time interval and further based on a quality of a communication state between the first external electronic device of the plurality of external electronic devices and the electronic device and a quality of a communication state between the second external electronic device of the plurality of external electronic devices and the electronic device.

16. The method of claim 15,
    wherein the electronic device is configured as a main device,
    wherein the plurality of external electronic devices are configured as sub devices, and
    wherein the main device is configured to identify the device to be woken up among the sub devices.

17. The method of claim 16,
    wherein the identified device to be woken up is a first external electronic device of the plurality of external electronic devices, and
    wherein the method further comprises:
        controlling the first external electronic device of the plurality of external electronic devices to be woken up such that the first external electronic device of the plurality of external electronic devices is capable of receiving a first user utterance for controlling the first external electronic device of the plurality of external electronic devices and processing the first user utterance.

18. The method of claim 15,
    wherein the identified device to be woken up is the first external electronic device of the plurality of external electronic devices, and
    wherein the method further comprises:
        when the device to be woken up is re-identified based on the at least one piece of first information and the received at least one piece of second information, identifying at least one of the second external electronic device or the third external electronic device of the plurality of external electronic devices, which is different from the first external electronic device of the plurality of external electronic devices, corresponding to the at least one piece of second information as the device to be woken up, and
        changing the time interval to the first time interval, based on the identification of the at least one of the second external electronic device or the third external electronic device of the plurality of external electronic devices as the device to be woken up.

19. The method of claim 18, further comprising:
    when a number of the at least one piece of second information is plural, changing the time interval to the first time interval, based on a latest reception time point among at least one reception time point of the at least one piece of second information.

20. One or more non-transitory computer-readable storage media storing one or more computer programs including computer-executable instructions that, when executed by one or more processors of an electronic device individually or collectively, cause the electronic device to:
    establish, by the electronic device, communication connections with a plurality of external electronic devices for providing an intelligent speech service,
    receive, by the electronic device, at least one piece of information related to a user utterance including a specific word for wake-up from at least some of the plurality of external electronic devices,
    identify, by the electronic device, a device to be woken up among the at least some of the plurality of external electronic devices, based on at least one piece of first information received from a first external electronic device of the plurality of external electronic devices during a time interval for identifying the device to be woken up,
    identify, by the electronic device, a first time interval longer than the time interval, based on a reception time point of at least one piece of second information received from a second external electronic device of the plurality of external electronic devices when the at least one piece of second information is received after the time interval,
    identify, by the electronic device, a second time interval shorter than the time interval, based on a reception time point of third information received from a third external electronic device of the plurality of external electronic devices last among the at least one piece of first information received during the time interval, and change, by the electronic device, the time interval based on the first time interval and the second time interval and further based on a quality of a communication state between the first external electronic device of the plurality of external electronic devices and the electronic device and a quality of a communication state between the second external electronic device of the plurality of external electronic devices and the electronic device.

\* \* \* \* \*